(12) United States Patent
Honey et al.

(10) Patent No.: US 11,122,725 B2
(45) Date of Patent: Sep. 21, 2021

(54) TILLAGE APPARATUSES AND RELATED METHODS

(71) Applicant: HONEY BEE MANUFACTURING LTD., Frontier (CA)

(72) Inventors: Glenn Raymond Honey, Bracken (CA); Lee Glenn Harper, Shaunavon (CA); Scott Douglas Smith, Climax (CA)

(73) Assignee: HONEY BEE MANUFACTURING LTD., Frontier (CA)

( * ) Notice: Subject to any disclaimer, the term of this patent is extended or adjusted under 35 U.S.C. 154(b) by 203 days.

(21) Appl. No.: 16/012,537

(22) Filed: Jun. 19, 2018

(65) Prior Publication Data

US 2018/0368307 A1 Dec. 27, 2018

Related U.S. Application Data

(60) Provisional application No. 62/523,192, filed on Jun. 21, 2017.

(51) Int. Cl.
*A01B 51/04* (2006.01)
*A01B 73/04* (2006.01)
(Continued)

(52) U.S. Cl.
CPC ............ *A01B 51/04* (2013.01); *A01B 33/024* (2013.01); *A01B 61/046* (2013.01);
(Continued)

(58) Field of Classification Search
CPC ....... A01B 51/04; A01B 51/00; A01B 33/024; A01B 33/021; A01B 33/02; A01B 33/00;
(Continued)

(56) References Cited

U.S. PATENT DOCUMENTS 1,634,650 A * 7/1927 Coon ..................... A01B 51/04
172/254
2,349,257 A 5/1944 Evans et al.
(Continued)

FOREIGN PATENT DOCUMENTS

AT 517211 A4 * 12/2016 ............. A01B 51/04
CA 2007011 A1 7/1991
(Continued)

OTHER PUBLICATIONS

Gearmore Inc., Offset Discs Pull Type Assembly, Operation, & Parts Manual for Models Series 700, Jul. 2012, 23 pages.

*Primary Examiner* — Christopher J. Novosad

(57) ABSTRACT

An apparatus, which may be a tillage apparatus may have a flexible frame. The frame may be made from transverse and longitudinal open members. The frame may support ground engagers and may be supported on wheel assemblies. The ground engagers may be connected to a spring trip mechanism. The ground engagers may be mounted to open members of the frame with a clamping style mechanism. The clamp mechanism may include wedge devices. The frame may be lowered and raised relative to wheels of the wheel assemblies with a lift mechanism. One row of ground engagers may be raised or lowered relative to the frame independent of another row of ground engagers. An anti-skid or skew control system may be employed in association with the independent height adjustment of one row of ground engagers. A system may be provided to maintain and control the height of a tow hitch forming part of the apparatus.

23 Claims, 77 Drawing Sheets

(51) Int. Cl.
  *A01B 61/04* (2006.01)
  *A01B 33/02* (2006.01)
  *A01B 3/24* (2006.01)
  *A01B 5/04* (2006.01)

(52) U.S. Cl.
  CPC .............. *A01B 73/044* (2013.01); *A01B 3/24* (2013.01); *A01B 5/04* (2013.01)

(58) Field of Classification Search
  CPC ..... A01B 61/046; A01B 61/044; A01B 61/04; A01B 61/00; A01B 73/044; A01B 73/04; A01B 7/02; A01B 73/00; A01B 3/24; A01B 3/00; A01B 5/04; A01B 5/00
  See application file for complete search history.

(56) References Cited

U.S. PATENT DOCUMENTS

| | | | |
|---|---|---|---|
| 2,440,550 A | 4/1948 | Martin | |
| 2,493,811 A | 1/1950 | Graham | |
| 2,507,783 A | 5/1950 | Graham | |
| 2,562,486 A * | 7/1951 | Denning | A01B 51/04 172/446 |
| 2,584,614 A | 2/1952 | Rasmussen et al. | |
| 2,595,352 A | 5/1952 | Graham | |
| 2,663,239 A | 12/1953 | Rapp et al. | |
| 2,699,715 A | 1/1955 | Shelton | |
| 2,701,511 A | 2/1955 | Graham | |
| 2,719,474 A | 10/1955 | Lindeman | |
| 2,759,313 A | 8/1956 | Campbell | |
| 2,857,833 A | 10/1958 | Rolf | |
| 3,460,632 A | 8/1969 | Richey | |
| 5,957,218 A | 9/1999 | Noonan et al. | |
| 6,085,846 A | 7/2000 | Buchl et al. | |
| 8,235,130 B2 | 8/2012 | Henry et al. | |
| 8,453,754 B2 | 6/2013 | Beaujot | |
| 8,914,198 B2 | 12/2014 | Prickel et al. | |
| 8,997,886 B2 | 4/2015 | Stark | |
| 9,585,298 B2 | 3/2017 | Henry et al. | |
| 2011/0112721 A1 | 5/2011 | Wang et al. | |
| 2011/0284253 A1 | 11/2011 | Stevenson | |
| 2015/0129261 A1 * | 5/2015 | Sudbrink | A01B 51/04 172/553 |

FOREIGN PATENT DOCUMENTS

| | | |
|---|---|---|
| DE | 10011102 B4 | 11/2005 |
| EP | 0776597 B1 | 4/2002 |

* cited by examiner

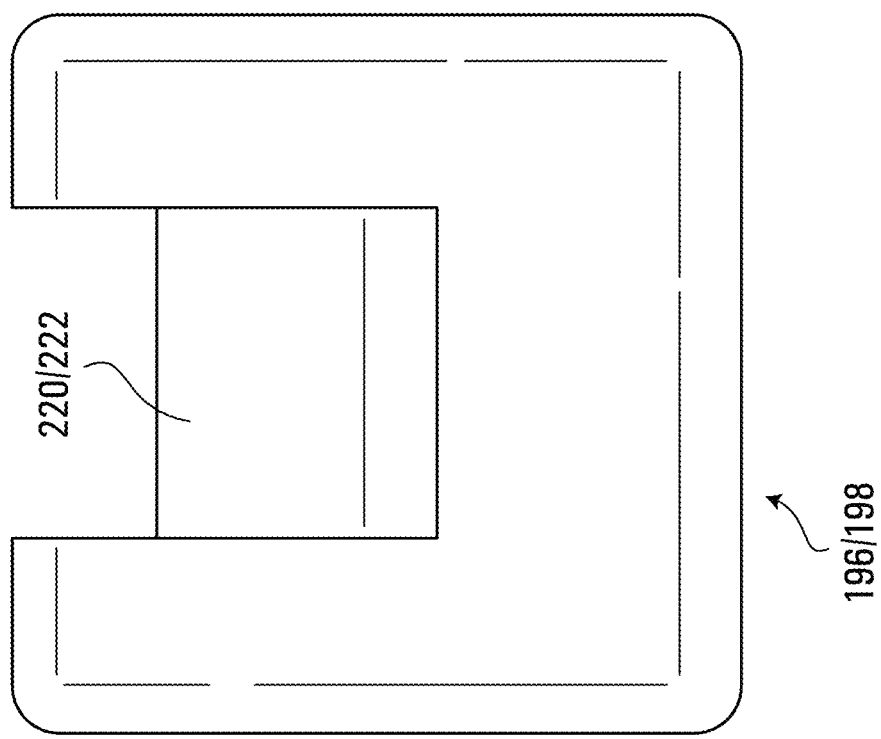

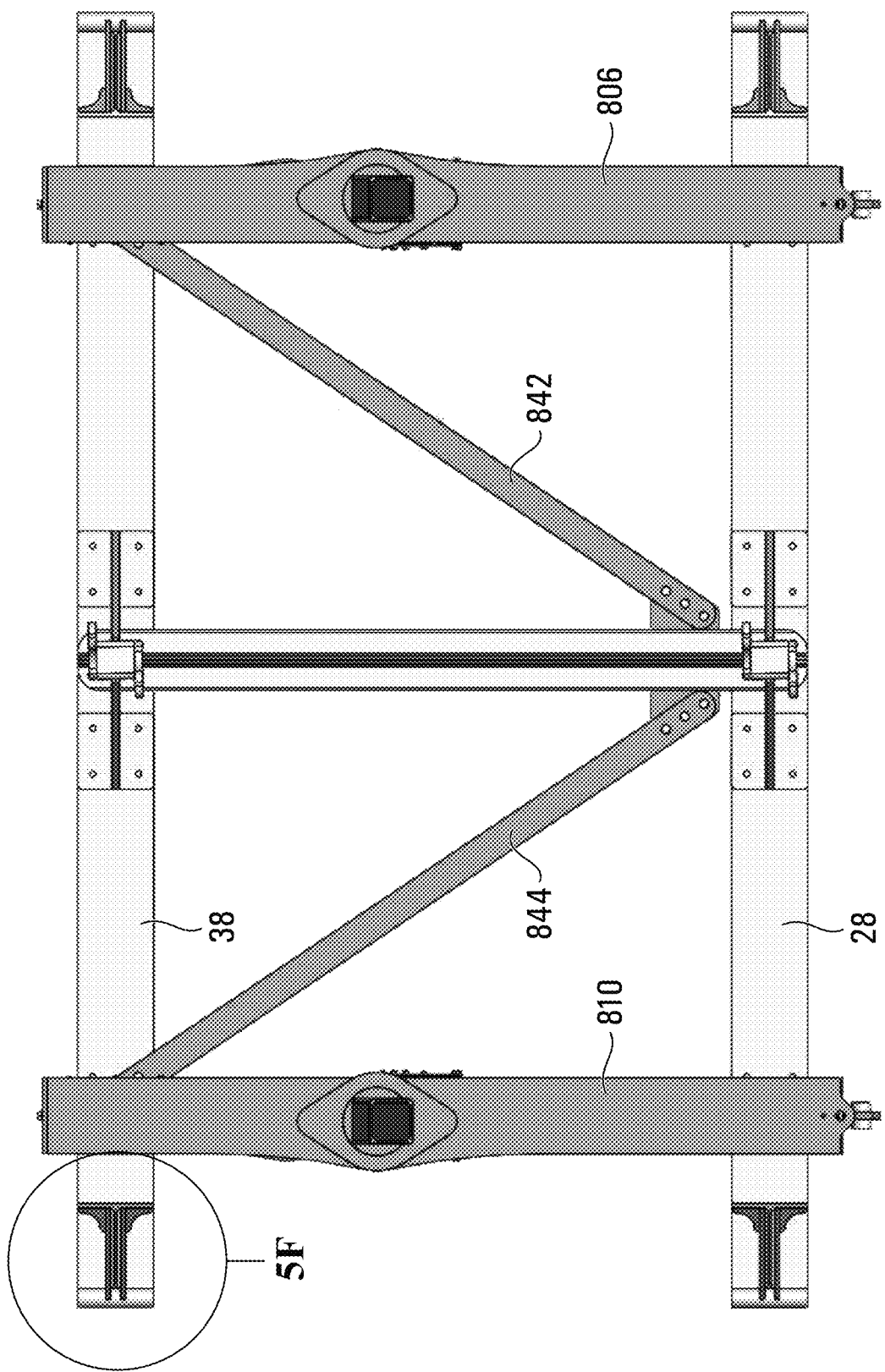

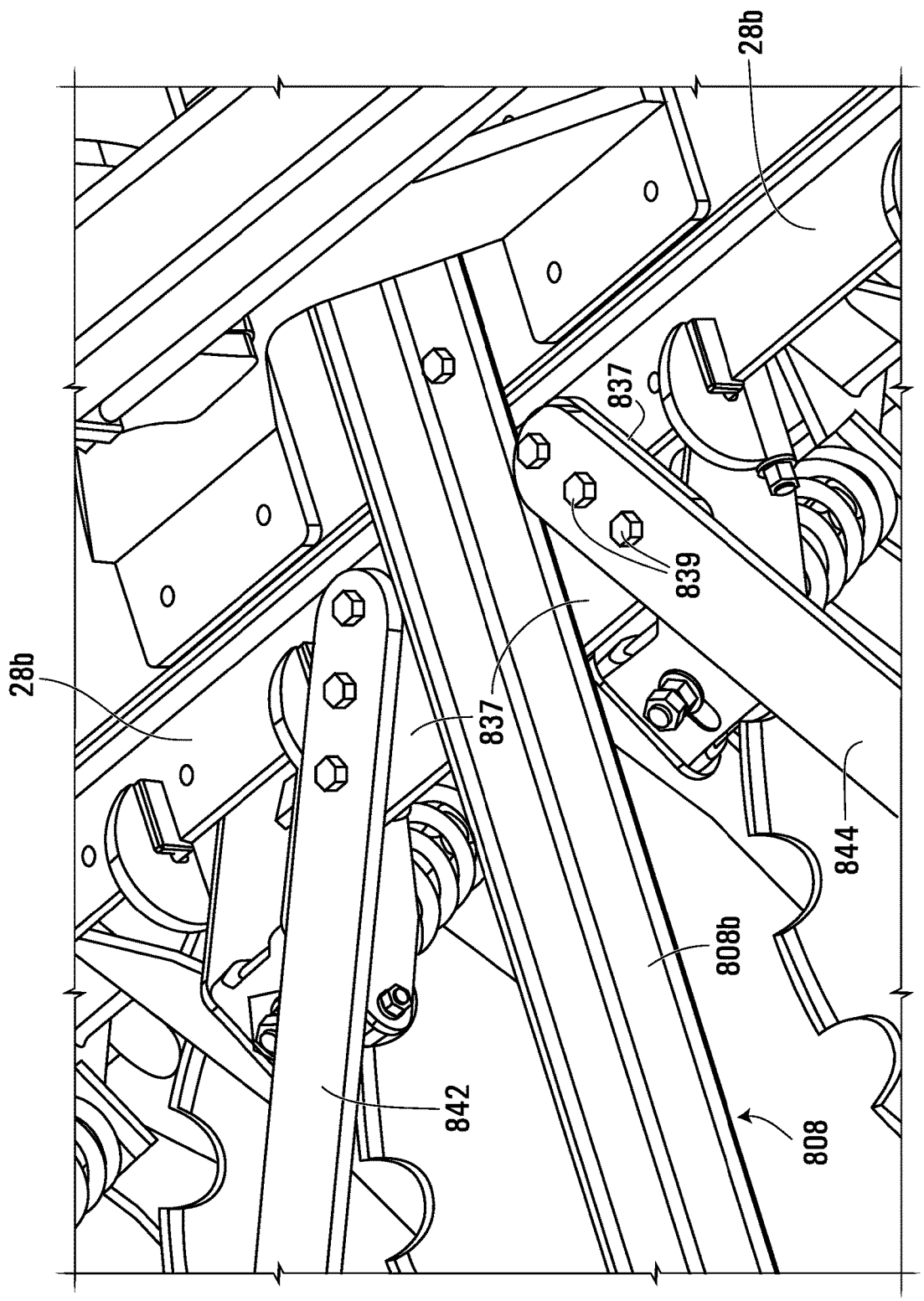

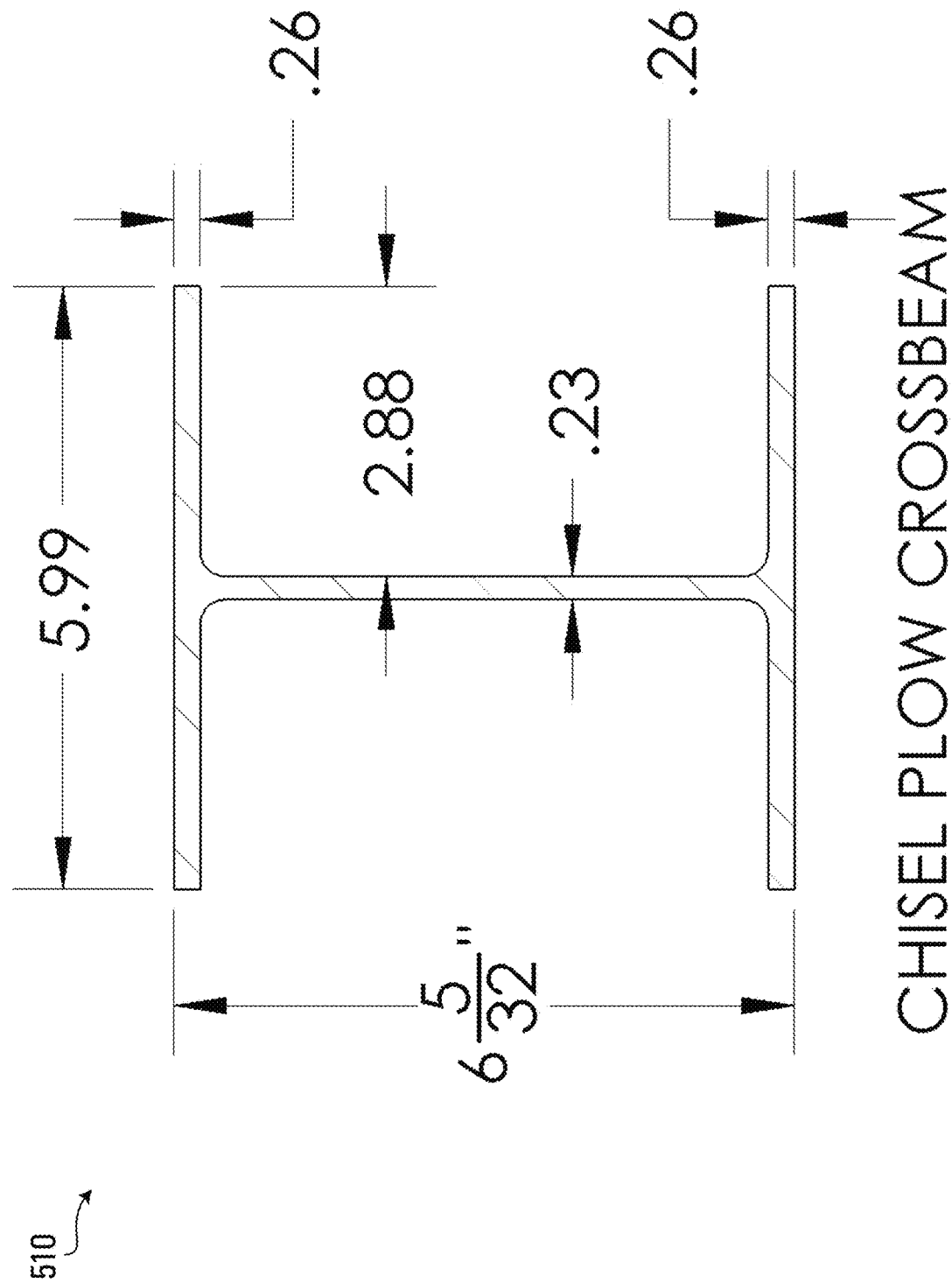

TILLAGE APPARATUSES AND RELATED METHODS

CROSS-REFERENCE TO RELATED APPLICATION

This application claims the benefit of U.S. Provisional Patent Application Ser. No. 62/523,192 filed on Jun. 21, 2017. The contents of the aforementioned application are incorporated by reference herein.

BACKGROUND

1. Field

This invention relates to tilling, including methods, systems, and apparatuses for facilitating tilling.

2. Description of Related Art

Tillage apparatuses may be driven/pushed/pulled over a field to be tilled and have one, but typically a plurality of, engagement members that may engage with the ground to dig, stir, or overturn the ground to a desired depth. The performance of a tillage apparatus in tilling the ground in a particular area is related at least in part to the precision at which engagement members such as for example disks or chisel blades/plows, are positioned and held at a particular depth in the soil and/or other material forming the ground during the tilling process. This can be particularly challenging when the tilling process must be carried out over an area of ground that has an uneven surface and/or has sloped surface areas.

Tilling the ground accurately and relatively consistently to a desired tillage depth is important for several reasons. For example, when tilling to prepare the ground for seeding, it is important to till the ground to a relatively precise depth to provide a proper bed depth for placement of plant/crop seeds. This is particularly the case with so called "minimum till" farming which may currently be increasing in popularity in certain areas, and/or as a result of so called "organic farming". For example, the tilling of the ground may be desired at a depth of substantially 2 inches—and the seed may need to be planted for example at a depth of substantially 1 inch. However, using conventional tilling apparatuses, there may be often occurrences during the tilling process of an area of ground, where the ground is only tilled to 1.5 inches. The result may be that there is hard, untilled ground below the tilled depth, such that planted seeds at 1 inch in depth may have their growth impeded and/or they may suffer root rot due to poor drainage. If, however, the ground is tilled too deeply, such as in this example notably more than 2 inches, then surface moisture may drain too deeply into the ground for the planted seeds to significantly benefit during initial growth, thus also impeding their growth. Excess tillage depth may also cause a seeding apparatus operable to place seeds into tilled ground, to place the seeds at a depth that is deeper than intended or desired. This may result due to the operation of a seeding depth gauge mechanism of the seeding apparatus, when operating on excessively soft soil, causing the seeding apparatus to place the seeds more deeply in the soft soil than desired and/or intended. This may result in poor plant emergence and/or poor plant emergence.

Providing tillage apparatuses that can consistently and precisely till ground surfaces to a precise depth that may be uneven and/or includes slopes, has been challenging.

Traditional tillage apparatuses typically include rigid frames which lack flexibility and may be unable to follow the terrain of a contoured ground surface. This is particularly the case in large scale farming operations where to be able to efficiently till a very large surface area (eg. thousands of acres), it is desirable to have relatively wide tilling apparatuses that can till a wide area in one single longitudinal movement/in each pass through the surface area (eg. a tilling apparatus in the range of 10 feet to 70 feet or more in transverse width). The width of the tillage apparatus may normally be limited by factors that include the pulling power of the propulsion unit (eg. tractor); the strength of the tillage structure and its components; and the ability of the tillage apparatus to be oriented in a transportation configuration so it may be transported (eg. such being able to be transported on roadways).

Traditional tillage apparatuses may be unable to provide a consistent tillage depth across a wide tillage pathway.

Some known tillage apparatuses may lack reliability and may require significant maintenance to keep them running. Some tillage apparatuses may not be able to accurately control depths at which the ground engaging members engage with the ground, especially in view of a contoured or sloped ground. In some cases, inconsistent ground engagement may result in the tillage apparatuses moving laterally or skewing as they travel across the ground.

Accordingly, improved tilling apparatuses are desirable.

SUMMARY

In one embodiment, the present disclosure relates to an apparatus operable for supporting one or more agricultural tools. The apparatus comprises a frame and the frame comprises a transversely oriented open member having an upper flange and a lower flange and a web interconnecting the upper flange and the lower flange; a longitudinally oriented open member having an upper flange and a lower flange and a web interconnecting the upper flange and the lower flange; the longitudinally oriented open member having an opening through the web configured to receive the transversely oriented member there through; the lower flange of the transversely oriented member being fixedly connected to the lower flange of the longitudinally oriented member.

In another embodiment, the present disclosure relates to an apparatus operable for supporting one or more agricultural tools. The apparatus comprises a frame that includes a transversely oriented open member having an upper flange and a lower flange and a web interconnecting the upper flange and the lower flange; a longitudinally oriented open member having an upper flange and a lower flange and a web interconnecting the upper flange and the lower flange; the longitudinally oriented open member having an opening through the web configured to receive the transversely oriented member there through; the upper flange of the transversely oriented member being fixedly connected to the web of the longitudinally oriented member.

In another embodiment, the present disclosure relates to an apparatus operable for supporting one or more agricultural tools. The apparatus comprises a frame and the frame comprises at least one frame section. The at least one frame section comprises a first transversely oriented open member having an upper flange and a lower flange and a web interconnecting the upper flange and the lower flange; a second transversely oriented open member having an upper flange and a lower flange and a web interconnecting the upper flange and the lower flange; a first longitudinally oriented open member having an upper flange and a lower flange and a web interconnecting the upper flange and the lower flange; the first longitudinally oriented open member having a first opening through the web configured to receive the first transversely oriented member there through and a second opening through the web configured to receive the second transversely oriented member there through; a second longitudinally oriented open member having an upper flange and a lower flange and a web interconnecting the upper flange and the lower flange; the second longitudinally oriented open member having a first opening through the web configured to receive the first transversely oriented member there through and a second opening through the web configured to receive the second transversely oriented member there through; the lower flange of the first longitudinally oriented member being fixedly connected to the lower flange of the first transversely oriented member and being fixedly connected to the lower flange of the second transversely oriented member.

In another embodiment, the present disclosure relates to an apparatus operable for engaging a ground surface when moved in a direction of travel across the ground surface. The apparatus comprises a frame and the frame comprises a first transversely oriented open member having an upper flange and a lower flange and a web interconnecting the upper flange and the lower flange; a second transversely oriented open member having an upper flange and a lower flange and a web interconnecting the upper flange and the lower flange; the first transversely oriented open member being transversely axially aligned with the second transversely oriented open member; a pivotal connector operable to provide a pivoting connection between the first transversely oriented open member and the second transversely oriented open member.

In another embodiment, the present disclosure relates to an apparatus that comprises a row of open members, each of the open members comprises at least one flange defining at least one open recess along a length of the open member; and one or more pivotal connectors, each of the one or more pivotal connectors coupled between an adjacent pair of open members in the row for facilitating a pivotal connection between the adjacent open members such that the adjacent open members are operable to pivot to orientations generally parallel to a contour of the surface when the apparatus is moved across the surface; at least one ground engager coupled to the at least one flange of each of the open members and configured to engage the surface when the apparatus is moved across the surface.

In another embodiment, the present disclosure relates to an apparatus that comprises a first row of transversely oriented open members, each of the open members in the first row comprising at least one flange defining at least one open recess along a length of the open member; a second row of transversely oriented open members, each of the open members in the second row comprising at least one flange defining at least one open recess along a length of the open member; a first pivotal connection device between an adjacent pair of open members in the first row for facilitating a pivotal connection between the adjacent open members of the first row such that the adjacent open members are operable to pivot about a first longitudinal axis; a second pivotal connection device between an adjacent pair of open members in the second row for facilitating a pivotal connection between the adjacent open members of the second row such that the adjacent open members are operable to pivot to orientations such that the adjacent open members are operable to pivot about a second longitudinal axis that is generally parallel to the first longitudinal axis; a plurality of ground engagers coupled to the at least one flange of each of the open members in the first and second rows and configured to engage the surface when the apparatus is moved across the surface.

In another embodiment, the present disclosure relates to a mounting apparatus for mounting a ground engager to a member. The member comprises first and second opposed flanges. The apparatus comprises a first flange coupler configured to be coupled to the first flange of the open member, the first flange coupler comprising a first flange receiving guide having one or more flange securing surfaces that define a first narrowing flange securing recess for receiving the first flange; a second flange coupler configured to be coupled to the second flange of the open member, the second flange coupler comprising a second flange receiving guide having one or more flange securing surfaces that define a second narrowing flange securing recess for receiving the second flange; at least one mount tightening device interconnecting the first and second flange couplers, the at least one mount tightening device; the ground engager being connected to one of the first flange coupler and the second flange coupler; the mount tightening device being operable to be adjusted to move said first and second flange couplers towards each other so that the first narrowing flange securing recess of the first flange receiving guide is moved onto the first flange and the second narrowing flange securing recess of the second flange receiving guide is moved onto the second flange to secure the first and second flange couplers on respective first and second flanges.

In another embodiment, the present disclosure relates to a mounting apparatus for mounting a ground engager to a member. The member comprising first and second opposed flanges. The apparatus comprises a first flange coupler comprising a first flange receiving guide having one or more flange securing surfaces that define a first narrowing flange securing recess for receiving the first flange and a second laterally spaced flange receiving guide having one or more flange securing surfaces that define a second narrowing flange securing recess for receiving the first flange; a second flange coupler comprising a third flange receiving guide having one or more flange securing surfaces that define a third narrowing flange securing recess for receiving the first flange and a fourth laterally spaced flange receiving guide having one or more flange securing surfaces that define fourth narrowing flange securing recess for receiving the first flange; a mount tightening apparatus interconnecting the first and second flange couplers. The ground engager being connected to one of the first flange coupler and the second flange coupler; the mount tightening being operable to be adjusted to move the first and second flange couplers towards each other so that the first narrowing flange securing recess of the first flange receiving guide is moved onto the first flange and the second narrowing flange securing recess of the second flange receiving guide is moved onto the second flange to secure the first and second flange couplers on respective first and second flanges.

In another embodiment, the present disclosure relates to an apparatus for mounting a component to an open member, the open member comprises at least two flanges including a first flange and a second flange. The apparatus comprises a first flange coupler configured to be coupled to the first flange of the open member, the first flange coupler comprising a first flange receiving guide having one or more flange securing surfaces that define a first narrowing flange securing recess for receiving the first flange; a second flange coupler configured to be coupled to the second flange of the open member, the second flange coupler comprising a second flange receiving guide having one or more flange securing surfaces that define a second narrowing flange securing recess for receiving the second flange; at least one mount tightener linking the first and second flange couplers, the at least one mount tightener having at least one variable length.

In another embodiment, the present disclosure relates to a disc for use with a tillage apparatus, the disc formed with a plurality of angularly spaced circumferential gaps.

In another embodiment, the present disclosure relates to an apparatus operable for engaging a ground surface when moved across the ground surface, the apparatus comprising a frame, the frame comprising at least one frame section, the at least one frame section comprises a first transversely oriented member; a second transversely oriented member; a first longitudinally oriented member; a second longitudinally oriented member; the first and second transversely oriented members interconnected to the first and second longitudinally oriented member; the first transversely oriented member extending transversely further in a first direction than the second transversely oriented member to form a first transverse extension; the second transversely oriented member extending transversely further in a direction opposite to the first direction than the first transversely oriented member; a first set of ground engagers coupled to the first transversely oriented member and configured to engage the surface when the apparatus is moved across the surface; the first set of ground engagers oriented at a first angle to the longitudinal direction; a second set of ground engagers coupled to the first transversely oriented member and configured to engage the surface when the apparatus is moved across the surface; the second set of ground engagers oriented at a second angle to the longitudinal direction that is in an opposite angular direction to the first angle and which is directed inwardly in relation to the frame section.

In another embodiment, the present disclosure relates to an apparatus for releasing pressure on a ground engager when the ground engager is engaged with a ground surface. The apparatus comprises a support; a longitudinally oriented spring; a rod located and extending lengthwise within the spring; the rod having a first distal end portion interconnected to the ground engager; the rod have a second opposite end portion supported by the support; a rotator cuff device mounted to the support and the rotator cuff operable to support the rod proximate the second end; the rotator cuff operable to permit the second end portion of the rod to pivot when the spring is subjected to a force above a threshold level; a distal spring support mounted proximate the second end portion of the rod and interconnected to the ground engager; the rotator cuff device and the distal spring support operable to hold the spring in compression there between, such that the spring is operable to exert an axial force on the distal spring support and on the interconnected ground engager; wherein in operation, when an external force is imparted on the ground engager that creates a force on the spring that exceeds the threshold level, the rod, the spring and the rotator cuff will rotate causing the ground engager to rotated to effect a reduction in the force imparted on the ground engager.

In another embodiment, the present disclosure relates to an apparatus for releasing pressure on a ground engager when the ground engager is engaged with a ground surface. The apparatus comprises a support; a spring device mounted on the support and operable for pivoting movement between an engagement position and a tripped position; the spring device operable for releasably exerting a biasing force on the ground engager; wherein in operation, when an external force is imparted on the ground engager that creates a force on the spring that exceeds a threshold level, the rod, the spring device will pivot causing the ground engager to pivot to effect a reduction in the force imparted on the ground engager.

In another embodiment, the present disclosure relates to an apparatus that comprises a frame; a front wheel assembly mounted to the frame, the front wheel assembly having a front wheel and a front leg support assembly; the front leg support assembly operable to provide variable height positioning of the front wheel relative to the frame; a rear wheel assembly mounted to the frame the rear wheel assembly having a rear wheel and a rear leg support assembly; the rear leg support assembly operable to provide variable height positioning of the rear wheel relative to the frame; a drive device connected to both the rear wheel assembly and the frame, the drive device operable to adjust and hold the height between rear wheel and the frame.

In another embodiment, the present disclosure relates to a method for correcting a direction of travel of a tillage apparatus moving across a ground surface, the tillage apparatus having a front row of ground engagers and a rear row of ground engagers engaging the ground surface, the front row of ground engagers being supported by a plurality of front wheeled support units each mounted for rotation, the method comprises receiving at a controller, at least one rotation signal representing a rotation of one of the front wheeled support units; causing the controller to determine whether the rotation of the front wheeled support unit is indicative of a deviation in the direction of travel of the tillage apparatus with respect to a desired direction of travel; and in response to a determination by the controller that there is a deviation in the direction of travel, causing the controller to generate control signals to increase or decrease engagement of the front row of ground engagers with respect to the rear row of ground engagers to produce a side force operable to counteract the deviation in the direction of travel.

In another embodiment, the present disclosure relates to an apparatus for correcting a direction of travel of a tillage apparatus moving across a ground surface, the tillage apparatus having a front row of ground engagers and a rear row of ground engagers engaging the ground surface, the front row of ground engagers being supported by a plurality of front wheeled support units each mounted for rotation, the apparatus comprises a controller; at least one rotation sensor operably configured to produce a rotation signal representing a rotation of one of the front wheeled support units; wherein the controller is operably configured to determine whether the rotation of the front wheeled support unit is indicative of a deviation in the direction of travel of the tillage apparatus with respect to a desired direction of travel; and wherein the controller is operably configured to, in response to a determination that there is a deviation in the direction of travel, generate control signals to increase or decrease engagement of the front row of ground engagers with respect to the rear row of ground engagers to produce a side force operable to counteract the deviation in the direction of travel.

In another embodiment, the present disclosure relates to a tillage apparatus the comprises a front row of ground engagers and a rear row of ground engagers for engaging the ground surface, the front and rear rows of ground engagers being supported on a frame; a frame height control system for controlling a height of the frame to control engagement of the front and rear rows of ground engagers; and a rear hitch for towing an accessory behind the tillage apparatus, the rear hitch being mounted on the frame and having a hitch point plate coupled to the frame via an actuator, the actuator being operable to cause a height of the hitch point plate to be raised or lowered in response to changes in height of the frame.

In another embodiment, the present disclosure relates to a method for controlling a height of a hitch point plate on a rear hitch for towing an accessory behind a tillage apparatus, the tillage apparatus having a front row of ground engagers and a rear row of ground engagers for engaging the ground surface, the front and rear rows of ground engagers being supported on a frame, the method comprises receiving a control signal from a frame height control system for controlling a height of the frame to control engagement of the front and rear rows of ground engagers; and causing an actuator coupling between the hitch point plate and the frame to cause a height of the hitch point plate to be raised or lowered in response to the control signal.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention,

FIGS. 4M and 4N are a perspective and front elevation view of a component of mounting mechanism forming part of the apparatus of FIG. 1;

FIG. 5B is a view of a central frame section shown in isolation, of the tillage apparatus of FIG. 1;

FIGS. 6B to 6F are top perspective views of parts of the tillage apparatus shown in FIG. 1;

FIG. 6C is a top plan view of the part of the tillage apparatus shown in FIG. 1;

FIGS. 17A, 17B and 17C are cross section views for example transverse and longitudinal members tillage apparatus 510;

DETAILED DESCRIPTION

Figure 1:
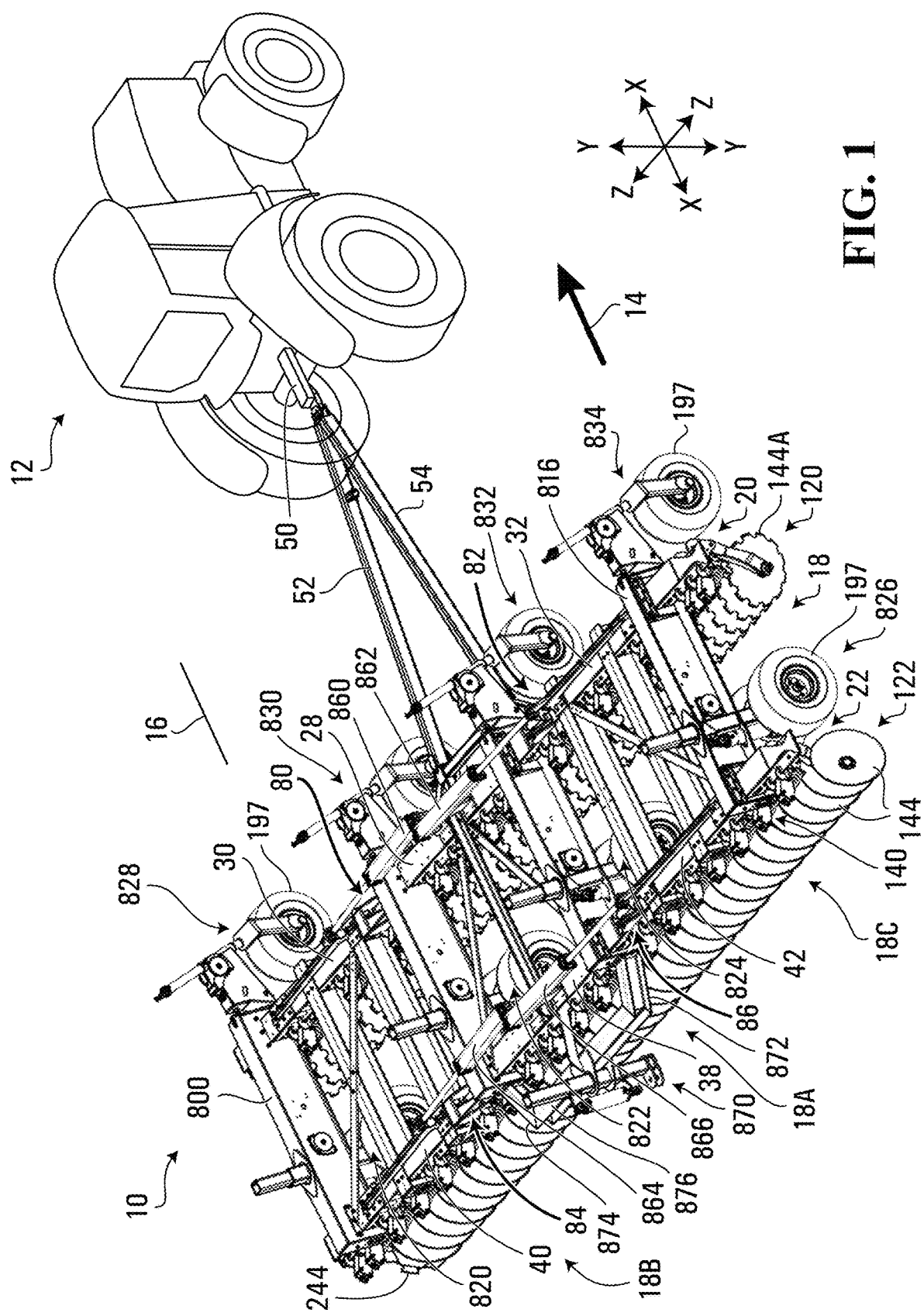
FIG. 1 is a perspective view of a tillage apparatus and propulsion apparatus according to an embodiment.

Referring to FIG. 1, a tillage apparatus 10 in accordance with one embodiment is shown. In operation, tillage apparatus 10 may be pulled behind a propulsion unit 12 in a direction of travel denoted by arrow 14 across a ground surface 16 and the tillage apparatus 10 may engage with and/or condition the surface 16 as it is moved in the direction of travel. In some embodiments, tillage apparatus 10 may include a plurality of ground engagers 140 which may have engagement tools such as for example discs 144, 144A which may be configured to penetrate into and engage with the material (eg. soil) defining the ground beneath the ground surface 16 and are moved through and till the soil, preferably at a desired and consistent depth within the ground material. Such engagement and/or conditioning may be used to prepare the ground material for planting and growing crops such as by preparing a seed bed as well as uprooting weeds and any cover crops to minimize competition for nutrients with the preferred crop.

Propulsion unit 12 may be a known type of tractor, which may be configured and adapted to pull tillage apparatus 10 via a tow hitch 50 connected to towing members 52 and 54 of tillage apparatus 10. Towing members 52, 54 may be closed or open channeled beam members that may be made from a suitably hard and strong material such as a steel such as by way of example a suitable structural steel. In some application, A36 mild steel, which is considered a structural steel with a yield strength of about 60K psi, may be employed. Stronger structural steels with higher yield strengths (eg. 80-100K psi) may be employed in other embodiments, depending upon expected operational and design loads.

In various embodiments, the propulsion unit 12 may be another vehicle capable of moving the tillage apparatus 10 and may include a propulsion unit operable to move tillage apparatus 10 from one operational location to another operational location may be a truck. In some embodiments, the propulsion unit 12 may be integrated with tillage apparatus 10.

Figure 6:
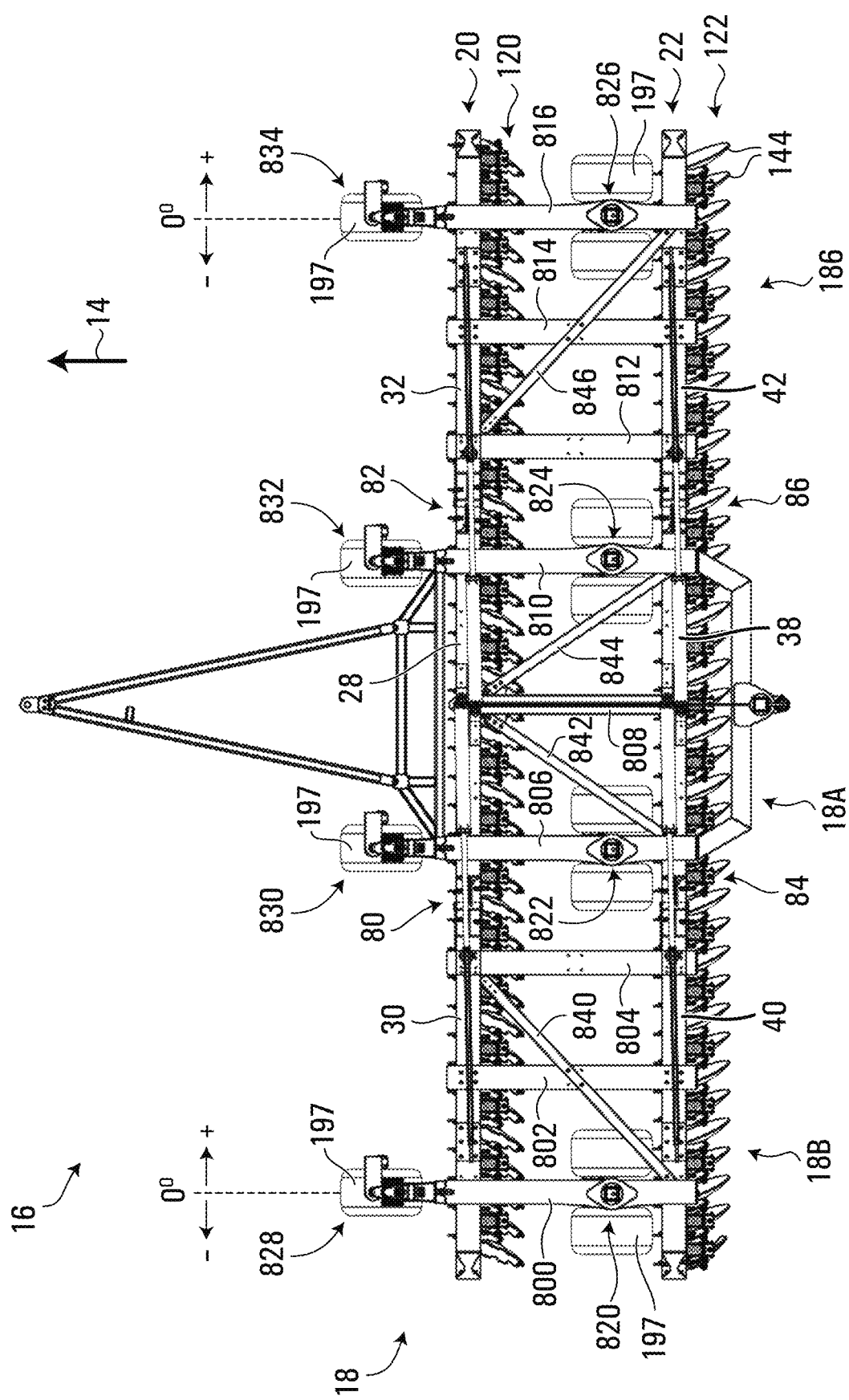
FIG. 6 is a top plan view of the tillage apparatus shown in FIG. 1.

Referring to both FIGS. 1 and 6, tillage apparatus 10 may include a frame 18 that included a plurality of components. Frame 18 may be adapted to be supported for movement on the ground surface 16 by a plurality of front wheeled support units 828, 830, 832, 834 and a plurality of rear wheeled support units 820, 822, 824 and 826, each having one, two or more wheels 197 mounted for rotation. It should be noted that given the level of weight carried by rear wheeled support units 820, 822, 824 and 826, and to provide enhanced lateral stability, such wheel support units may be double wheel units having two wheels 197 mounted transversely aligned with each other.

Frame 18 may in turn, support a plurality of rows, such as front and rear rows 120, 122, of ground engagers 140. Ground engagers 140 may include discs and chisel plows, both of which are described herein, as well as having other ground engaging tools or devices.

Frame 18 may include a plurality of transversely oriented (in direction Z in FIG. 1) structural members interconnected to a plurality of longitudinally oriented (direction X in FIG. 1) structural members. Frame 18 may be configured into a plurality of transversely positioned, frame sections, with a main, central section 18A, and one or more sections positioned on each transverse side of the central section, such as left side section 18B and right side section 18C (see FIGS. 1A and 6).

The transversely oriented structural members may include a front row of longitudinally axially aligned open members 20 and a rear row of longitudinally axially aligned open members 22. The structural open members in front and rear rows 20, 22 of open members may be made from one or more suitable materials such as a structural steel like A36 mild steel.

Figure 5A:
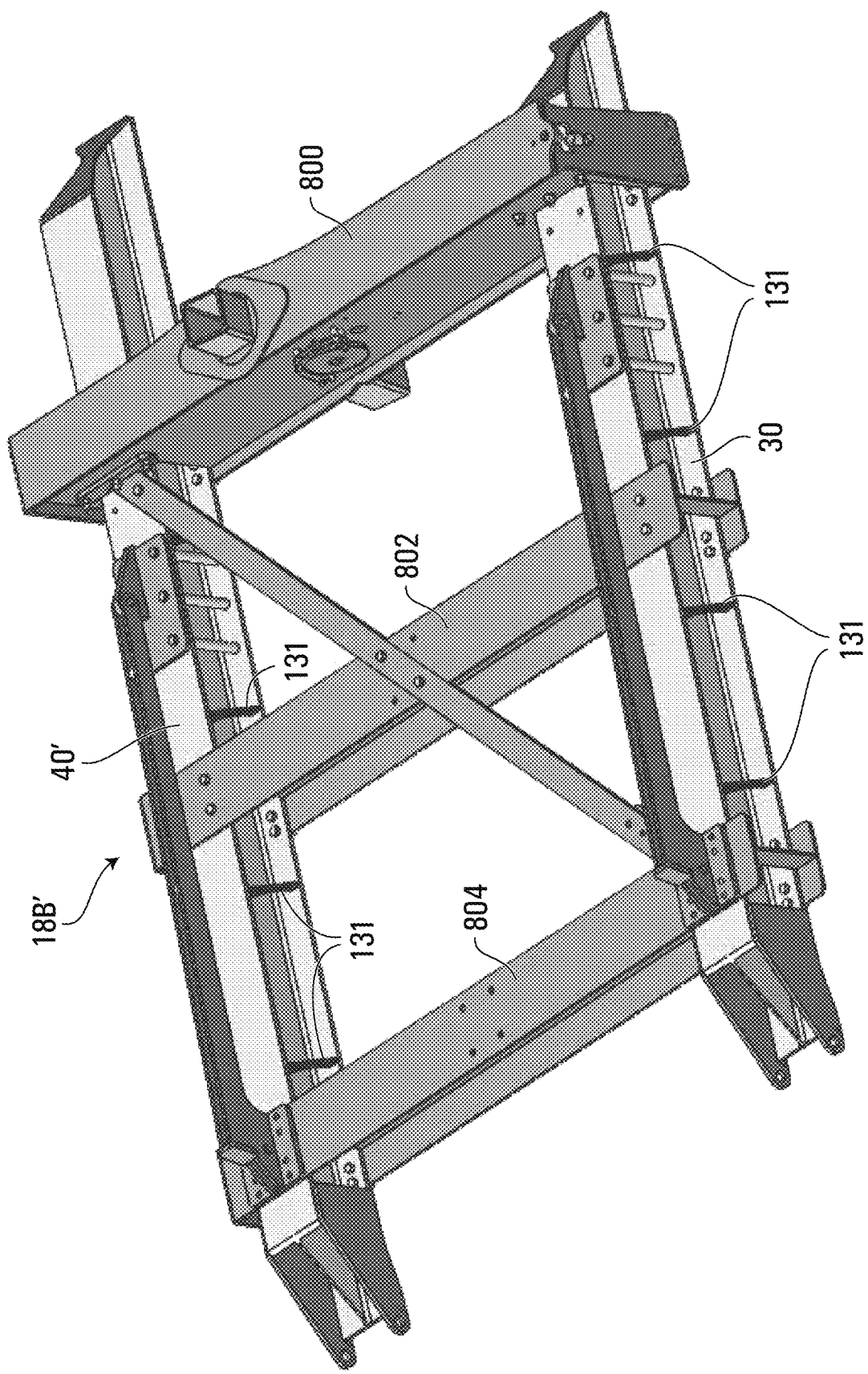
FIG. 5A is a front perspective view of an alternate left frame section shown in isolation, of the tillage apparatus of FIG. 1.

Front row open members 20 may include a center open member 28 in the central frame section 18A, a left open member 30 in the left frame section 18B, and a right open member 32 in the right frame section 18C. Similarly the rear row members 22 include a central open member 38 in the central frame section 18A, a left open member 40 in the left frame section 18B and a right open member 42 in the right frame section 18C. Open member 30 may be transversely axially aligned with open member 40; open member 28 may be transversely axially aligned with open member 38; and open member 32 may be transversely aligned with open member 42. With reference to FIG. 5A illustrating a slightly modified embodiment as described further below, front row transverse open member 30 and rear row open member 40' are shown.

As will be described in further detail below, frame 18 may also include a plurality of spaced open members 800, 802, 804, 806, 808, 810, 812, 814, and 816 which are generally oriented in a longitudinal direction (direction X in FIG. 1) and which interconnect open members in each of the front and rear rows 20 and 22 in each of the frame sections 18A, 18B, and 18C. The structural open members 800, 802, 804, 806, 808, 810, 812, 814, and 816 may also be made from one or more suitable materials such as a structural steel such as A36 mild steel. With reference to FIG. 5A, note longitudinal open members 800, 802, 804, interconnecting transverse open members 40' and 30 in frame section 18B'. It should be noted the different configuration of open member 800 compared to open members 802 and 804. Open member 800 is particularly configured to support wheel assemblies and associated frame lift mechanisms as described hereinafter.

Thus open members 800, 802, and 804 may interconnect open members 30 and 40/40' and thereby form a generally rectangular shaped frame section 18B; (open members 30 and 40 may be parallel or nominally or substantially parallel to each other); open members 806, 808 and 810 may interconnect open members 28 and 38 to form a generally rectangular shaped central frame section 18A (open members 28 and 38 may be parallel or nominally or substantially parallel to each other); and open members 812, 814 and 816 may interconnect open members 32 and 42 and thereby form a generally rectangular shaped side frame section 18C (open members 30 and 40 may be parallel or nominally or substantially parallel to each other).

With reference again to the front row 20 and rear row 22 of transversely oriented open members, each open member 28, 30, 32, 38, 40, 42 may be an open channel member that has a substantial amount of flexibility (particularly as compared to a closed channel member of comparable wall thickness dimensions and made from a comparable material) when, in operation, it is subjected to a twisting force about an axis in the X direction. Each of the open members 28, 30, 32, 38, 40, and 42 may include a web portion and may have at least one flange defining at least one open recess/channel along a length of the open member.

By way of example, in the embodiment shown in FIG. 1, each of the open members 28, 30, 32, 38, 40, and 42 may be a generally I-beam member including a generally vertically oriented, longitudinally extending central web portion interconnected or integrally formed with longitudinally extending, upper right and left side flanges, and lower left and right flanges. Such a member may be configured to be substantially equally flexible when subjected to twisting forces in both rotational directions about an axis in the Z direction along its length.

Open members 28, 30, 32, 38, 40, and 42 may be "wide flange" members which have flanges that have a greater thickness than the connecting central web. For example the flanges may have a thickness of about ½ inch which the central web may have a thickness of about ⅜ inch.

Figure 2:
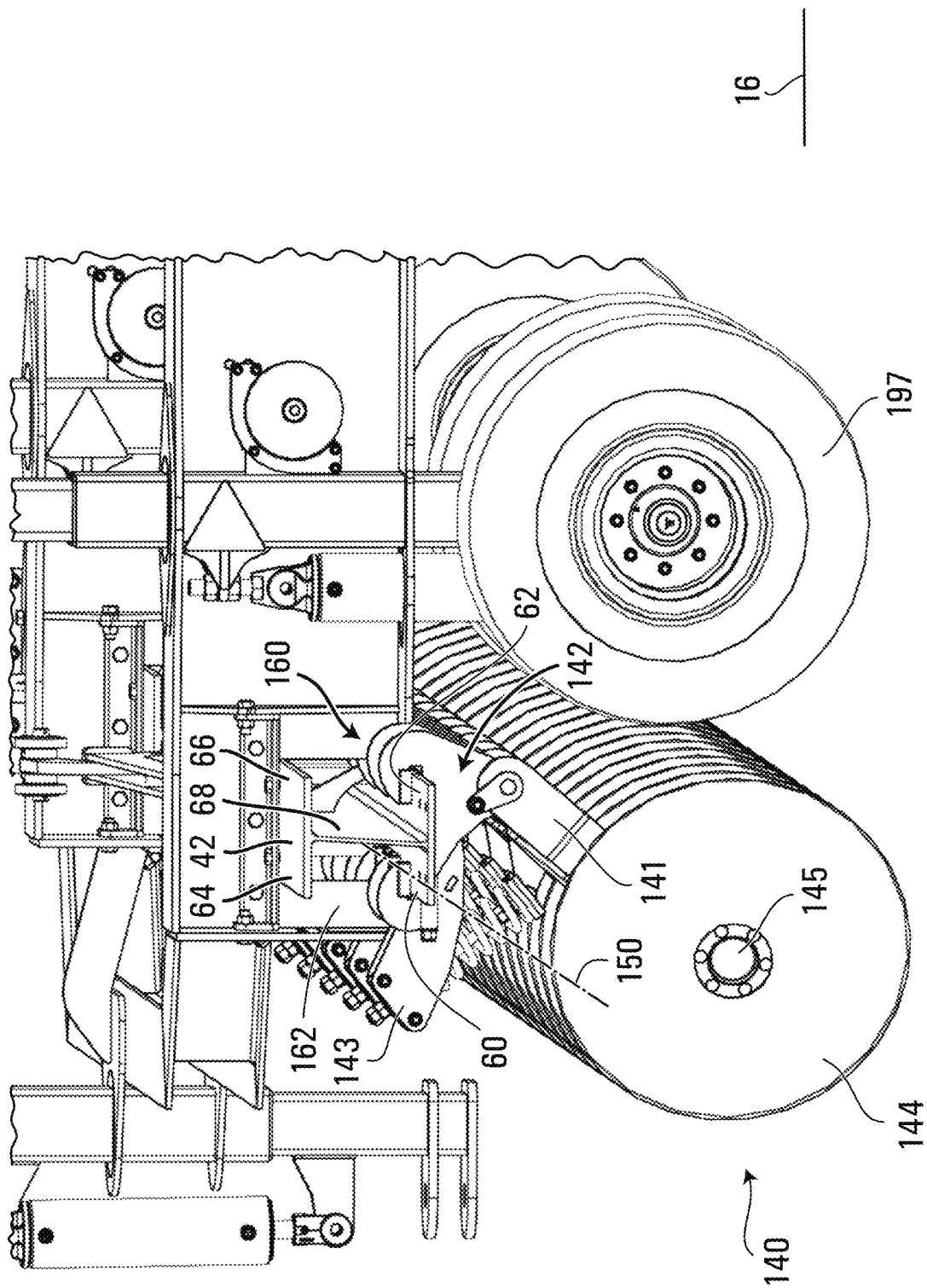
FIG. 2 is a side perspective view of a portion of the tillage apparatus shown in FIG. 1.

Referring now to FIG. 2, representative open member 42 of rear row open members 22 and front row open members 20 is shown in further detail. Open member 42 may include a central web 68 and orthogonally oriented flanges 60, 62, 64, and 66 extending from web 68. Lower flange 60, upper flange 64 and web 68 may define a rearwardly directed channel extending along the length of open member 42. Similarly, lower flange 62, upper flange 66 and web 68 may define a forwardly directed channel extending along the length of open member 42. Each of the open members 28, 30, 32, 38, and 40 shown in FIG. 1 may be configured to include substantially the same features as open member 42.

Referring back to FIG. 1, frame 18 may include a plurality of pivotal connectors between the transversely adjacent frame sections 18A/18B and the transversely adjacent frame sections 18A/18C. For example, transversely positioned adjacent frame sections, may each have a plurality of pivotal connectors that permit the frame sections 18A, 18B to be pivoted relative to each other about an axis oriented in direction X (FIG. 1). Similarly, a plurality of pivotal connectors that permit the frame sections 18A, 18C to be pivoted relative to each other about an axis oriented in direction X (FIG. 1). Thus, a frontal pivotal connector 80 may be provided between open members 28 and 30; a frontal pivotal connector 82 may be provided between open members 28 and 32; a rearward pivotal connector 84 may be provided between open members 38 and 40; and a rearward pivotal connector 86 may be provided between open members 38 and 42. Each of the pivotal connectors 80, 82, 84, and 86 may facilitate a pivotal connection between adjacent open members such that the adjacent connected open members are operable to pivot from a generally upright position (that may be a storage orientation of a side section 18B, 18C) to an operational orientation which may typically be generally supported on a contour of the surface 16 when the tillage apparatus 10 is positioned on surface 16.

Figure 3:
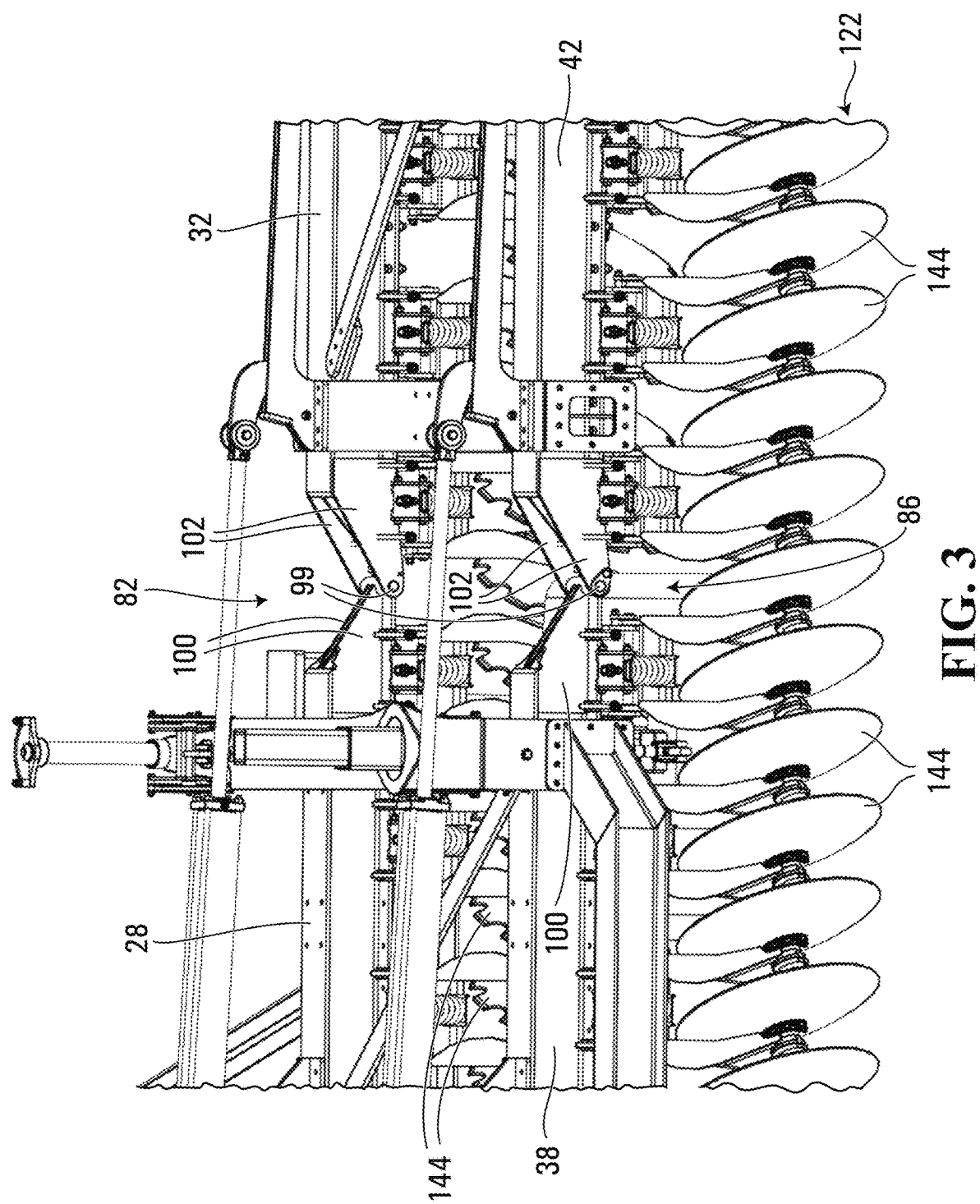
FIG. 3 is a rear perspective view of a portion of the tillage apparatus shown in FIG. 1.

Referring to FIG. 3, a detailed rear perspective view of representative pivotal connectors 82 and 86 is provided between open members 28 and 32 and between open members 38 and 42 to pivotally interconnect frame section 18A and 18C. Pivotal connector 82 may include first and second connector plate pair portions 100a, 100b, and 102a, 102b which may be connected such as by welding, to the open members 28 and 32 respectively. Pivotal connector 86 may be constructed in a similar manner an may include first and second connector plate pair portions 100a, 100b and 102a, 102b which may be connected such as by welding, to the open members 28 and 32 respectively.

With particular reference to FIGS. 5B to 5F (which relate to a modified frame section 18C' as described below) illustrated in detail are components of representative connector like pivotal connectors 82 and 86.

Figure 5C:
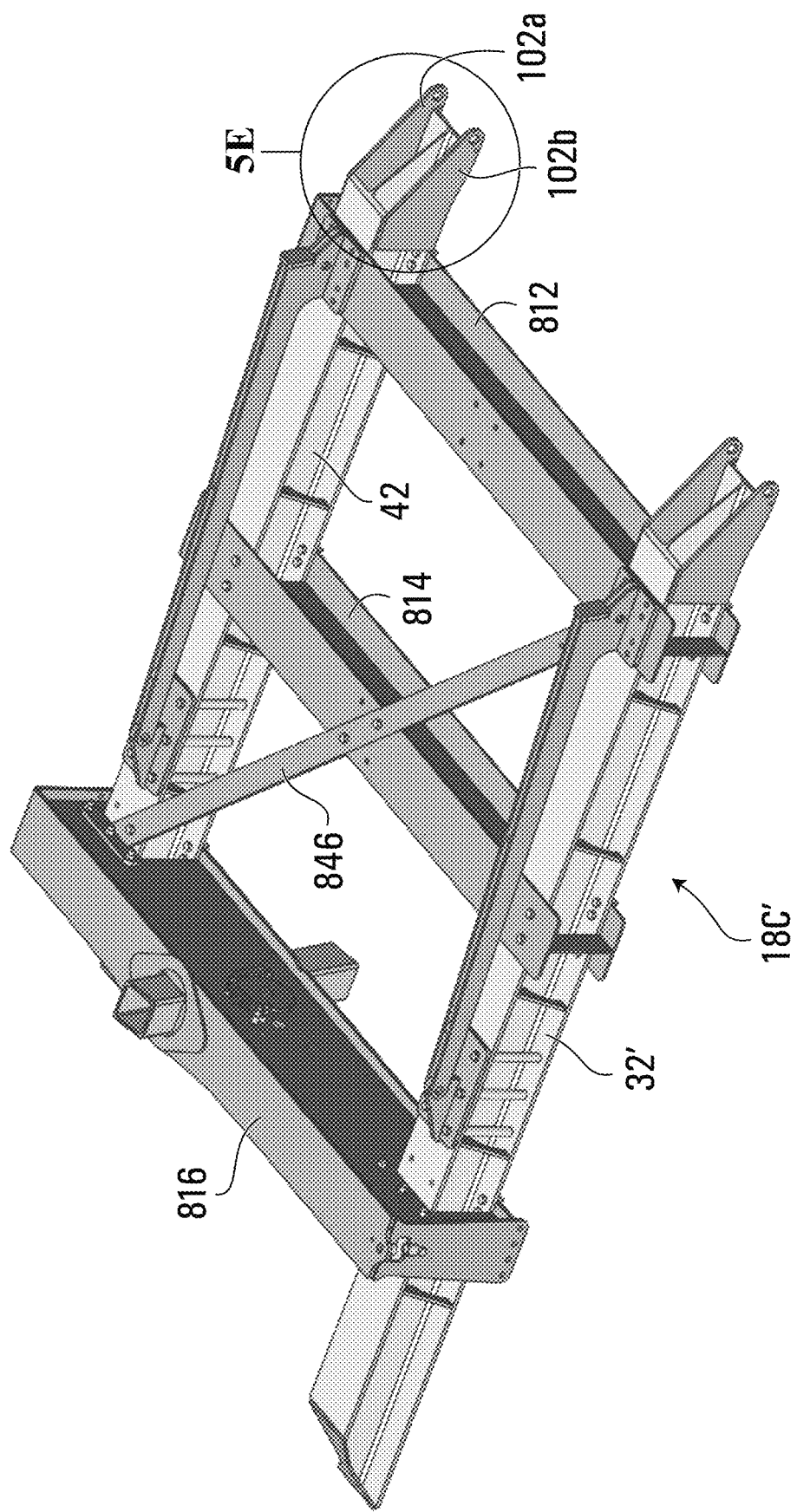
FIG. 5C is a front perspective view of an alternate right frame section shown in isolation, of the tillage apparatus of FIG. 1.
Figure 5D:
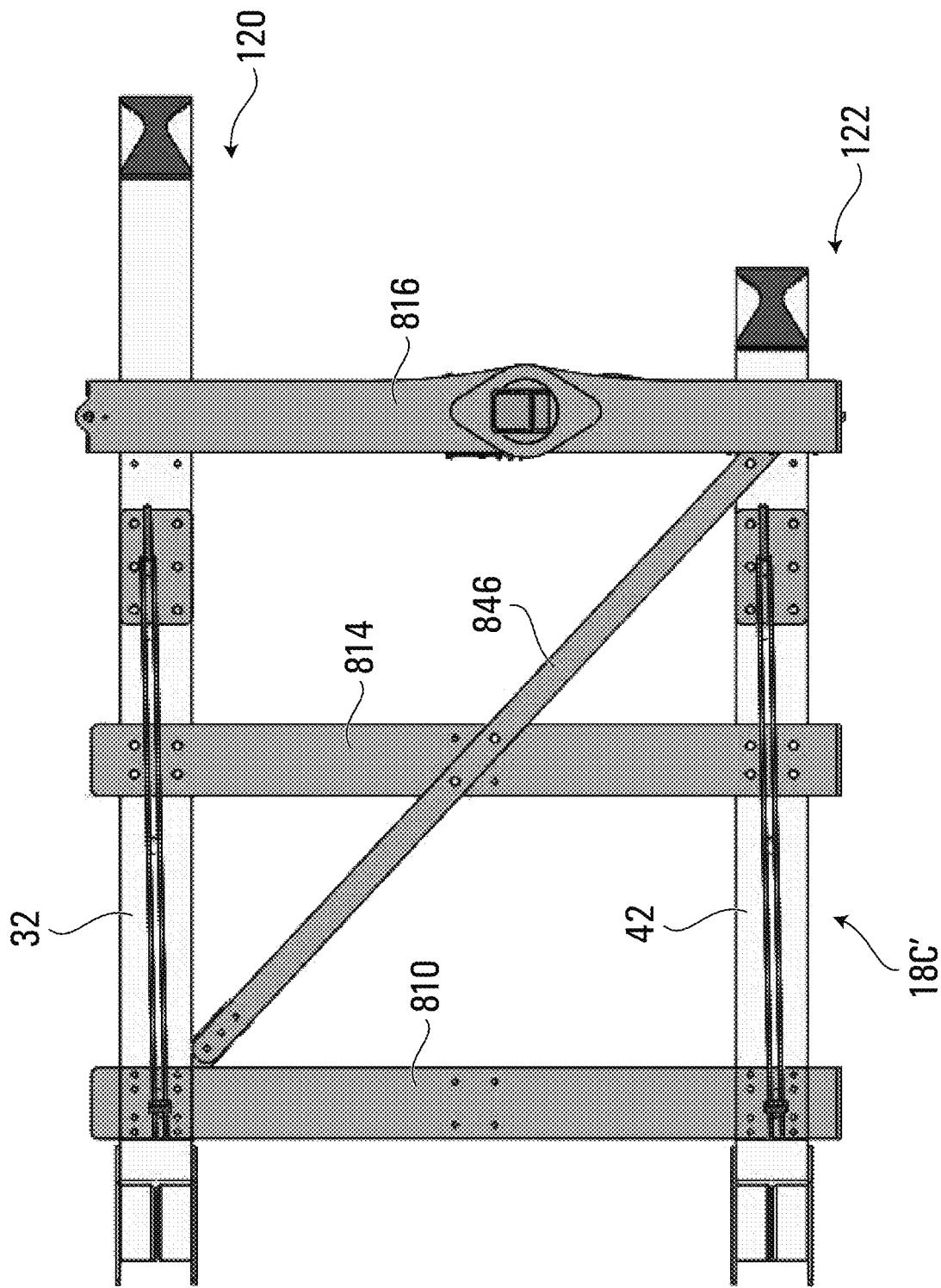
FIG. 5D is a front plan view of the right frame section of FIG. 5C shown in isolation.
Figure 5E:
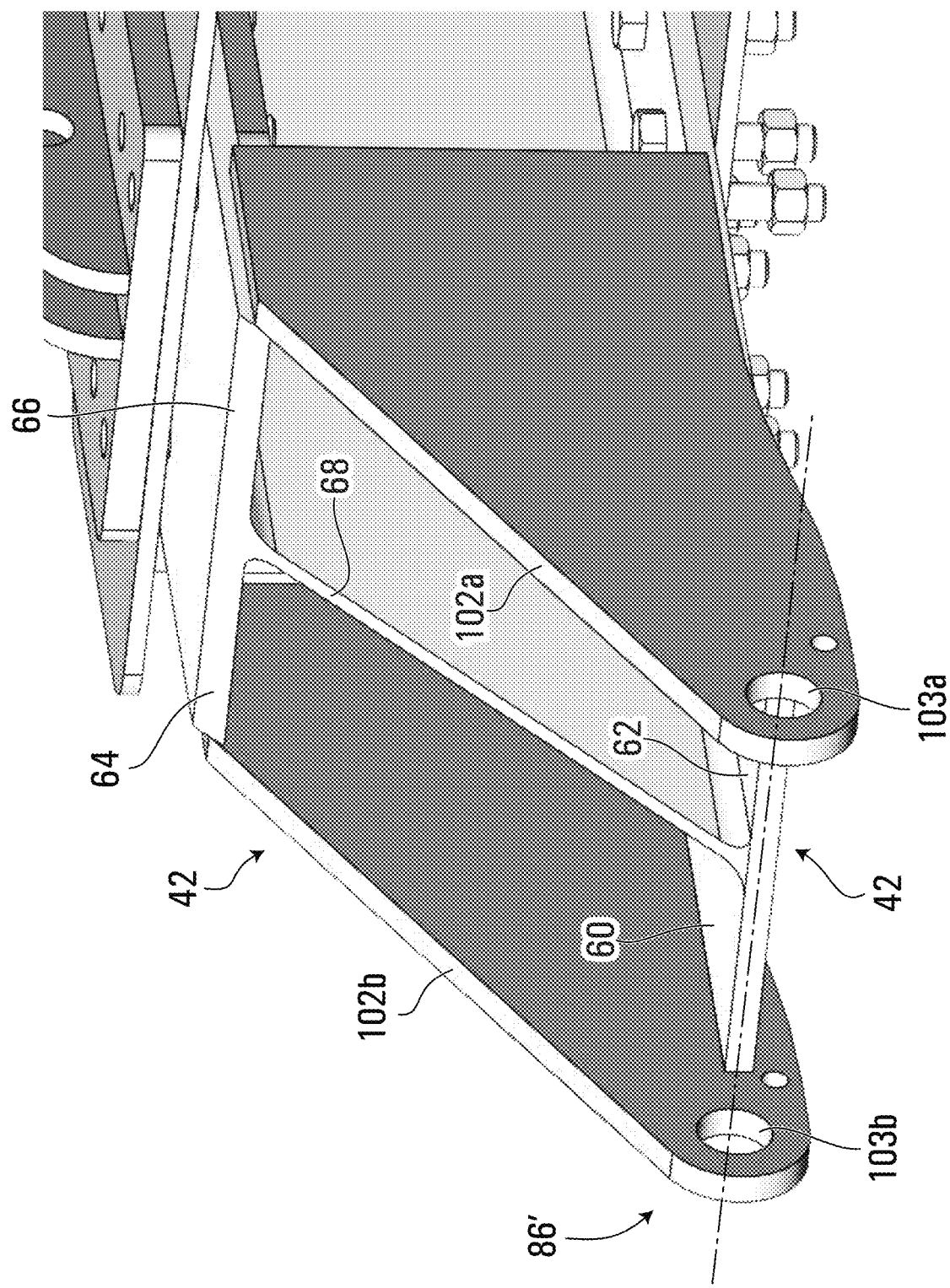
FIG. 5E is an enlarged view of a portion of the right frame section of FIG. 5C, marked as 5E.

As shown in FIGS. 5C and 5E, one part of a two part pivotal connector that is part of frame section 18C is illustrated. Connector plate 102a may be fixedly attached such as by welding in a vertical and transverse orientation to outer edges of respective upper flange 64 and lower flange 60 of open member 42. Similarly connector plate 102b may be fixedly attached such as by welding in a vertical and transverse orientation to outer edges of respective upper flange 66 and lower flange 62 of open member 42. Connector plate 102a may have a lower cylindrical opening 103a, and connector plate may have an axially aligned lower cylindrical opening 103b. Connector plates 102a, 102b, may not be directly attached to the central web 68 of member 42.

Figure 5F:
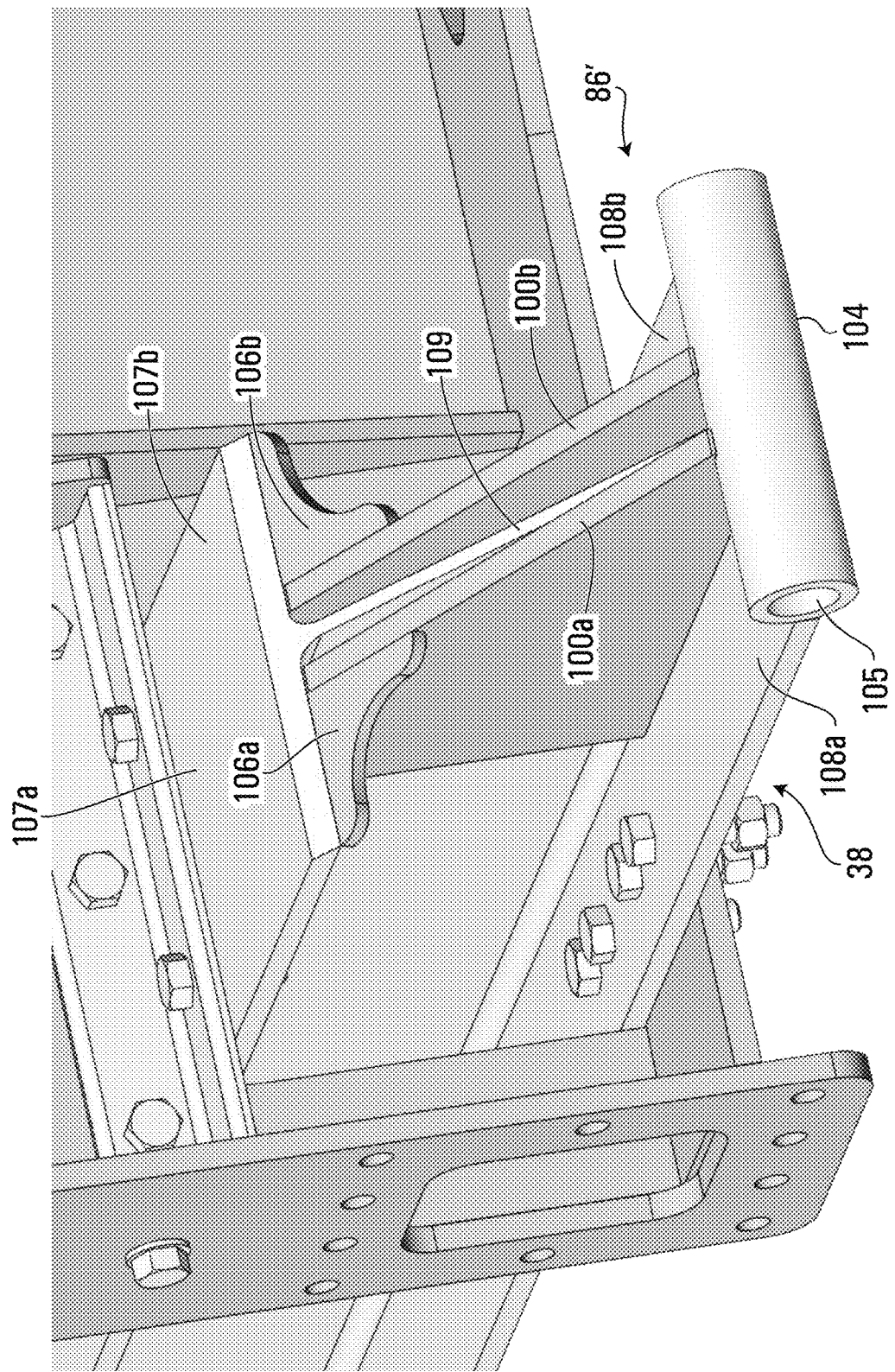
FIG. 5F is an enlarged view of a portion of the central frame section of FIG. 5B, marked as 5F.

As shown in FIGS. 5A and 5F, the second part of the pivotal connector that is part of frame section 18C is illustrated. Connector plate 100 and connector flange page 106a may be fixedly attached such as by welding in a vertical and transverse orientation to outer edges of respective upper flange 107a and lower flange 108a of a transverse open member of a central frame section 18 such as and rear open member 38. Similarly connector plate 100b and connector flange 106b may be fixedly attached such as by welding in a vertical and transverse orientation to outer edges of respective upper flange 107b and lower flange 108b of open member 42. Connector plates 100a, 100b, may not be directly attached to the central web of member 38.

A lower cylindrical tube 104 secured at lower ends to connector plates 100a, 100b. Cylindrical tube 104 may have an axially extending opening. 105. When cylindrical tube 105 is received between cylindrical openings 103a, 103b, all the openings may be axially aligned and may permit the reception of a connecting pivot pin member (not shown) there though. This will provide a pivotal connection between connector plates 100a, 100b and connector plates 102a, 102b that ties together flanges 107a, 107b, 108a, 108b of member 38 with flanges 64, 66 and 60, 62 of member 42 without tying the respective webs of the open members.

This hinge mechanism fully ties the top and bottom flanges of open members 28 and 32, (and similarly the open members 38 and 42; members 28 and 30; and members 38 and 40) and permits the transmission of torsional forces between the open members through the hinge mechanism. The hinge mechanism may be sufficiently strong to be able to perform these functions reliably and over a significant period of use and repetitive cycles of loading. At the same time, the design is such that it will typically not significantly limit the torsional flexibility of the vertical webs of open members 28 and 32. It should be noted that the term I-Beam is intended not to be restricted to members where the thickness of the flange portions may be similar to the thickness of the web portions. In some desired embodiments, the thickness of the flange portions may be substantially greater than the thickness of the web portion. This may allow greater design flexibility.

Each of the pivotal connectors 80, 84, and 86 may include features generally constructed in a manner substantially the same as pivotal connector 82 to provide pivotal connections between adjacent transversely oriented open members in the front row of longitudinally axially aligned open members 20 and pivotal connections between adjacent transversely oriented open members in rear row of longitudinally axially aligned open members 22.

Referring again to FIG. 1, tillage apparatus 10 may also include a first row 120 of ground engagers 140 and a second row 122 of ground engagers 140. Each of the ground engagers 140 of the first and second rows 120, 122 may be coupled to a pair of flanges of one of the open members 28, 30, 32, 38, 40, and 42 of the respective front row of open members 20 or rear row of open members 22. Ground engagers of first and second rows 120, 122 may be configured to penetrate the ground surface 16 and move through the material forming the ground to till the ground material when tillage apparatus 10 is moved across an area of ground surface 16.

Figure 5G:
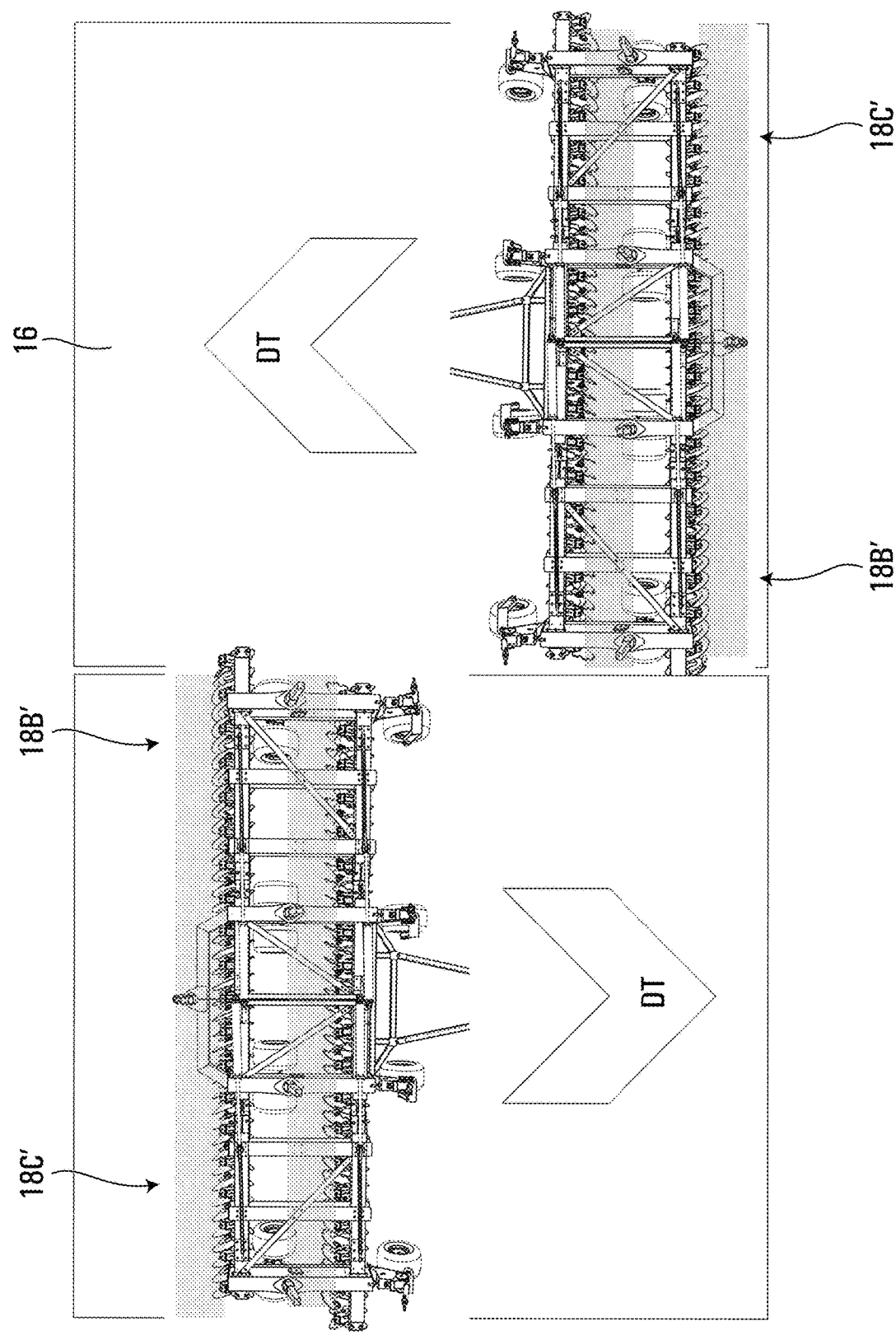
FIG. 5G is a top plan showing the path of two passes of the tillage apparatus of FIG. 10 over a ground surface.
Figure 5H:
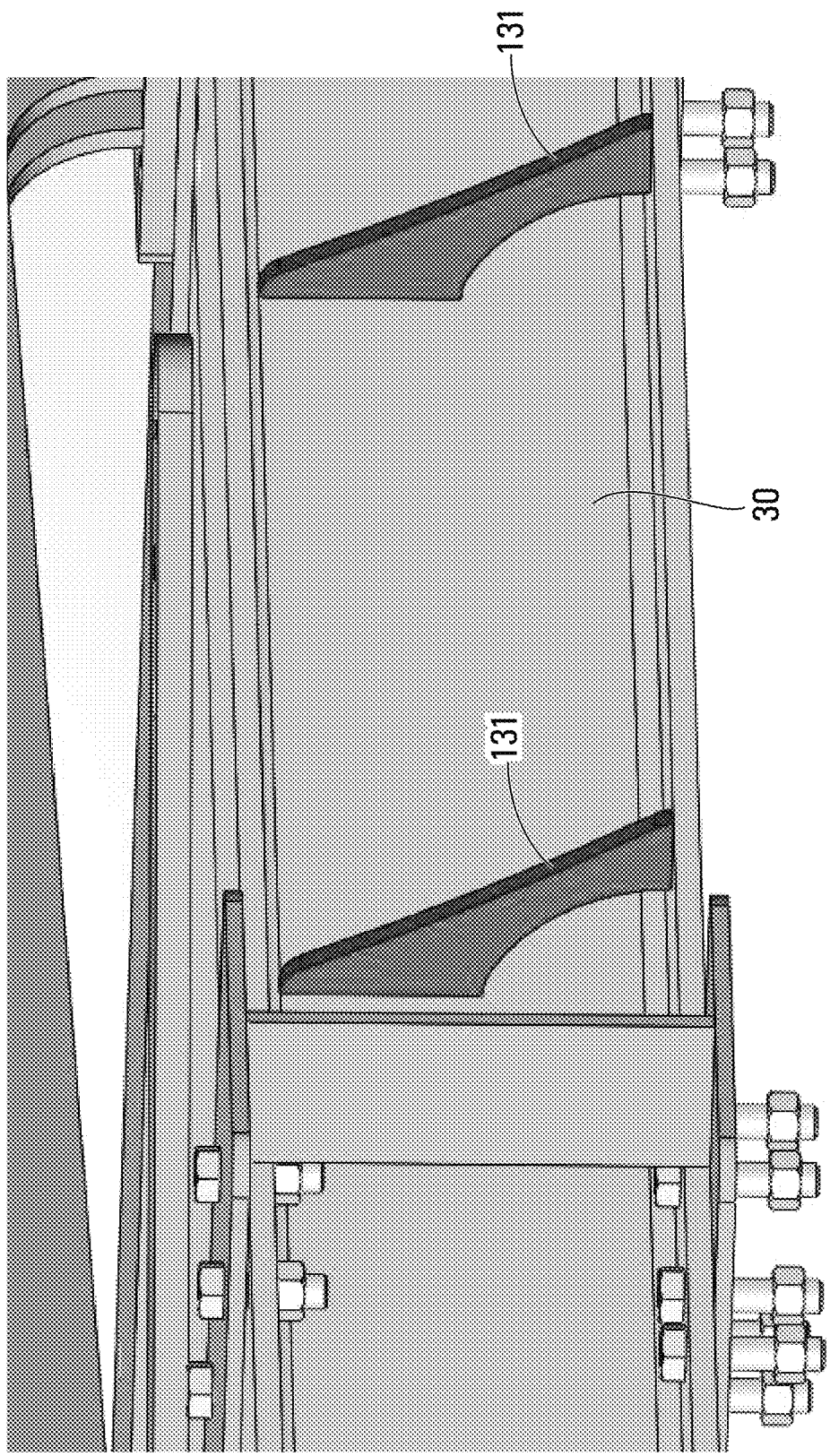
FIG. 5H is an enlarged close up view of components of the frame of the apparatus of FIG. 1.

With reference again to FIG. 5A and to FIG. 5H, it may be noted that each of open members 30 and 40' may each include a plurality of laterally spaced flex reducing members 131 which fixedly connect an upper portion of the central web portions on both sides, to their respective lower flanges. Flex reducing members may be made from any suitable material such as A36 mild steel and may be in the range of 3/16 inch to 1/2 inch thickness.

Such flex reducing members may be positioned and configured to prevent local over-flexing of the lower flange portions when subjected to high ground engagement forces during operation of tillage apparatus 10. If flanges are over-flexed, then the flange may yield, work harden and then possibly crack leading to failure. Flex reducing members 131 may substantially reduce the amount of over-flexing of such lower flanges in one particular location and may assist in spreading the loads applied to a lower flange in a particular area.

Figure 2A:
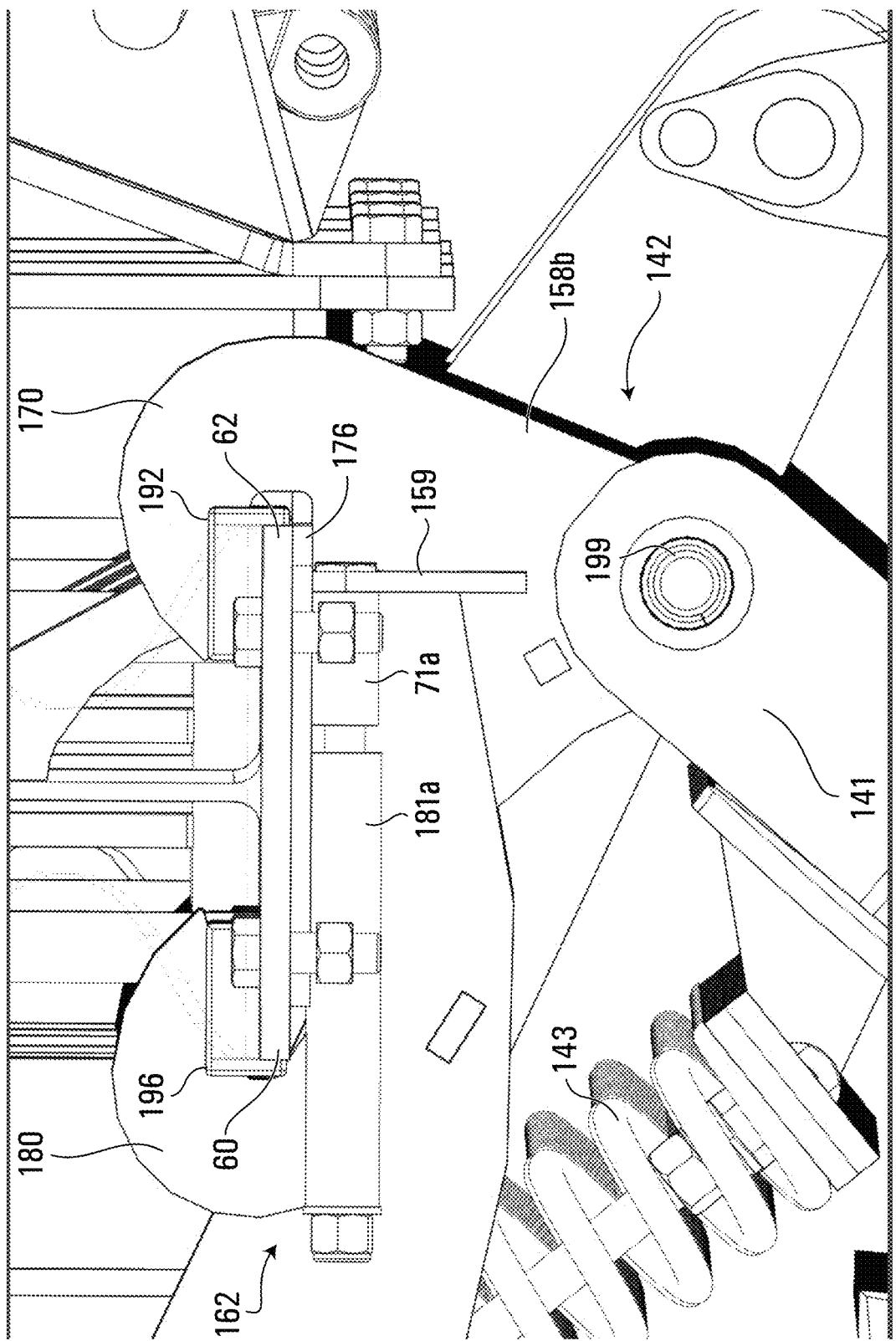
FIG. 2A is an enlarged side view of part of the apparatus of FIG. 1.
Figure 2B:
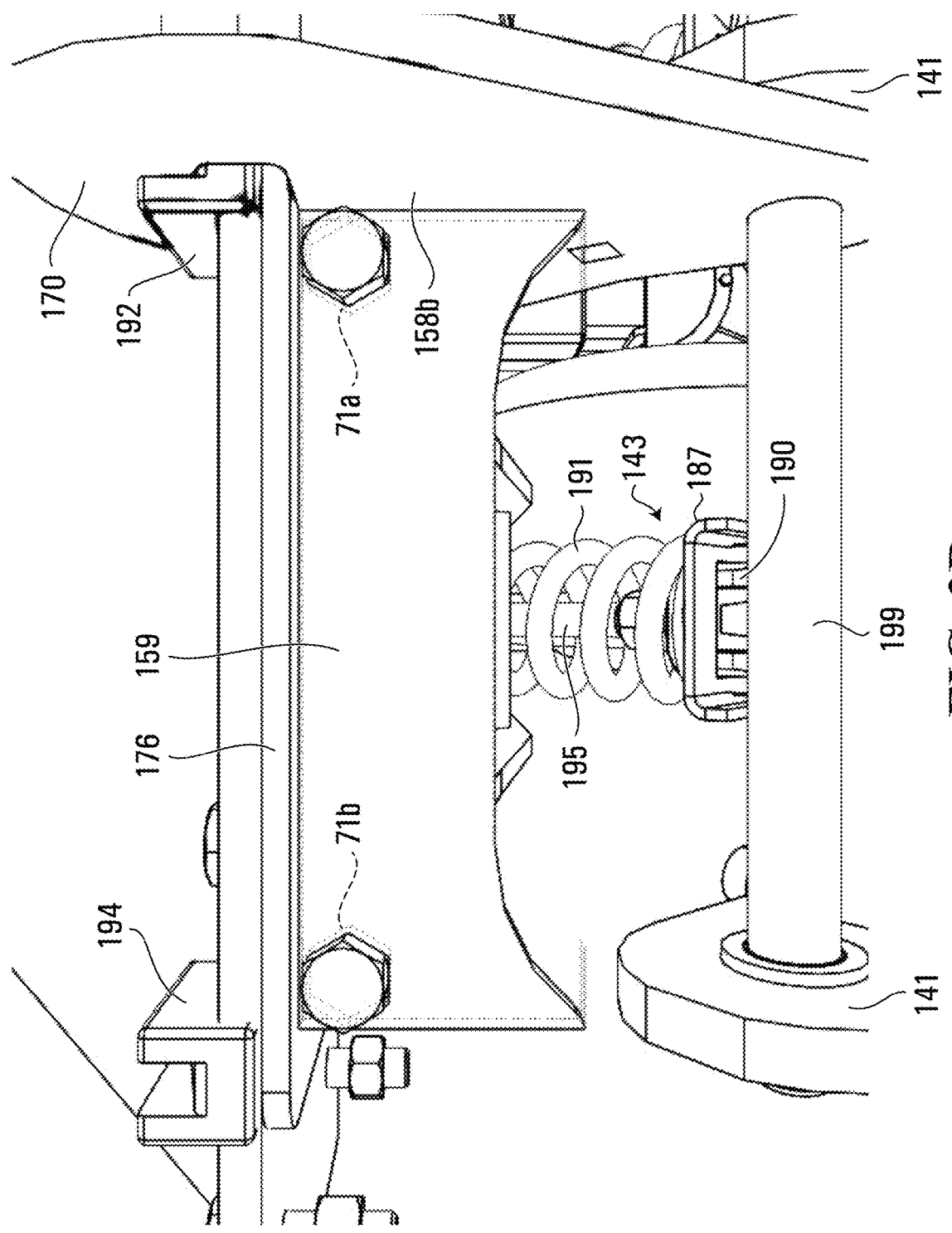
FIG. 2B is an enlarged end view of part of the apparatus of FIG. 1.

With reference to FIGS. 2-2B, a representative ground engager 140 of each ground engager of the rows of ground engagers 120, 122 (FIG. 1) is illustrated in further detail. Each ground engager 140 may include a mount 142 which is coupled to the lower opposed flanges 60 and 62 of the open structural members 30, 32, 34, 38, 40, 42, such as for example lower opposed flanges 60 and 62 of the open structural member 42. Mount 142 may include a transversely and longitudinally extending plate 176 fixedly interconnected (such as by welding) at side edges to side plates 158*a* and 158*b* (FIGS. 2A, 2B, 4 and 4B). Side plates 158*a*, 158*b* may have upwardly extending guide arms 172, 170 respectively which are configured to provide slots for engaging with flange 62 of open structural member 42. The aforementioned components may be made from one or more suitable materials such as structural steel with relatively big thickness (eg. about the same thickness as the web of open member 42).

Extending between side plates 158*a*, 158*b* and beneath plate 176 may be a vertically extending support plate 159 (FIG. 2B). Support plate 159 and the undersurface of top plate 176 may be fixedly connected to and support hollow cylindrical tubular members 71*a*, 71*b* (FIG. 2A) each having axially extending cylindrical passageways which may be used to interconnect mount 142 with spaced flange couplers 162, 164 (FIG. 5) as described further below.

Figure 4:
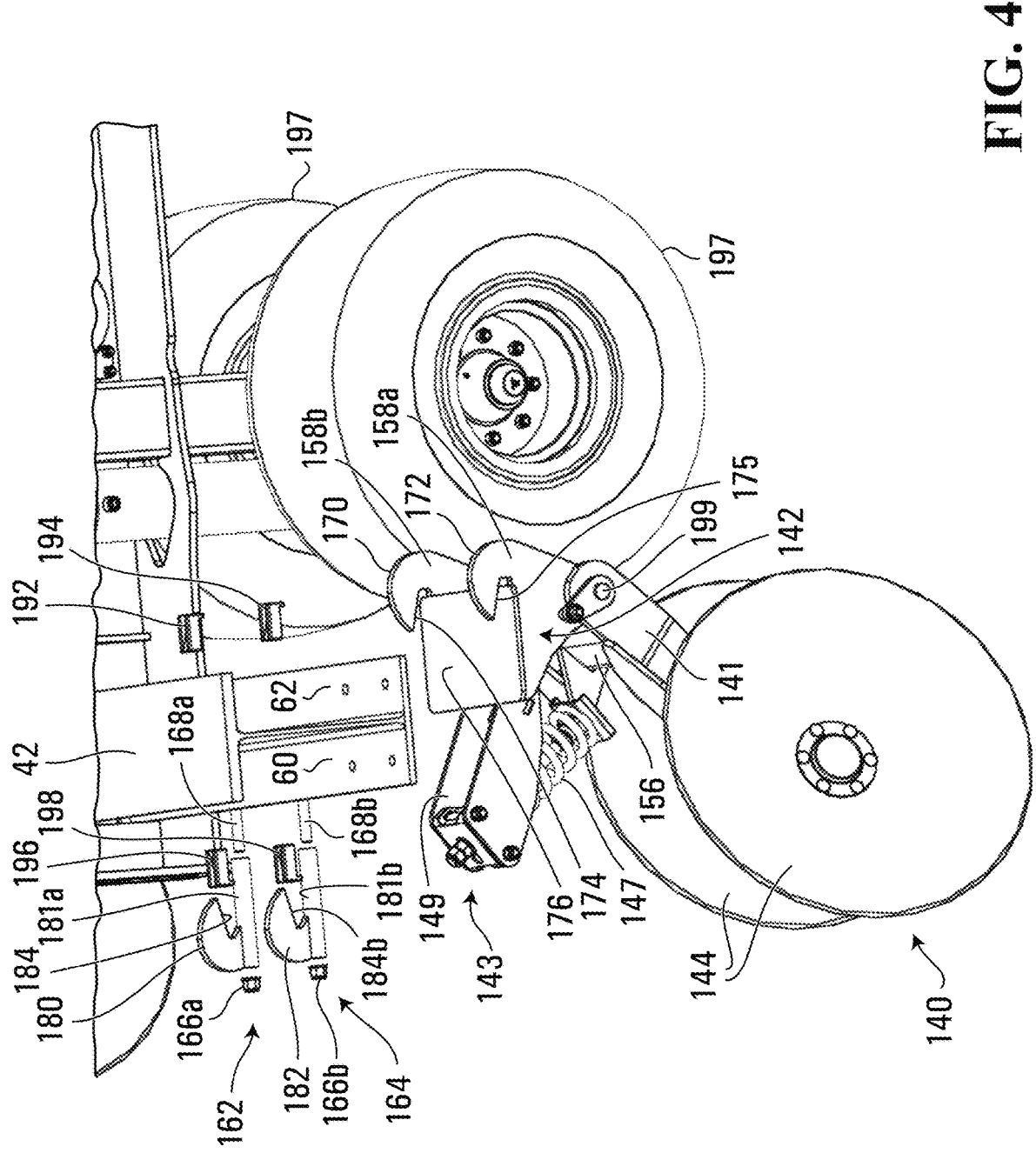
FIG. 4 is a disassembled view of a portion similar to the portion of FIG. 2 of the tillage apparatus shown in FIG. 1.
Figure 4A:
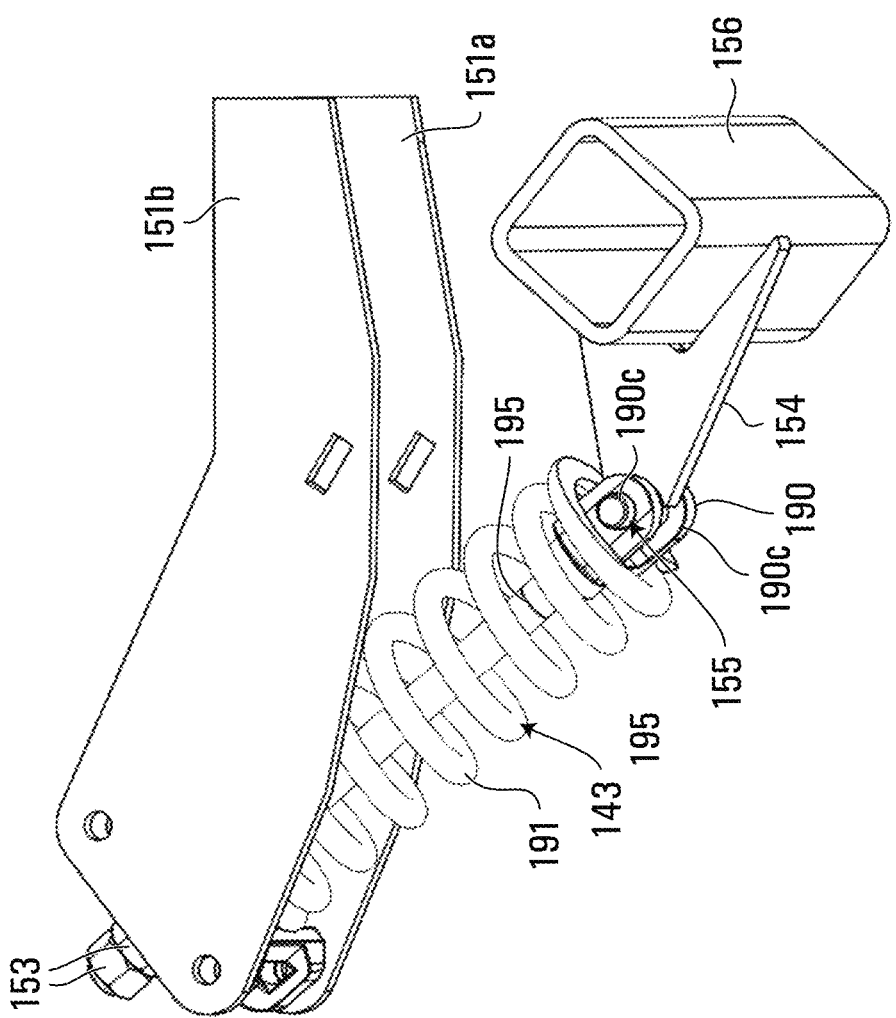
FIG. 4A is a perspective view of some components of part of a mounting and spring trip mechanism forming part of the apparatus of FIG. 1.
Figure 4B:
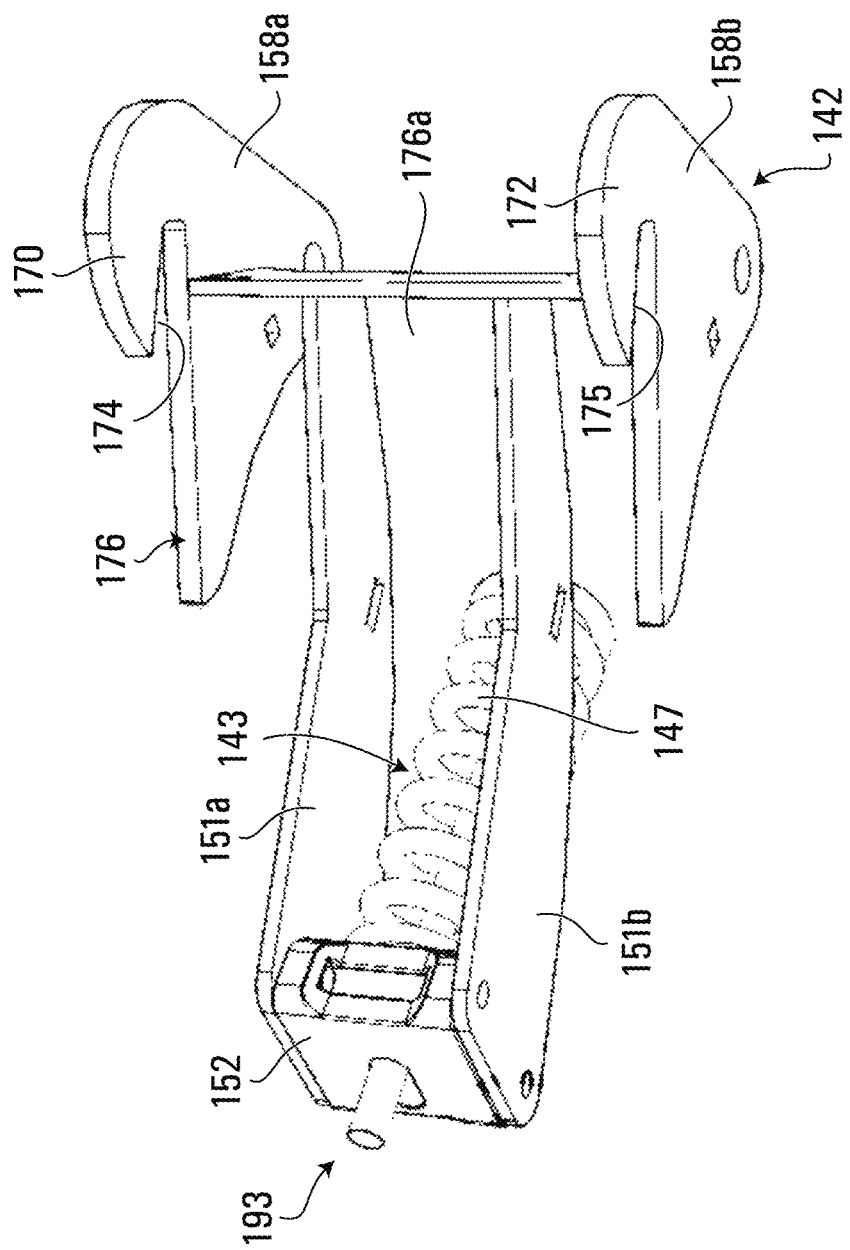
FIG. 4B is a top perspective view of some components of part of a mounting and spring trip mechanism forming part of the apparatus of FIG. 1.

Ground engager 140 may also include a pair of freely rotatable disks 144 (ie. freely rotatable about a central axis oriented in Z direction), and each disk 144 of the pair of spaced disks may be pivotally coupled by at least one pivotable arm member 141 to a side plate 158*a*, 158*b* of mount 142. Arms 141 and discs 144 attached thereto, may pivot about a shaft 199 (FIG. 2B) that passes through and is supported by spaced side plates 158*a*, 158*b*. Providing a transversely oriented rigid connection between each arm member 141 of an adjacent pair of discs 144, may be a transversely oriented support brace member 156 (FIGS. 4 and 4A). Thus each pair of disks 144 may pivot together about their common mount 142. It should be noted that while each disc 144 may be configured in the same manner and may have generally smooth circular outer edge perimeter, in some embodiments, the circular outer perimeter of discs 144 in the front row 120 and/or rear row 122 of ground engagers 140 may be notched. Notched discs 144A may be used on the front row 120 of ground engagers 140 to compensate for the fact that the discs 144A on front row 120 of ground engagers 140 will typically have to penetrate unbroken, harder ground. By providing notches in the discs 144A in the front row 120 this may reduce the forces in the Z direction imparted upon the discs in the front row 120 of ground engagers 140, compared to the forces that would be imparted on un-notched discs of the same diameter. This will tend to compensate for the difference in magnitude of the lateral forces acting on the rear row 122 (which would otherwise be lower than the front row for same size and configured discs). In some embodiments, front discs and rear discs may be substantially the same in configuration including having substantially the same diameter. It should be noted that in some embodiments/applications, it may be desirable to provide for a relatively large disc size. To increase or maximize the disc size by increasing the height lift range of the apparatus. However, providing for a relatively large height adjustment range may be limited by the wheel size. Therefore, it may be desirable to provide relatively large wheels and discs, such as where they have approximately the same wheel diameter.

Each ground engager 140 is operable to engage with and penetrate the ground material beneath surface 16 as tillage apparatus 10 is moved across surface 16.

With particular reference to FIGS. 2, 4, 4A-4L, a spring trip device 143 may be mounted between the pair of transversely spaced disks 144. Even though each spring trip device 143 has a compressed spring 191, they may not include suspension like functionality.

Instead, each spring trip device 143 may provide a trip mechanism that normally provides constant vertical positioning of the respective disc pairs 144 to which it is interconnected relative to the frame 18 to which each spring device 143 and disc pair 144 are attached. A pre-set force is exerted by each spring trip device 143 on support bracket 156 that interconnects pivot arms 141 which are fixedly connected to disc pairs 144. Until a force acting against the pre-loading force provided by spring trip device 143, exceeds the pre-load force imparted by spring trip device 143, then spring 191 of spring trip device 143 will not compress. This pre-load force may then assist in maintaining reasonably consistent depth engagement of the respective disc pairs 144 inter-connected to the frame 18. However, if one or both discs of a pair of discs 144 impact with a very strong, impenetrable item or material in the ground (eg. a large rock), the force Fg imparted by such impact on the discs 144 may exceed a maximum allowable threshold force—which corresponds with a force on the spring 191 greater than the pre-load force Fs. If the force Fg imparted on such discs 144 does exceed the threshold level associated with the pre-load force Fs, then the spring trip device 143 will "trip" by virtue of its spring 191 undergoing compression. This compression of the spring 191 and the corresponding force causing such compression, permits pivoting of the discs 144 on pivot arms 141 to relieve the force on the discs, the pivot arms 141 and on the frame 18 to which they are interconnected. This will then relieve the contact forces being imparted by the ground (eg. the rock) on the discs 144 as the discs and their pivot arms 141 will pivot away from the full engagement position.

Spring trip device 143 may be constructed to include a body portion having longitudinally oriented support struts 151a, 151b. Support struts 151a, 151b may be fixedly and strongly connected to an underside surface of a transversely and longitudinally extending plate 176 (FIGS. 2A, 2B, 4 and 4B) of mount 142. Pairs of discs 144 may be mounted with their respective pivot arms 141 and side plates 158a, 158b to a separate support plate 176 dedicated to such pair of discs 144.

At a distal end of support struts 151a, 151b and secured there between, may be a rotator cuff unit 193 that may include a support bracket 152 and a rotatable block 186. Spring trip device 143 that may be mounted between support struts 151a, 151b by bolts 173 that pass through slots in support struts 151a, 151b and slots in bracket 152. Support bracket 152 may have an inwardly directed generally hemispherical surface 152a which may engage with block 186 that may have a corresponding semi-hemispherical surface 186a. Block 186 is operable to pivot within a range of angular movement on and relative to bracket 152 on respective facing sliding surfaces 152a, 186a. One end of spring 191 may be supported for compression by an annular groove of block 186.

Bracket 152 and block 186 may have axially aligned openings through which an end portion of rod 195 may be received through. Rod 195 may be supported by bracket 152 and block 186 at one of rod 195 and the opening in bracket 152 may be configured to allow rod 195 to pivot with block 186 and to move axially relative to bracket 152 and block 186 when spring 191 is compressed. Jam nuts 177 may be provided at this outward end of rod 195 and engage with a top surface of bracket 152. Jam nuts 177 hold and lock the entire assembly of spring trip device 143 together and are positioned the top and final end of the assembly.

Adjusting the position of jam nuts 177 on rod 195 can select the amount of compression of spring 191 and thus the desired pre-load force of spring 191. The greater the compression of spring 191, then the greater the force. When spring 191 is compressed by adjusting jam nuts inwards, the rod 195 will move upwards in bracket 152. This will shorten the distance between bracket 152 and plate 187, thus raising pivot arms 141 and discs 144 attached thereto to a relatively small extent. This allows all the discs 144 to be leveled for a consistent depth on all ground engagers 140.

The pre-load force can vary based on the particular springs that are selected for spring trip device 143. The jam nuts 177 allow the adjustment of the pre-load to ensure that all springs are set to the same and correct pre-load value. The pre-load determines the force level that will activate the trip mechanism which then allows the discs 144 and their pivot arms 141 to rotate about shaft 199. The selected pre-load force.

Figure 4C:
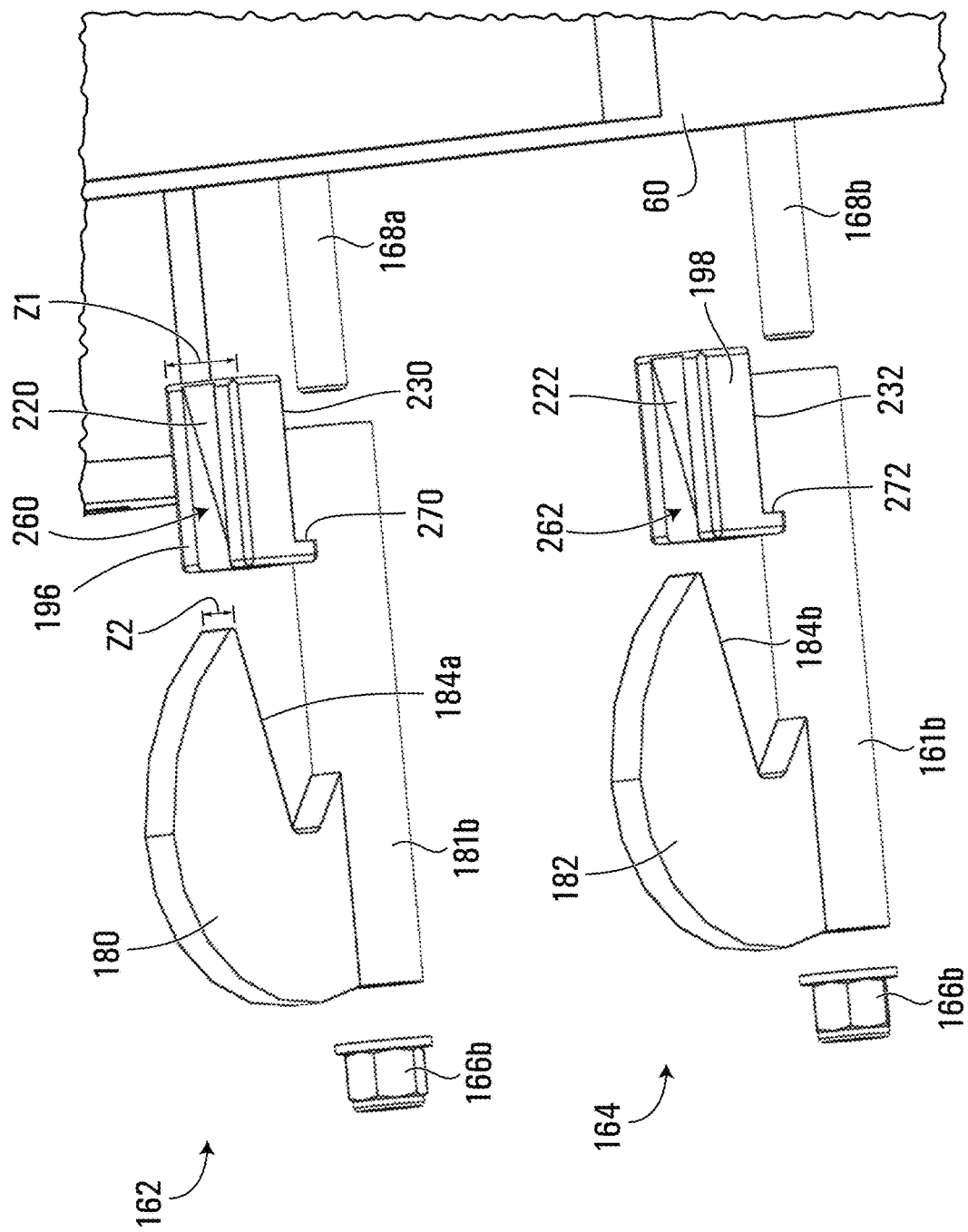
FIG. 4C is a perspective view of some components of part of a mounting mechanism forming part of the apparatus of FIG. 1.
Figure 4D:
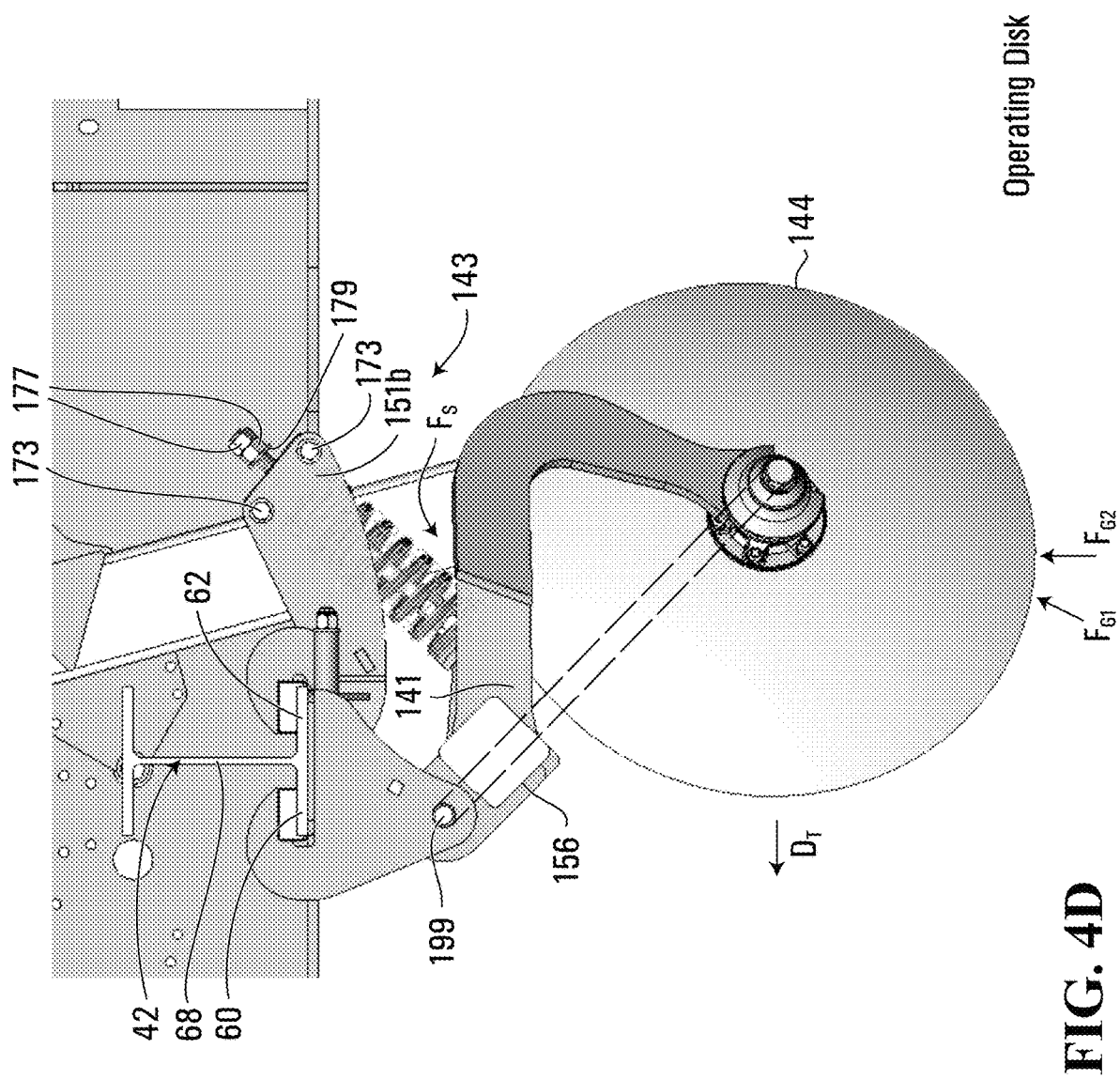
FIG. 4D is a side view of some components of part of ground engager, mounting and spring trip mechanism in normal operating mode, which forms part of the apparatus of FIG. 1.
Figure 4E:
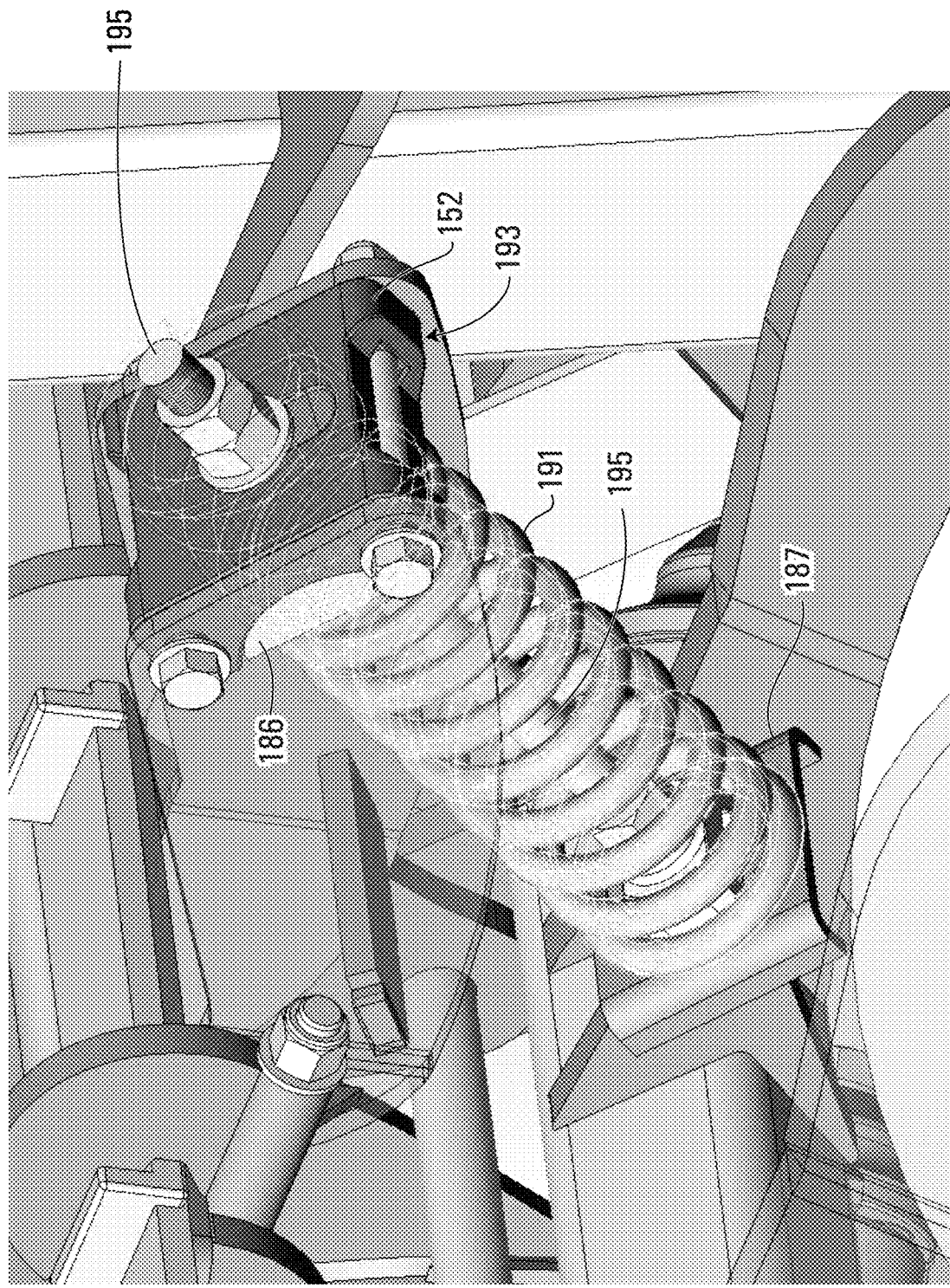
FIG. 4E is a top perspective view of some components of a spring trip mechanism forming part of the apparatus of FIG. 1.
Figure 4F:
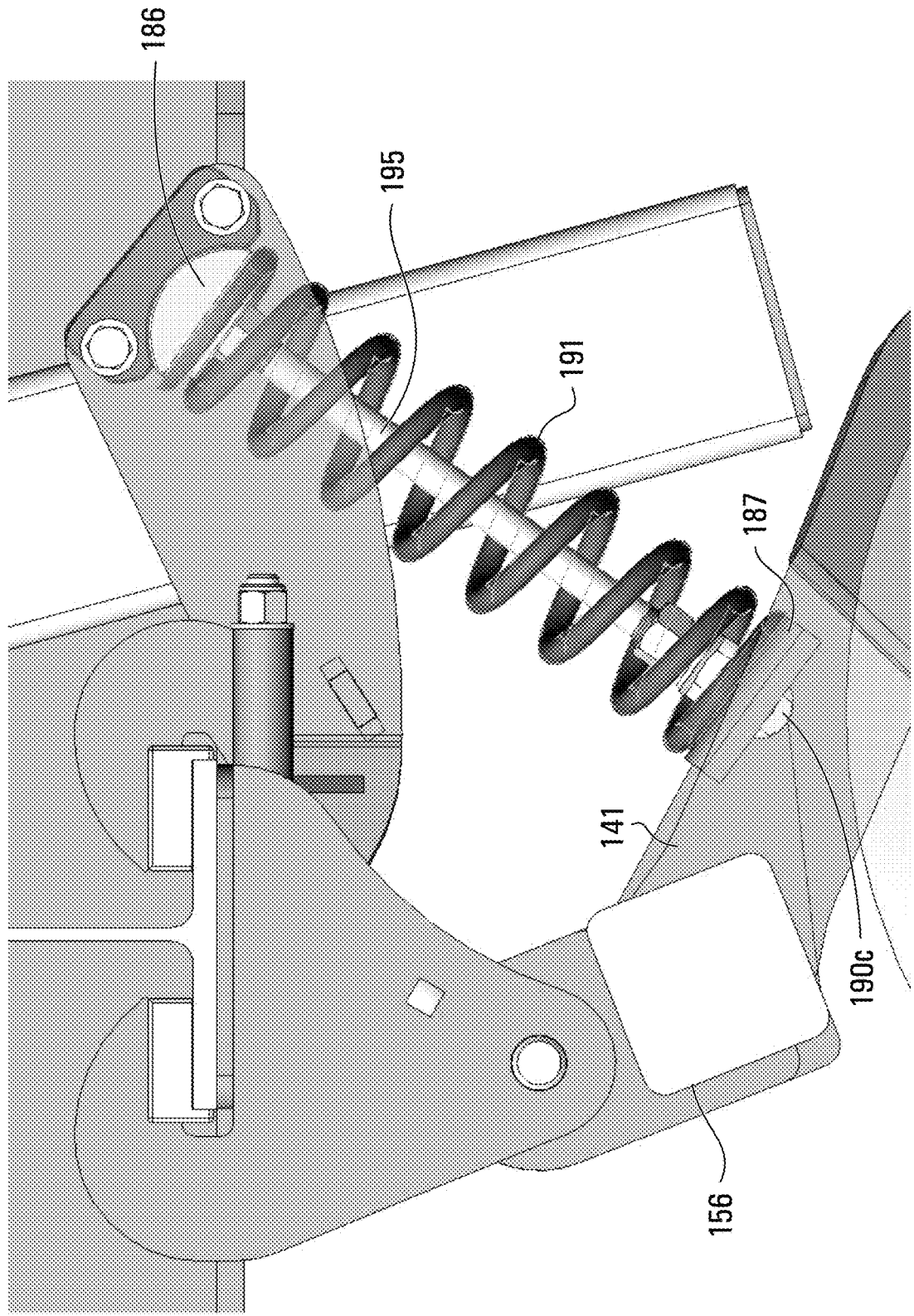
FIG. 4F is a side view of some components of part of a mounting and spring trip mechanism forming part of the apparatus of FIG. 1.

In some embodiments such as is depicted in FIG. 4F, there is not threaded end to rod 195 with corresponding jam nuts. Thus in this embodiment it is not easily possible to adjust level of spring compression such that the pre-load force may be adjusted.

This preload of spring 191 may vary depending upon the particular springs that are selected for each spring trip device 143. Jam nuts 193 allow the adjustment of this pre-load force to ensure that all springs are set to the same and the correct preload value. The preload, determines the force at which spring trip device 143 will be "tripped" when the ground engagers 140 (eg. ground engagers having a pair of discs 144) encounter a very hard obstacle, but ensure that the pairs of discs 144 remain fully engaged in the ground until the trip threshold force is reached. This is in contrast to known compliant discs on tillage apparatuses that use a suspension system that does not generally maintain a consistent depth penetration during normal operation.

The inward end of rod spring 191 is connected to a fork member 154 with a bottom spring trip device connector assembly 185. This connector assembly 185 may include a clevis and clevis pin style fastener generally designated 155 (FIG. 4A). Fork member 154 may be engaged with support brace member 156 that is connected to and positioned between arms members 141.

With particular reference to FIGS. 4E, 4F, 4H, and 4I, connector assembly 185 may include a bottom pivot mount device 190 and a base support plate 187. Base support plate may have an opening which may accept there through an upper cylindrical portion 190a and body portion 190b of mount device 190. Base support plate 187 may rest upon and be supported by upward facing surfaces of hook portions 190d. The hook portions 190d may prevent the base support plate 187 from tilting—which keeps spring 191 straight—when the spring 191 and rod 195 rotate as permitted by rotator cuff unit 193 when the spring trip device 143 is "tripped". A top cylindrical opening 190f of mount device 190 will receive an end of rod 195 there through. Cylindrical opening 190f may be a threaded opening and may engage with a threaded end of rod 195. A nut may be held between hooks 190d.

Figure 4G:
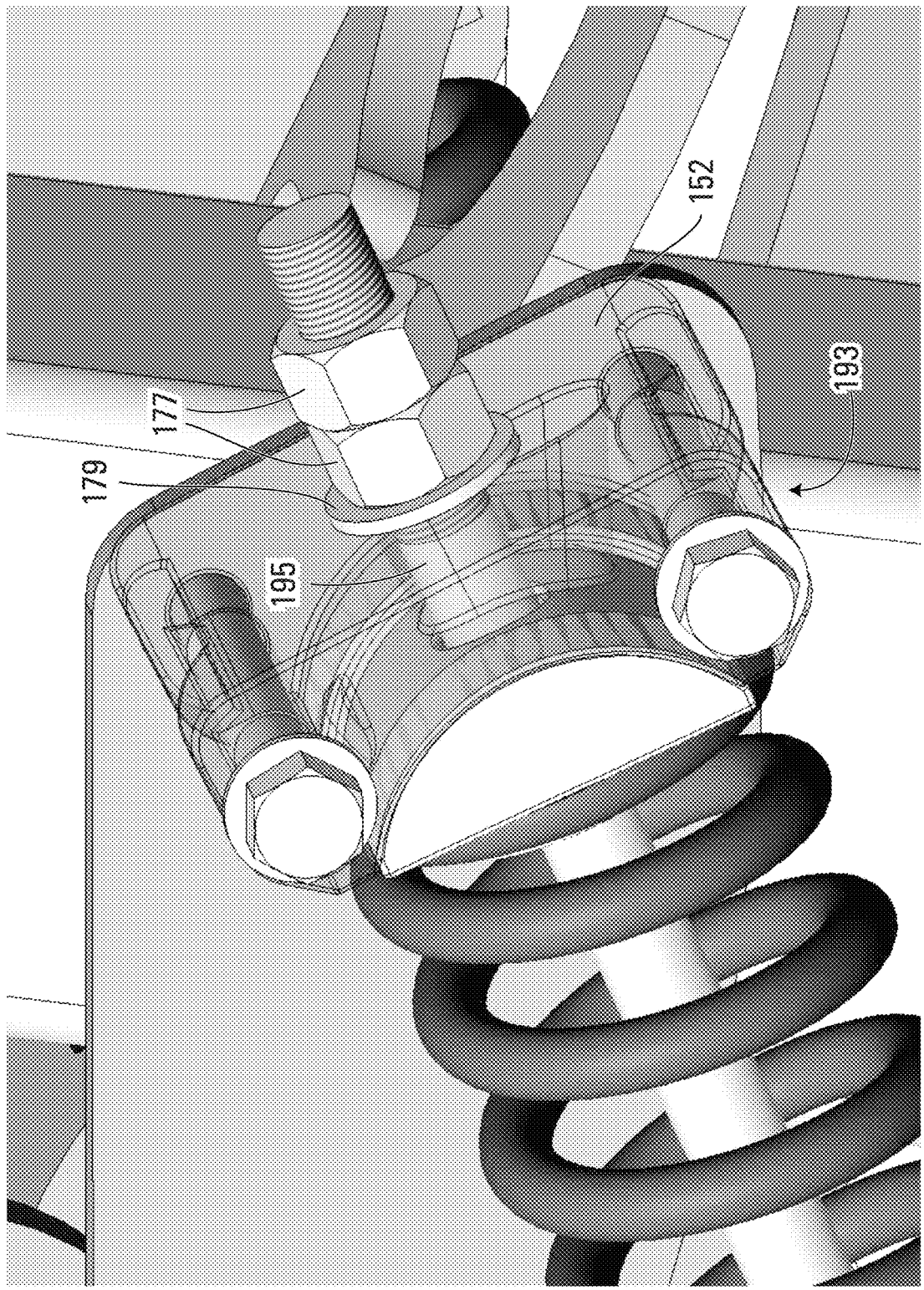
FIG. 4G is a perspective view of some components of a spring trip mechanism forming part of the apparatus of FIG. 1.
Figure 4H:
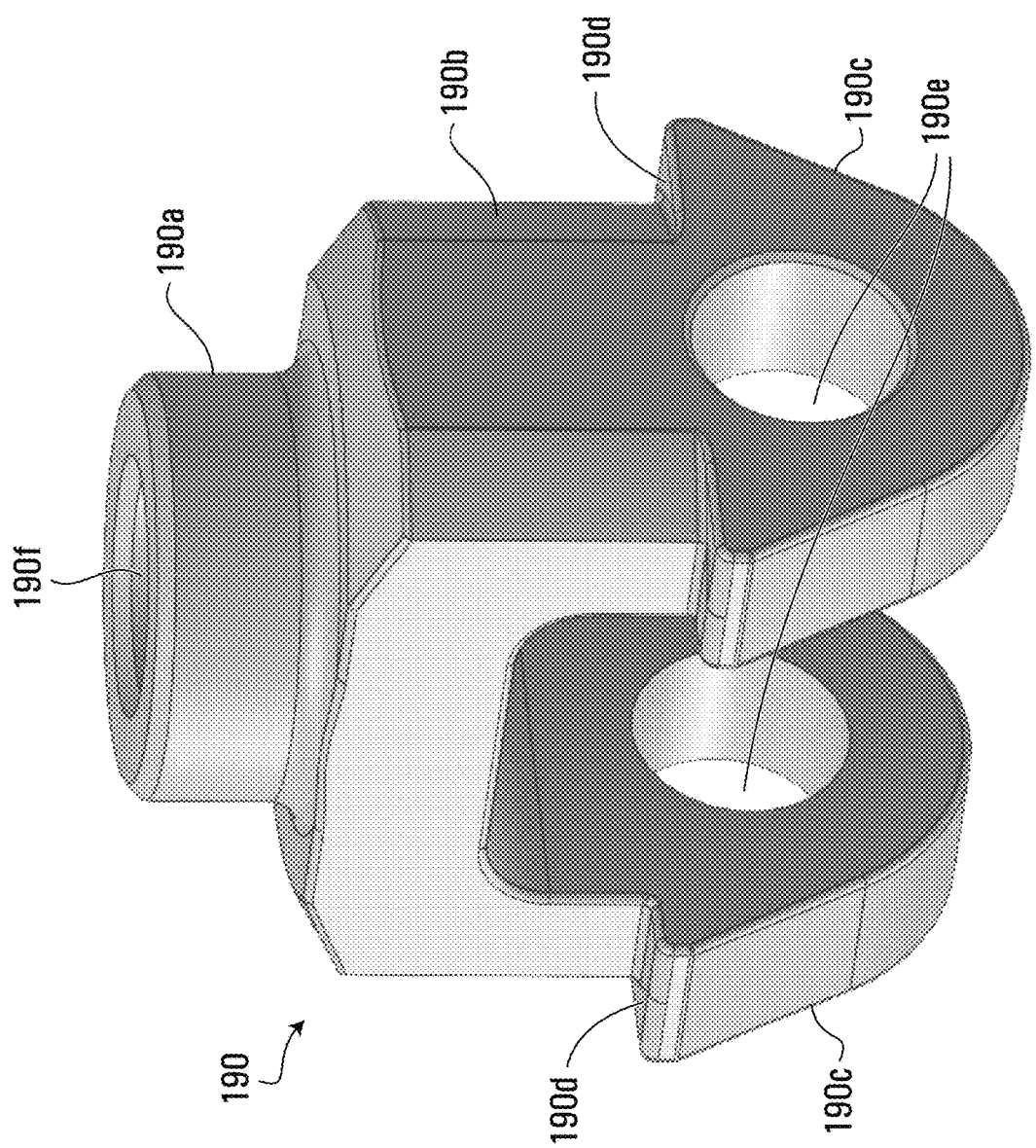
FIG. 4H is a perspective view of a component of a spring trip mechanism forming part of the apparatus of FIG. 1.
Figure 4I:
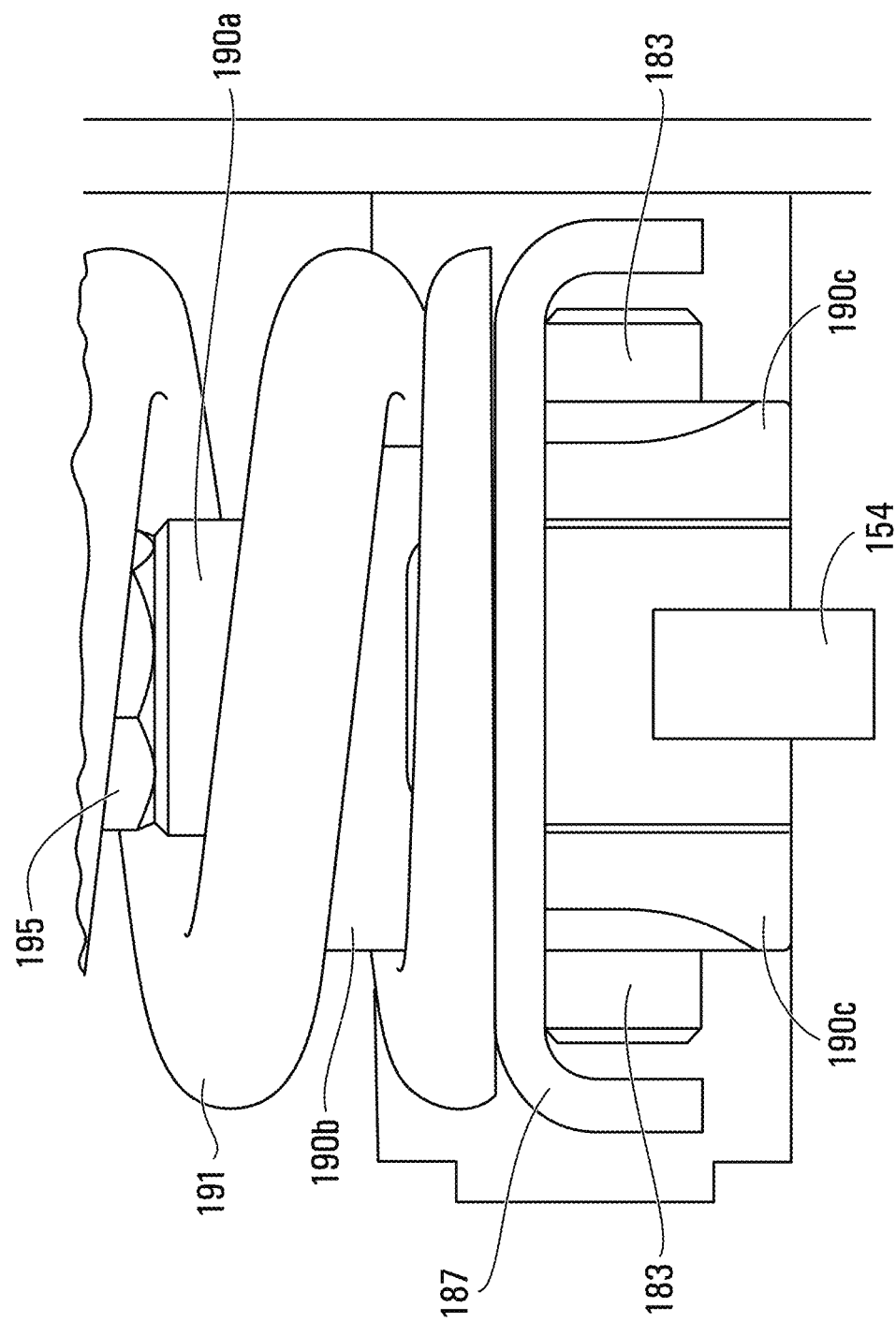
FIG. 4I is a perspective view of some other components of the spring trip mechanism forming part of the apparatus of FIG. 1.
Figure 4J:
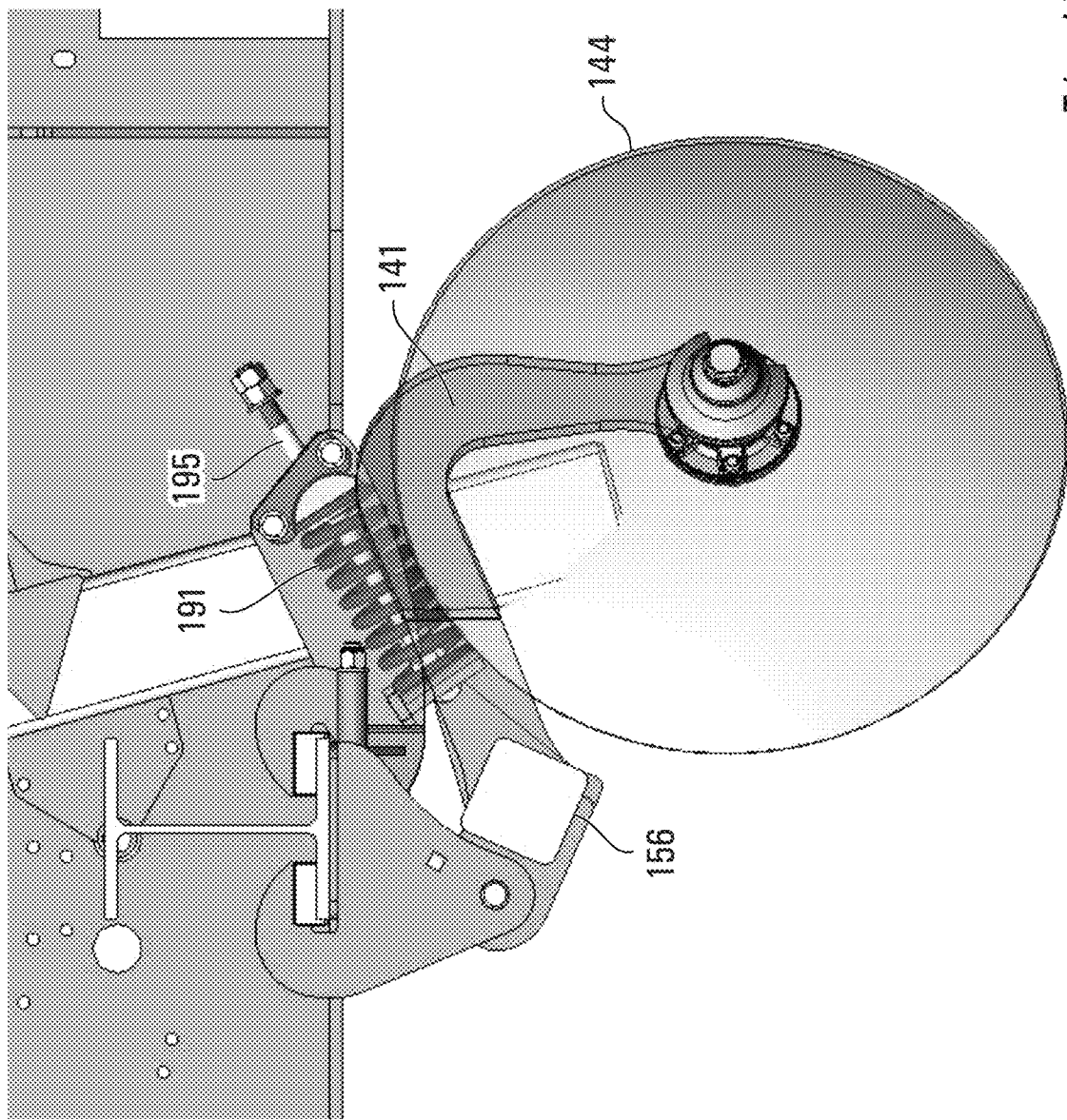
FIG. 4J is a side transparent view of some components of part of ground engager, mounting and spring trip mechanism in tripped operating mode, which forms part of the apparatus of FIG. 1.
Figure 4K:
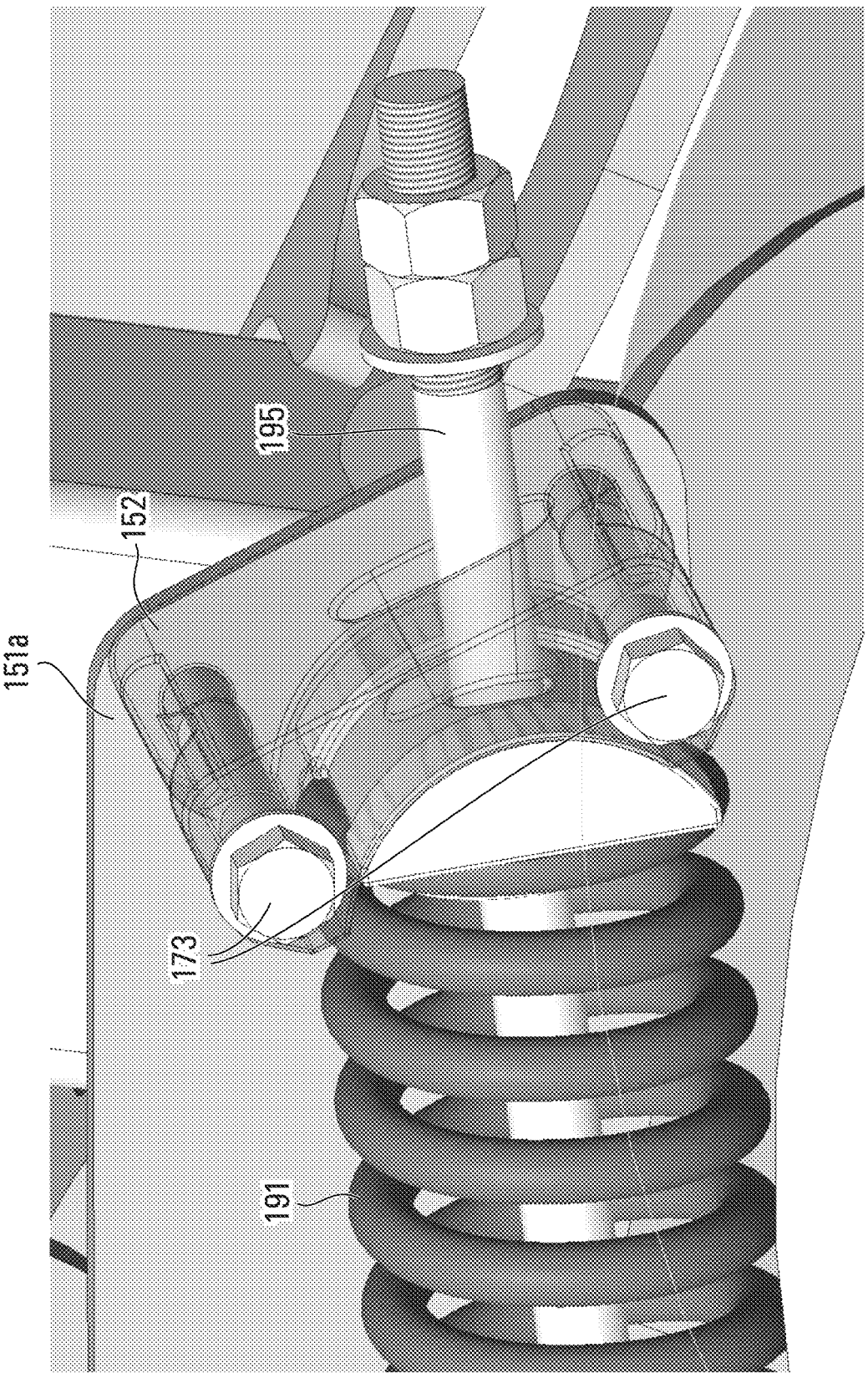
FIGS. 4K and 4L are perspective view of components of a spring trip mechanism forming part of the apparatus of FIG. 1.
Figure 4L:
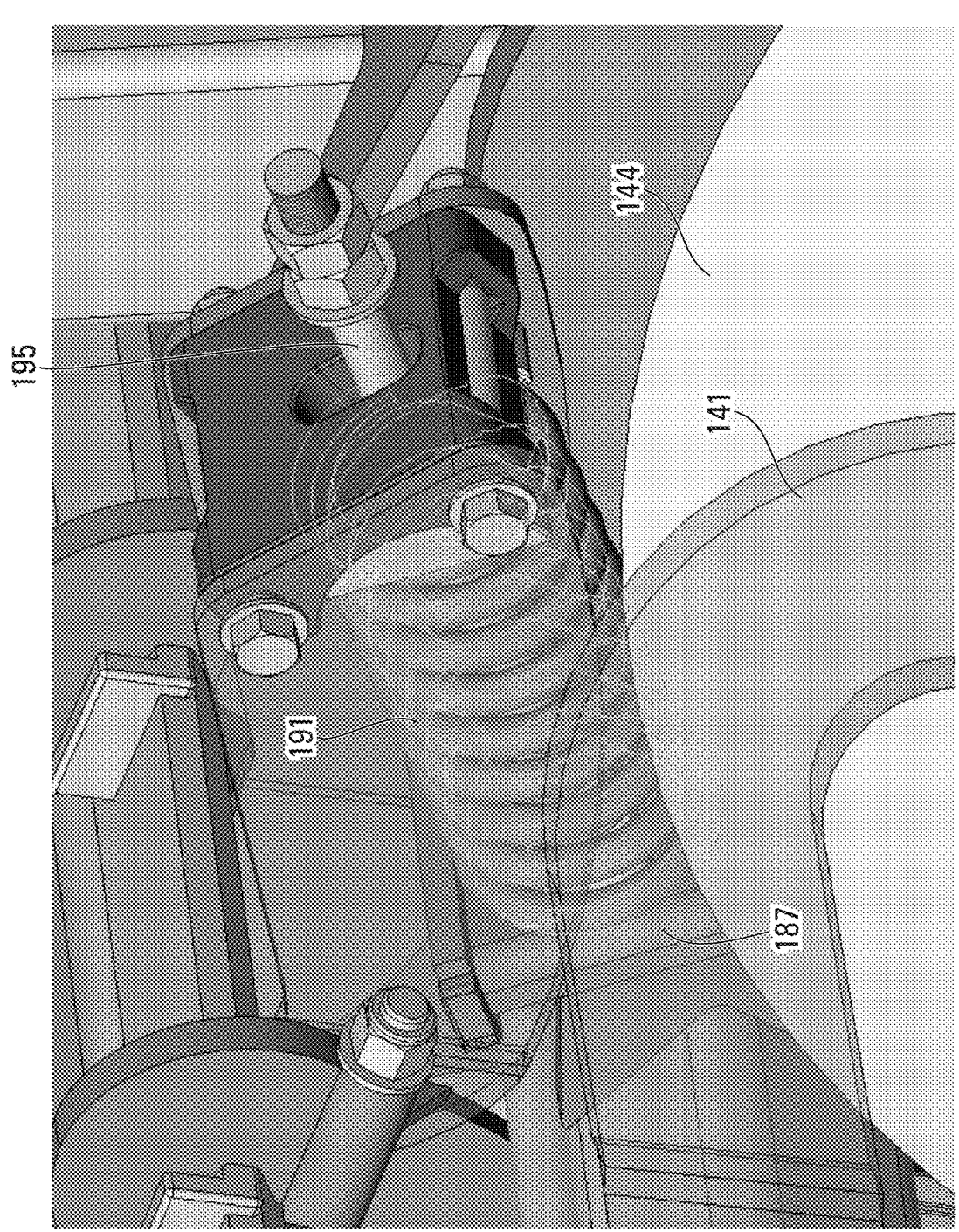

With particular reference to FIG. 4G, a washer 179 may be positioned on rod 195 between jam nuts 177 and the upper surface of bracket 152. In the normal operating (un-tripped) position, washer 179 will be parallel to and seated flat on the top surface on bracket 152 of rotator cuff unit 193.

Spring device 143 may be operable to during normal operation, to provide a generally downward force on and to bias the pair of arms 141 and the disks 144 mounted thereto, into a position whereby they engage with and penetrate the ground material beneath surface 16. However, spring device 143 may be configured and adapted such that if one or both disks 144 associated with one or more mounts 142 engage with a substantially impenetrable material (eg. a large granite rock), then to avoid having the force of such impact transmitted throughout the rest of that frame section 18C of which those mounts 142 form a part, and beyond the rest of frame 18, (potentially causing structural damage to the frame and/or ground engagers 140) spring device 143 will release the biasing force exerted by spring 191 and allow the arms 141 and disks 144 attached thereto to pivot substantially freely away from the impenetrable material.

With reference to FIG. 4D, each pivot arm 141 and disc 144 has an effective arm (shown in broken lines). If the pair of discs 144 of a ground engager 140 are moving in a direction of travel DT, and one or both of the discs encounter an impenetrable object, then an upward force Fg2 or perhaps a force Fg1 in the general direction upwards and slightly backwards may be applied to discs 144. The direction of force Fg1 or Fg2 will be such that is will create a rotational force around the pivot location at shaft 199.

If the force Fg imparted on such discs 144 does exceed the threshold level associated with the pre-load force Fs, then the spring trip device 143 will "trip" by virtue of its spring 191 undergoing compression. By way of example, the force required to be exerted upwards on spring 191 to compress the spring 191 to activate the trip mechanism may be 1242.96 lbs. This compression of the spring 191 and the corresponding force causing such compression, permits pivoting of the discs 144 on pivot arms 141 to relieve the force on the discs, the pivot arms 141 and on the frame 18 to which they are interconnected. The pivoting movement of arms 141 and discs 144 can be observed from the position shown in FIG. 4D to the position shown in FIG. 4J. It will be noted also the rotation of spring 191 and rod 195, there is pivoting movement from the position shown in FIG. 4E to the positions shown in FIGS. 4K and 4L. This pivoting movement relieves the contact forces being imparted by the impenetrable material on the discs 144. The geometry of spring 191 reduces the force in the upper area of the trip range. But never goes to over center lock, as it is mechanically stopped. But the forces are reduced at top end of the trip range.

Once the spring trip device 143 has been tripped, there is a downwards force (eg. 539.52 lbs) that is still exerted on the pair of discs 144 (eg. the weight of the pivot arms, discs 144 etc.). This will then enable the pair of discs 144 to be returned to an operational position with a relatively easy amount of additional force. Indeed, the spring trip devices 143 and their respective ground engagers 140 may be configured such that the spring trip device 143 will automatically re-set itself once the discs 144 have cleared the obstacle in the ground.

In other embodiments, instead of a single spring 191, a second spring (eg. a corresponding axially aligned inner spring housed within spring 191) may be provided to permit the ground force required to trip the spring trip device 143, to be increased.

Mount 142 may be coupled to the lower flanges 60 and 62 of the open member 42 which may facilitate the mount rotationally flexing at least a portion of the open member 42 about a longitudinal axis 150 of the open member 42. Accordingly, when the ground engager 140 encounters a change in contour of surface 16, such as, for example, a change in slope, a mound, or a hill, the ground engager 140 may torque and flexibly rotate the open member 42 about the longitudinal axis 150. As the open member 42 rotates, this may facilitate raising the disk 144, such that the disk 144 stays at a generally constant depth below the surface 16. In some embodiments, for example, the ground engager 140 may flex the open member 42 such that the ground engager 140 rotates at least about 20 degrees about the longitudinal axis 150.

However, and as will be explained further elsewhere herein, the relative position and height of frame 18 relative to the wheels of wheel units 828, 830, 832, 834 and 820, 822, 824 and 826, and the elevation of the wheels relative to each other, will typically provide a greater influence on the flexing of the open structural members such as open member 42. When tillage apparatus 10 is moving over level, and horizontal ground, of consistent hardness, all members will in normal operation penetrate into the ground the same depth. This is because the overall weight of frame 18 and ground engagers 140 will be sufficient to override any upward force that may be imparted by the ground on the ground engagers. In such circumstances there will be no torsional flexing of the longitudinal structural members 800, etc. There may be some torsional forces exerted on the transverse structural members 32, 42 etc. that may result from the forward movement of the ground engagers 140 through the penetrated ground. However, such torsional forces will typically be evenly spread out transversely across the frame 18.

However, when moving over uneven ground, at least some of the structural members of frame 18 will flex due to the weight of the frame 18 and the ground engagers 140 attached thereto as the tillage apparatus 10 moves over the uneven terrain/ground 16. The depth of penetration in the ground of each of the pairs of discs 144 may be primarily determined or influenced by the elevational position(s) of the ground supporting the wheel or wheels that are near or adjacent to the respective pair of discs 144. If there is a big depression in the ground underneath a particular wheel and wheel assembly that is close to a particular pair of discs 144, both the structural members interconnected to that wheel assembly, and the discs in the vicinity of those structural members, will also move downwards with that wheel/wheel assembly relative to other wheel assemblies, structural members and discs elsewhere on frame 18. This may also result in torsional flexing of the structural members in the vicinity thereof in response to the depression in the terrain.

Similarly, if there is a big increase of elevation in the ground underneath a particular wheel(s) 147 and wheel assembly that is close to a particular pair of discs 144, both the structural members interconnected to that wheel assembly, and the discs 144 in the vicinity of those structural members, will also move upwards with that wheel/wheel assembly relative to other wheel assemblies, structural members and discs elsewhere on frame 18. This may similarly also result in torsional flexing of the structural members in the vicinity thereof in response to the increase in the terrain in that locale supporting that wheel 147.

The discs 144 may be maintained at a fairly constant amount of penetration into the ground due to the position of the proximate wheel(s) and also due the flexing of the structural members of the frame in the vicinity/proximity of those respective wheels. The frame 18 may undergo torsional flexing when moving over contoured ground surface 16 and this may assist in allowing the discs 144 in the vicinity of those wheels to move to a position that provides a relatively consistent depth of penetration.

Also, as described herein, loads that may be imparted onto a particular pair of discs 144 and structural member to which that particular discs are attached, may be transmitted for example from a rear row structural member such as structural member 42 through longitudinal members (such as member 814—as seen in FIG. 5D) to a front row member (such as front row member 32). The shared carrying of torsional loads in such a manner can assist in avoiding one pair of discs 144 undergoing a significantly large movement as a result of a wheel(s) 147 in the vicinity of such disc pair 144 undergoing a severe change in elevation relative to adjacent wheels. Thus the torsional flexing of a lower flange of a structural member such as member 42 may ensure that no vertical position of any pair of discs 144 is too greatly exaggerated.

In overview, the height position of the wheels relative to each other across the width and length of the frame 18 may have the greatest influence on the flexing of the frame 18 and its open members. The effect of the ground engagers 140 and the engagement tools thereof moving thorough the penetrated ground may be less significant. The ground engagers 140 and their tools may be able to generally maintain constant depth due to the flexibility of the frame, the frame sections and the open members forming the same. The tools form a "set" position based on the terrain contours defined by the wheels. The flex in the frame gradients the various wheel heights above or below the set/flat position thus providing a smooth and generally consistent ground engagement depth. The torsional flex of the wide flange of the open members local to each disc mount forms part of the mechanism that delivers the depth consistency. The sharing of the torsional loads between rows of transverse members minimizes the risk of, if not ensures that, no disc height position is overly exaggerated when compensating for vertical height changes in the terrain.

If a tubular member of similar dimensions was employed instead of an open member such as open member 42, so that mount 142 were unable to substantially rotate or flex the open member 42, disks 144 may engage with the surface 16 at greater and possibly undesirable depths below surface 16 in a localized area, when the disks 144 pass over or through a mound or elevated contour of the surface 16.

In some embodiments, a combination of the rotational flexibility of the flanges of the open members about the longitudinal axes when placed under torque (such as changes in terrain encountered by a wheel assembly or by forces acting on mounts of the ground engagers 140) and the pivotal connections referenced above between the frame sections 18A/18B and 18A/18C and their adjacent open members, may facilitate the ground engagers being held at generally constant depths across all of the open members in each of the rows 20 and 22.

As shown in FIG. 1, each of the open members may have a plurality of ground engagers 140 in front and rear rows 120, 122 coupled to lower opposed flanges of respective open structural members. For example, referring to the open member 42 in rear row 22 of frame section 18C, a plurality of pairs of ground engagers 140 are coupled to the opposed lower flanges 60 and 62 of open member 42. In some embodiments, ground engagers 140 coupled to the lower flanges 60 and 62 may, when the ground engagers encounter a change in contour of the surface 16, exert a combined torque to the open member 42 about the longitudinal axis 150. This combined torque applied by the ground engagers 140 on the open member 42 may facilitate flexing of the open member 42 to facilitate the ground engagers 140 closely follow contours in the surface 16.

Referring to FIGS. 2, 2A, 2B, and 4, mount 142 may include features which may facilitate a strong and stable connection to open member 42 and/or may facilitate flexing of open member 42. The components of mount 142 may be made from one or more suitable materials such as A36 mild steel.

In addition to horizontally and longitudinally extending plate 176, side plates 158a, 158b with respective guides 172 and 170, as well as vertical plate 159, mount 142 may include a first flange coupler 162 configured for engaging with flange 60 and a second flange coupler 164 also configured for engaging with flange 60. Flange couplers 162, 164 may be made of any suitable material such as for example A36 mild steel.

Referring in particular to FIGS. 2A, 2B and 4, flange coupler 162 includes flange receiving guide 180 having flange receiving surface 184a that defines a narrowing flange securing recess for receiving the flange 60. Flange coupler 162 may also include a tubular cylindrical portion 181a which may have an axially extending cylindrical passageway and which may be interconnected (such as by welding) to receiving guide 180.

Similarly, flange coupler 164 includes flange receiving guide 188 having flange receiving surface 184b that also defines a narrowing flange securing recess for receiving the flange 60. Flange coupler 164 may also include a tubular cylindrical portion 181b which may have an axially extending cylindrical passageway and which may be interconnected (such as by welding) to receiving guide 182.

Receiving guides 170 and 172 of side plates 158a, 158b also have flange receiving surfaces 174 175 that define a narrowing flange securing recess for receiving the flange 62. Upper flange receiving surfaces 174 and 175 and a portion of plate surface 176a may together define narrowing flange securing recesses for receiving flange 62.

Referring particularly to FIGS. 4 and 4C, mount 142 is shown in a disassembled view, disconnected from open member 42 and flange couplers 162 and 164. Associated with mount 142 there may also be nuts 166a, 166b and corresponding threaded bolts 168a, 168b which may link the first flange coupler 162 and the second flange coupler 164 to the main body of mount 142 by virtue of cylindrical members 71a, 71b. Bolts 168a, 168b may be received though respective axially aligned passageways in cylindrical members 71a, 181a, and axially aligned passageways 71b, 181b with respective nuts 166a, 166b secured to the ends of the respective bolts 168a, 168b. First and second flange couplers 162, 164 may be drawn together when nuts 166a, 166b are tightened on respective bolts 168a, 168b. Nuts 166a, 166b and corresponding bolts 168a, 168b may thus act as tighteners for mount 142 such that the distance between the heads of bolts 168a, 168b and respective nuts 166a, 166b may be varied by loosening or tightening the nuts 166a, 166b on the respective bolts 168a, 168b. Bolts 168a, 168b may for example be ¾ inch grade 8 bolts and be secured with C-lock nuts 166a, 166b.

Wedge devices 192 and 194 may also be provided and be operable to be disposed between flange receiving guides 170 and 172 of mount 142, and flange 62, as shown in FIG. 2. Flange receiving guides 170 and 172 may be made from a high strength material, such as, for example, heavy plate steel having a thickness of about ½ inch. Wedge devices 192, 194 may be high strength cast steel and may be designed of a shape and strength to bite into mild steel of which flange receiving guides 180, 182 maybe formed. This may provide for secure, non-shifting connections.

With particular reference to FIGS. 2A and 5, flange receiving guides 180 and 182, having recesses with respective flange receiving surfaces 184a and 184b for receiving flange 60, may also include respective wedge devices 196 and 198 operable to be disposed between the flange receiving guides 180 and 182 and flange 60, as shown in FIG. 2. The flange receiving guides 180 and 182 and the wedge devices 196 and 198 may have generally similar features to the flange receiving guides 170 and 172 and the wedge devices 192 and 194.

In various embodiments, flange receiving guides 170, 172, 180, and 182 may have a high level of strength in the horizontal direction when the flange receiving guides are drawn together to urge the flanges 60, 62 of open member 42 into the flange securing recesses. Wedge devices 192, 194, 196, and 198 may also provide a significant vertical force which allows the mount 142 to act as a solid clamp that does not slide under load. Significant side loads may be exerted on the mount 142 when the disk 144 is engaged with the surface 16, for example, by engaging with soil defining the surface 16.

Referring now to FIG. 4C, flange couplers 162 and 164 and respective wedge devices 196 and 198 are shown in more detail. Wedge devices 196 and 198 of flange couplers 162, 164 include respective guide engaging surfaces 220 and 222 which are angled outwardly in an X-direction toward flange 60 and which are operable to be engaged with the flange receiving guides 180 and 182, as shown in FIG. 2. Wedges devices 196 and 198 also include lower, flange engaging surfaces 230 and 232 respectively which are operable to engage with the flange 60, as shown in FIG. 2.

In various embodiments, the guide engaging surfaces 220 and 222 may be angled relative to the flange engaging surfaces 230 and 232. For example, in various embodiments, the guide engaging surfaces 220 and 222 may be at an angle of about 15 degrees relative to the flange engaging surfaces 230 and 232.

The angle between the flange engaging surfaces 230 and 232 and the guide engaging surfaces 220 and 222 may facilitate the wedge devices adding vertical forces to the faces of the flange 60 when the flange receiving guides 180 and 182 are urged towards the flange 60. In some embodiments, for example, the vertical force facilitated by wedges devices 196 and 198 may be about 4 times more force on the flange 60 than may be achieved without the wedges 196 and 198 and using flange receiving guides alone.

Figure 4M:
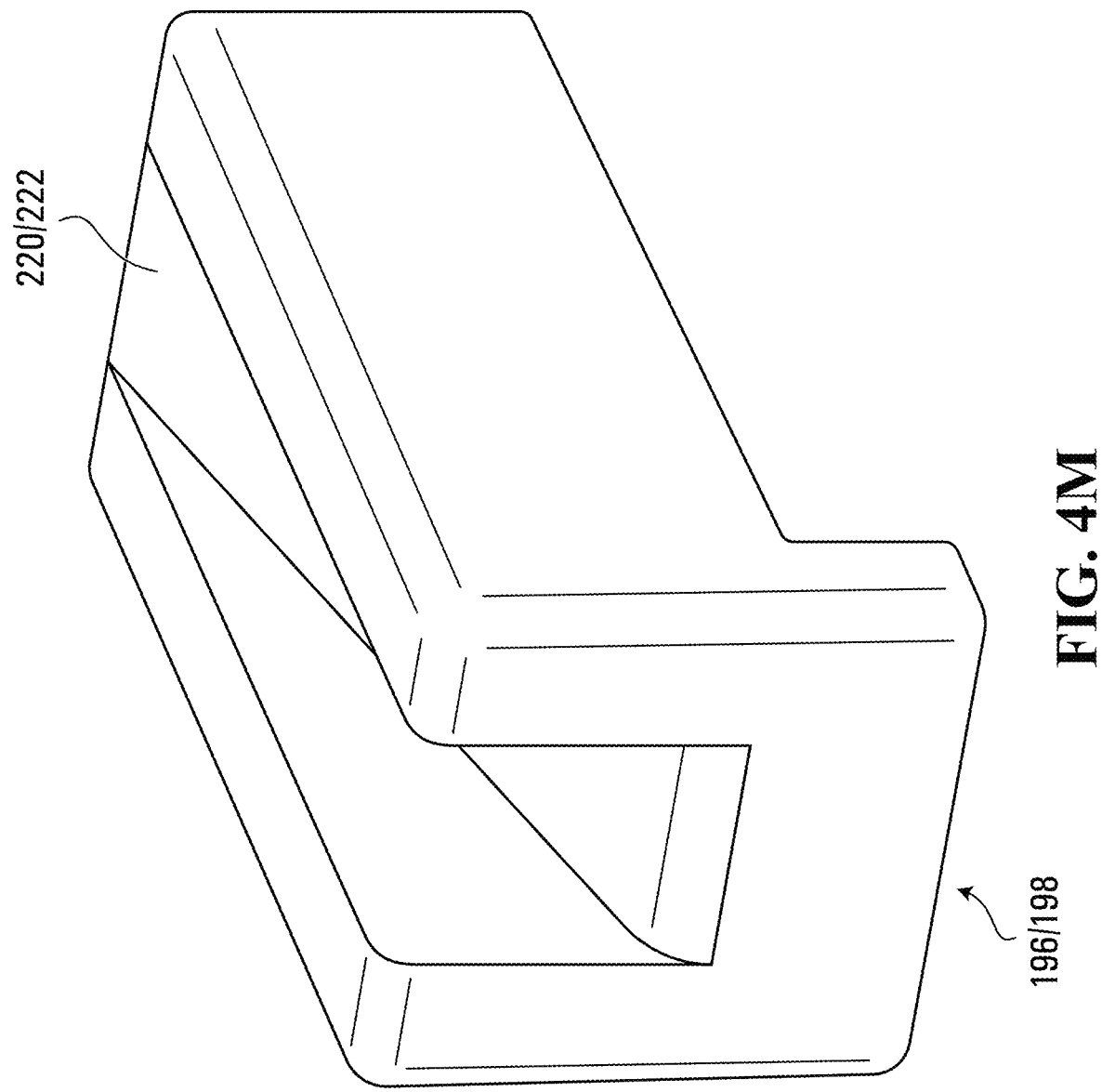

Referring still to FIGS. 4C and 4M, wedge devices 220 and 222 may have a width greater than a width of the flange receiving guides 180 and 182. For example, referring to the flange receiving guide 180 and wedge device 196, wedge 196 may have a width Z1 that is greater than a width Z2 of the flange receiving guide 180. By providing width Z1 of wedge device 196 being greater than width Z2 of flange receiving guide 180, this may facilitate a surface area defined by the flange engaging surface 230 being greater than a surface area of the flange receiving surface 184 of the flange receiving guide 180. This greater surface area may facilitate a greater and more stable force being applied to the flange 60 by the wedge 196 relative to using the flange receiving guide 180 alone to engage with the flange 60. The angled guide surfaces 220, 222 provide the clamp in co-operation with the surfaces 184*a*, 184. The actual wedge devices 196, 198 may have a width that is about three times wider than the surfaces 220, 222.

In some embodiments, the width Z2 of the flange receiving guide 180 may be about ½ inch, for example. In some embodiments, the width Z1 of the wedge 196 may be about 1½ inches, for example.

Still referring to FIGS. 4C and 4M, in various embodiments, wedges devices 196 and 198 may include vertically and longitudinally extending grooves 260 and 262 for receiving and holding the flange receiving guides 180 and 182, the grooves 260 and 262 including the angled guide engaging surfaces 220 and 222 of wedge devices 196 and 198. In various embodiments, the side walls forming grooves 260 and 262 may facilitate wedge devices 196, 198 being held between the respective flange receiving guides 180 and 182 and flange 60, without sliding out from under the flange receiving guides 180 and 182. Grooves 260 and 262 may be defined in part by side walls of wedge devices 196, 198 which retain the wedge devices between flange receiving guides 180 and 182 and flange 60.

Wedge devices 196, 198 may include respective projections 270 and 272 which may act as stoppers to engage an edge of the flange 60. Projections 270, 272 may restrict sliding movement of wedged devices 196, 198 towards web 68 of the open member 42 (FIG. 2). This restriction of sliding movement may facilitate wedge devices 196, 198 being held in place while the flange receiving guides 170, 180 and 172, 182 are drawn together during tightening of mount 142 on flanges 60, 62 of open member 42.

Referring to FIG. 4, flange receiving guides 170 and 172 and the corresponding wedge devices 192 and 194 may include the same or substantially similar features to the flange receiving guides 180, 182 and the respective wedges 196, 198.

Wedge devices 196, 198 maybe made from high strength steel and may be designed with such a configuration and strength that when used, their surfaces which interface with guides 180, 182 with the lower flanges of the open structural members such as open member 42 (the latter being made from relatively softer material such as mild steel), that the surfaces of the wedge devices 196, 198 will bite/provide a small impression into the surface of the softer material. This co-operates with the other features of the wedge devices 196, 198 to provide for an enhanced, secure and non-lateral shifting connection.

Figure 1A:
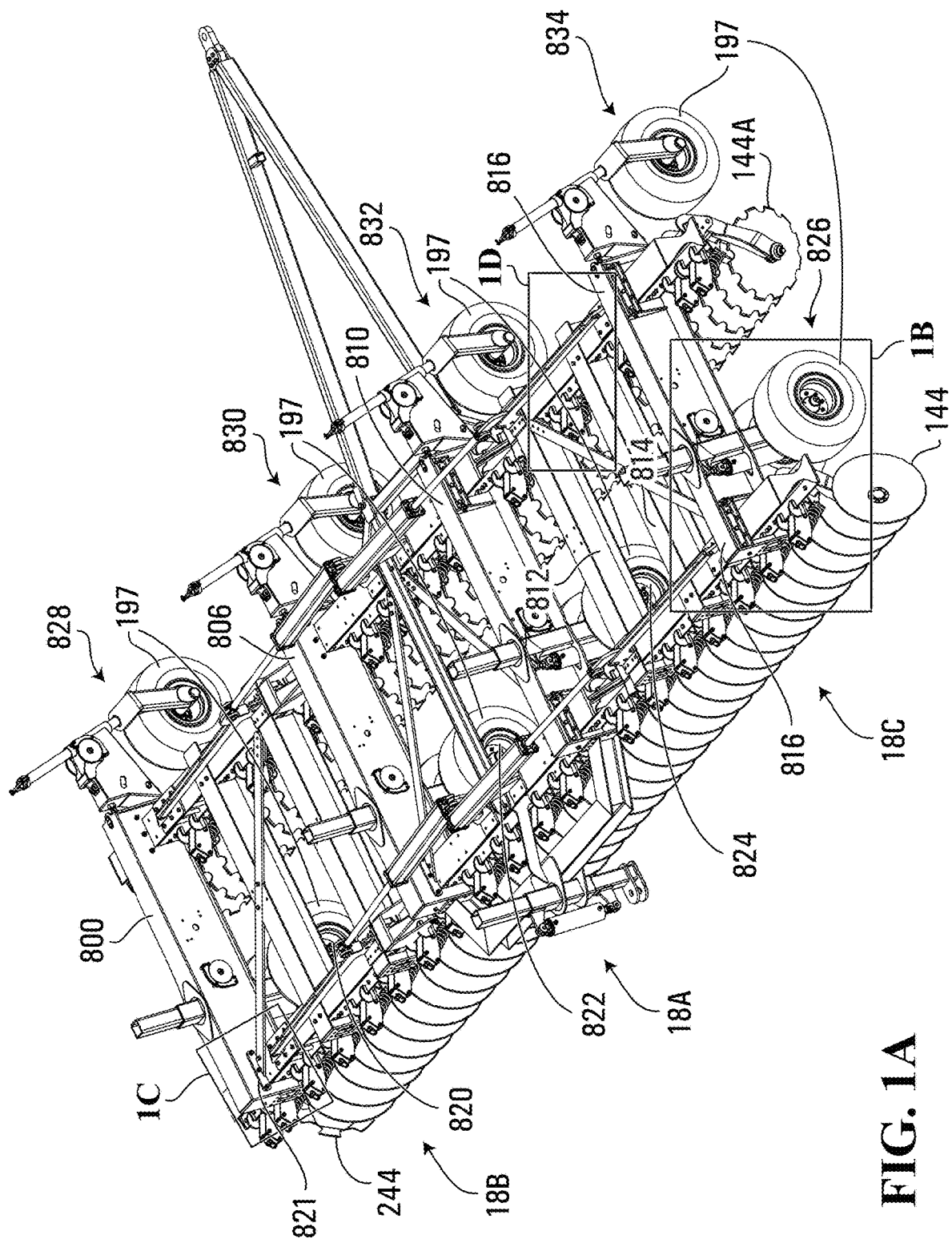
FIG. 1A is an enlarged view of the tillage apparatus of FIG. 1.

Referring to FIGS. 1, 1A and 6, as indicated above, frame 18 of tillage apparatus 10 includes transversely oriented (Direction Z) open members 28, 30, and 32 in front row 20 and transversely oriented open members 38, 40, and 42 in the rear row 22. Frame 18 of tillage apparatus 10 may also include longitudinally oriented (direction X in FIG. 1) row open structural members 800, 802, 804, 806, 808, 810, 812, 814, and 816 which inter-connect the open members of rows of open members 20 and 22. For example, in left side frame section 18B, open members 800, 802, and 804 are connected to front and rear open members 30 and 40; in central frame section 18A, open members 806, 808, and 810 are connected to the open members 28 and 38; and in in right side frame section 18C, open members 812, 814, and 816 are connected to open members 32 and 42. Open members 800, 806, 810, and 816 may have generally C-shaped cross sections; open members 802, 804, 812, 814 may be generally I-beam shaped members; and open member 808 may have a generally inverted T shaped cross section which may be made for example by joining two generally L-shaped channel members in back to back configuration to from a generally inverted T-shaped composite member.

Generally C-shaped open members 800, 806, that form part of left frame section 18B may have their channels directed outwardly from the central frame section 18A. Similarly, generally C-shaped open members 810, 816 that form part of right frame section 18C may have their channels directed outwardly from the central frame section 18A, in an opposite transverse direction to the channels of open members 800, 806. Open channel members 800, 806, 810, and 816 are adapted for supporting rear wheel supports 820, 822, 824 and 826 as described hereinafter.

The structural open members 800, 802, 804, 806, 808, 810, 812, 814, and 816 may be made from one or more suitable materials such as A36 mild steel.

With reference now to FIGS. 1, 1A, 1B, 1E and 6, representative examples of how the interconnection between the open channel members 800, 806, 810, and 816 may be made to the corresponding transversely oriented open members of front row of open members 20 and rear row of open members 22. In FIG. 1A, a representative example connection between open member 42 and open member 816 is illustrated. Open member 816 may have an upper flange 816c, a central web 816b and a lower flange 816a. Web 816b may have a cutout portion 816d thorough which open member 42 may be extend through. Open member 816 may also have an end plate 816e oriented generally vertically and transversely (directions Y and Z). Open member 816 may also have a support plate 816f that is also oriented generally vertically and transversely and may extend between upper flange 816c and lower flange 816a within the channel. Support plate 816f and end plate 816e may be connected to upper flange 816b, web 816b and lower flange 816a of open member 816 by for example welding.

Extending within the channel of open member 816 between support plate 816f and end plate 816e may be a generally L-shaped bracket 817 which may be bolted with nuts/bolts 839 through end plates to support plate 816f and end plate 816e. One leg of bracket 817 may be bolted with bolts 819 to web portion 816b of open member 816. The bolts 819 may pass through web 816b and through a rear bracket 821 positioned against a rear surface of web 816b and be secured with nuts [See in FIG. 1C, corresponding bracket 821 and bolts 819 associated with connecting open member 800 to open member 40 in the same manner; and see in FIG. 1E the corresponding connection between longitudinal open member 810 and transverse open member 38].

The other, bottom leg of bracket 817 may be bolted with bolts/nuts 821 to the upper flanges 64 and 66 of open member 42.

Additionally, lower flanges 60, 62 of open member 42 may be bolted to lower flange 816a of open member 816.

There are generally no fixed connections to the web portions of the transverse open members such as open members 42 such that the transverse. The top and bottom flanges of each transverse structural member such as open member 42 is connected at the top and bottom flanges of the longitudinal members such as members 816. Additionally, the transverse open members such as open member 42 are generally located at the end region/area of each longitudinal members. This combination still allows the longitudinal members to twist as may be required, because the web portions of the longitudinal members are not secured to other members along their lengths and thus there are no such members along their length to impede such twisting.

Figure 1B:
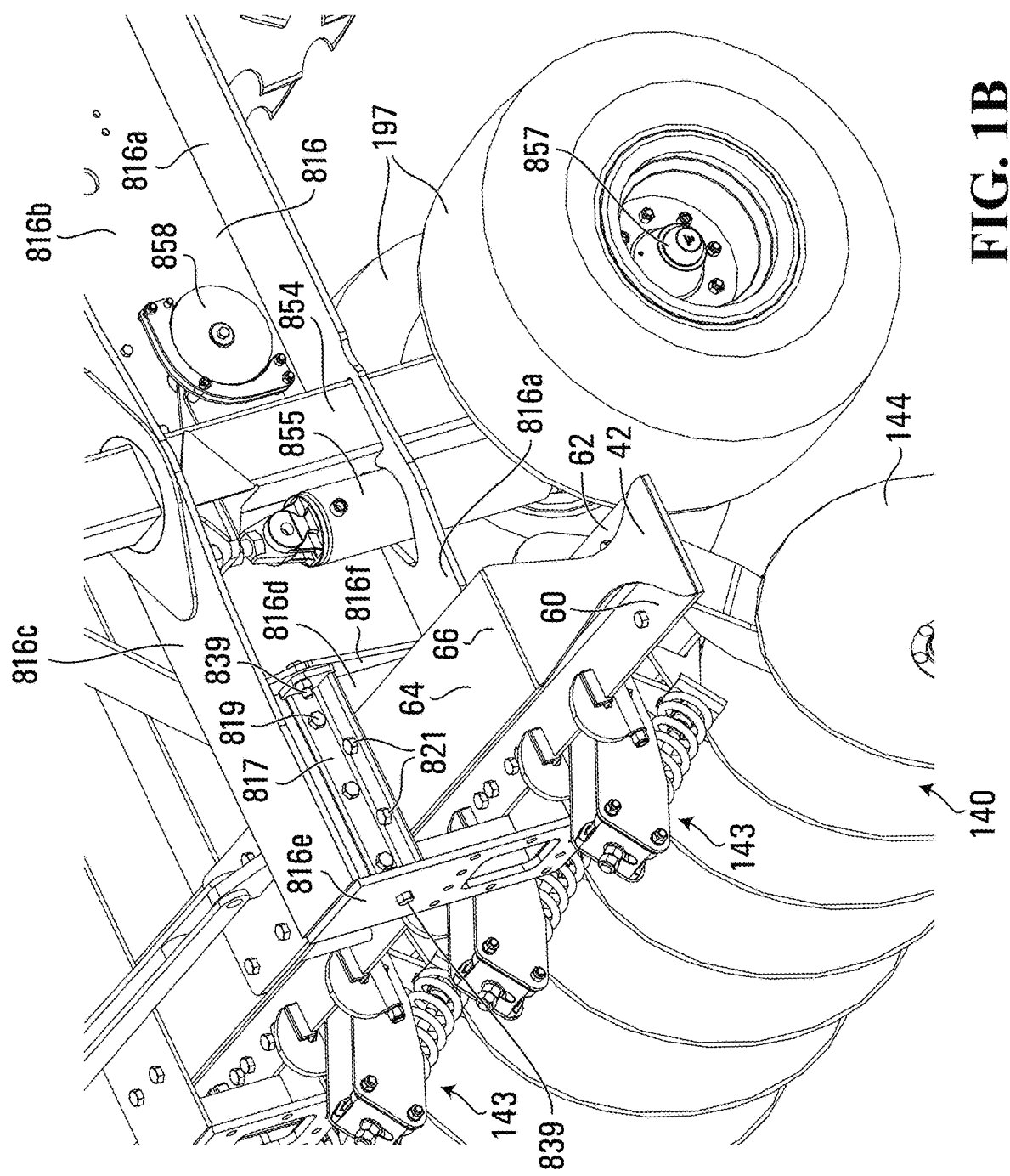
FIGS. 1B to 1E are enlarged views of portions of the tillage apparatus of FIGS. 1 and 1A.
Figure 1C:
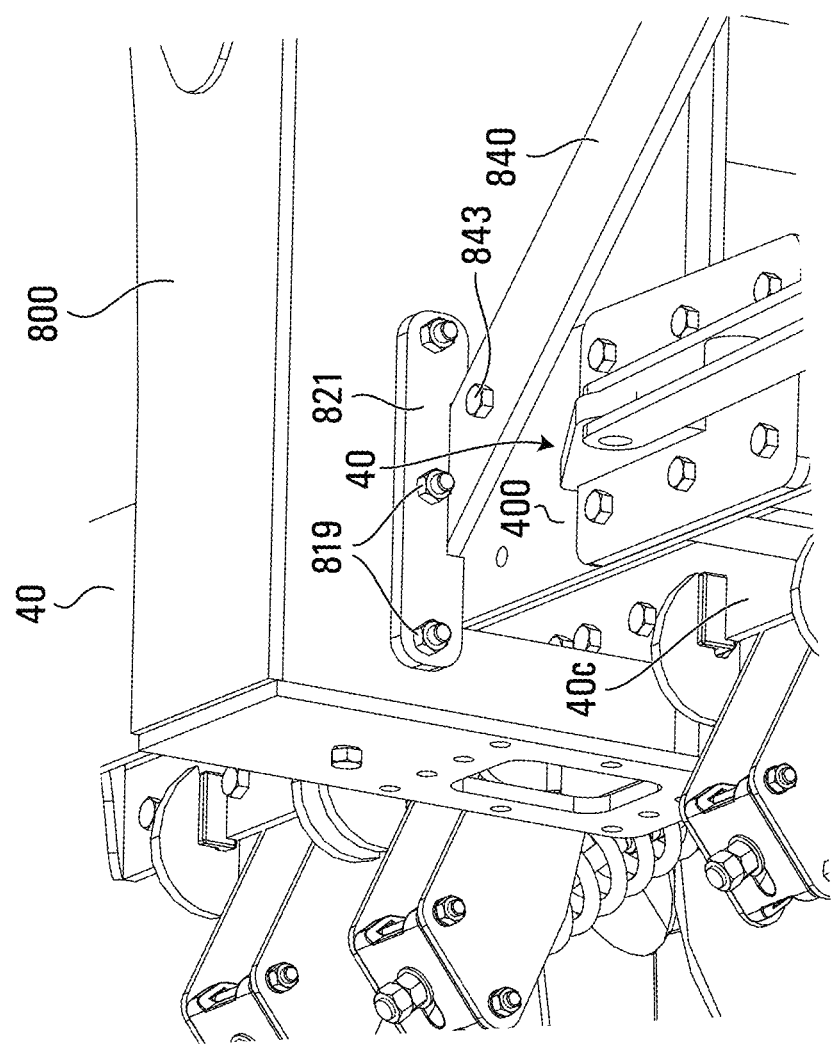
Figure 1D:
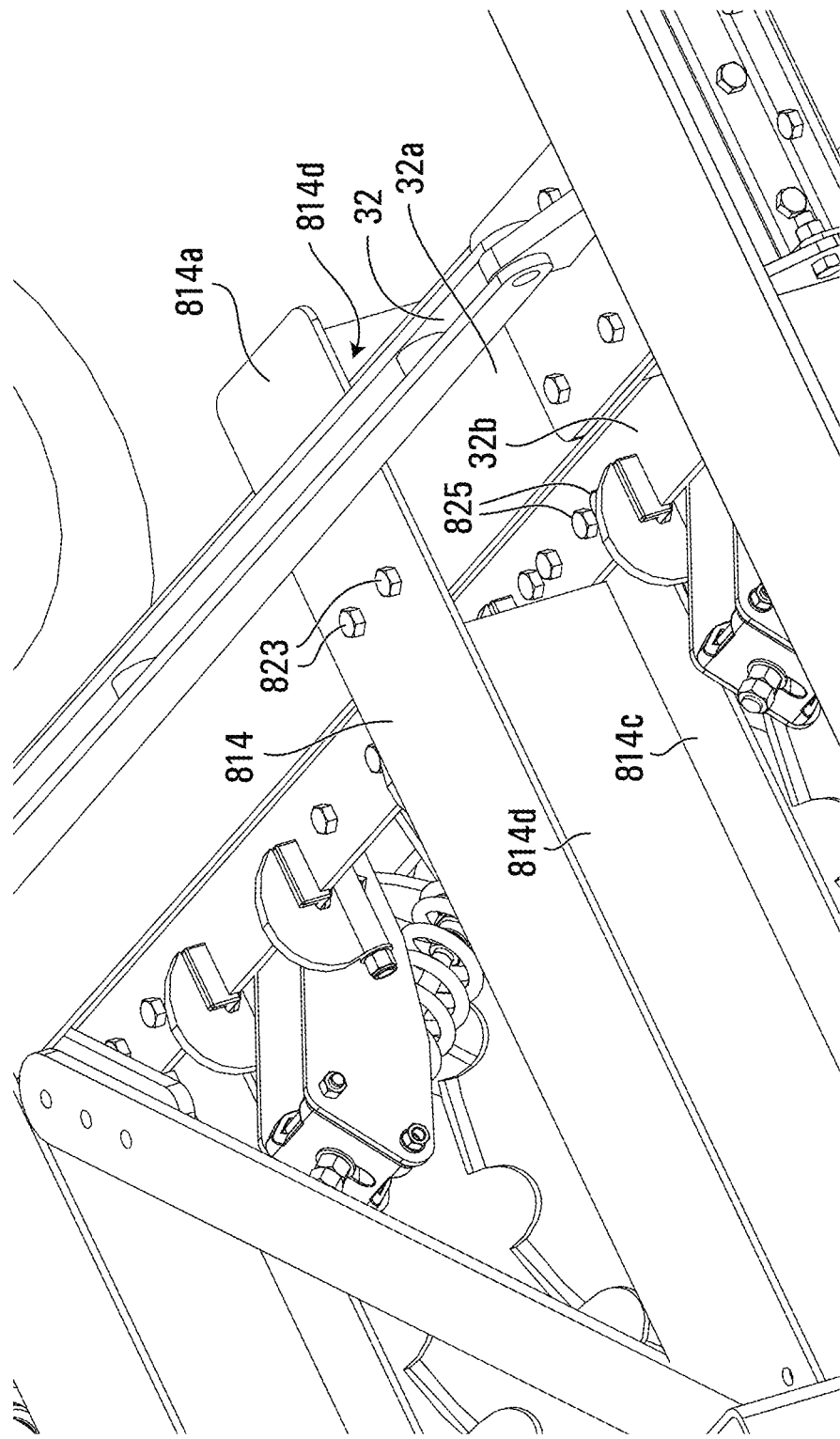
Figure 1E:
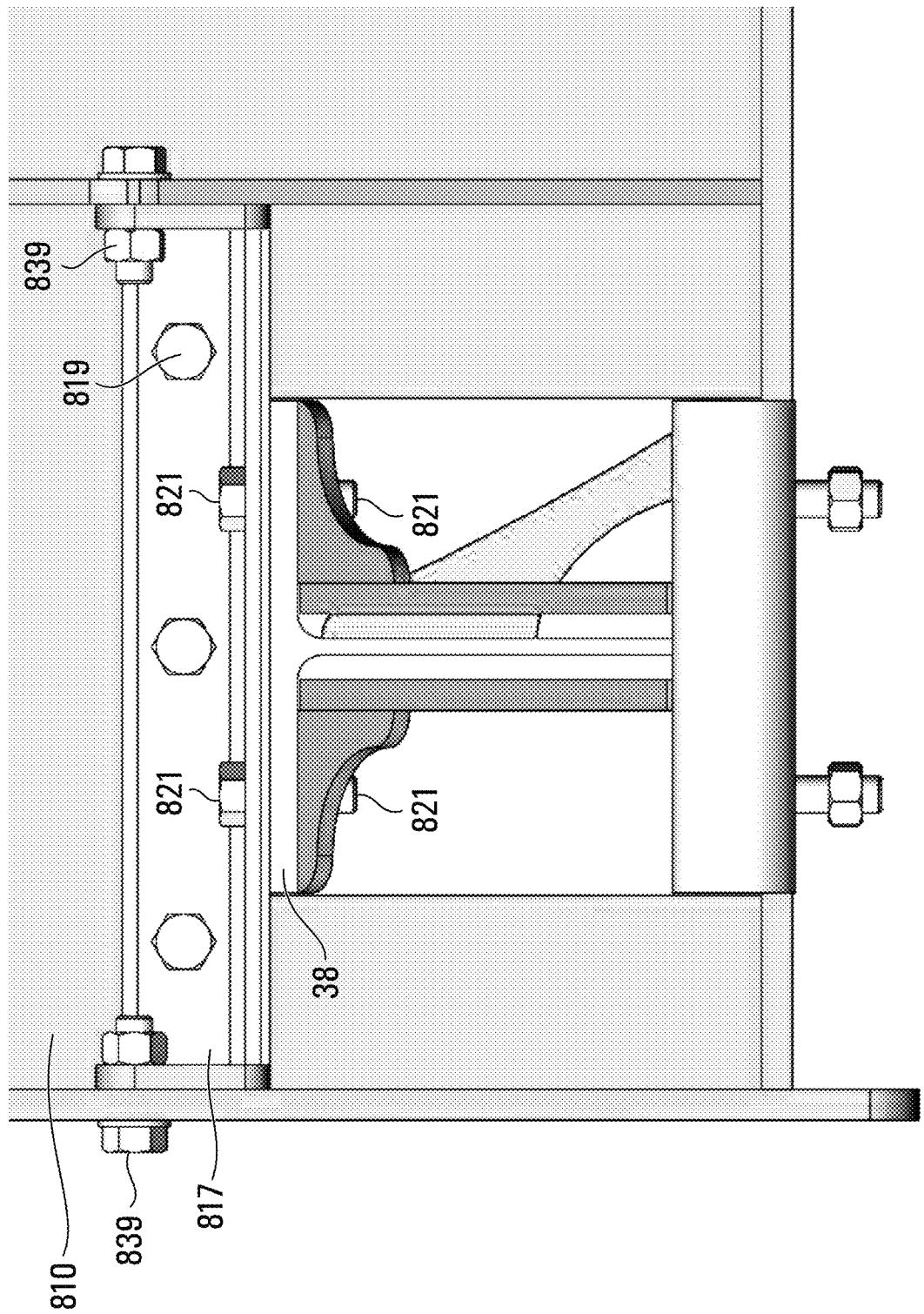

With reference now to FIGS. 1, 6 and 1D, a representative example of how the interconnection between the intermediate open channel members 802, 804, 812, and 814 may be made to the corresponding transversely oriented open members of front row of open members 20 and rear row of open members 22. In FIG. 1D, a representative example connection between open member 32 and open member 814 is illustrated. Open member 814 may have upper flanges 814a, a central web 814b and lower flanges 814c. Web 814b may have a cutout portion 814d thorough which open member 32 may be extend through. Bolts 823 may pass through upper flanges 814a and through upper flanges 32a of open member 32 and may be secured by nuts (not shown in FIG. 1D). Bolts 825 may pass through lower flanges 32c of open member 32 and lower flanges 814c of open member 814 and may be secured by nuts (not shown in FIG. 1D). In this way, open channel members 802, 804, 812, and 814 may be connected to corresponding transversely oriented open members of front row of open members 20 and rear row of open members 22 with only upper and lower flange connections. By only providing for flange to flange connections between these open members of each frame section, the frame sections are able to twist and deflect more easily than if there were connections between web portions of the members. This construction can assist in maintaining a relatively high degree of flexibility in the frame sections 18A, 18B and 18C and avoids the creation of "boxed" sections with limited flexibility and which may encounter enhanced levels of stresses from loads of multiple sizes and directions making them prone to cracking and failure. The neutral axis webs are not constrained.

Referring now particularly to FIGS. 1A, 6, 6A, and 6B, frame 18 may also include angled, open, load distribution members 840, 842, 844, and 846. Load distribution member 840 in left side frame section 18B may be fixedly connected to transverse open members 30 and 40, as well as to transverse open members 800, 802, 804. Similarly, load distribution member 846 in right side frame section 18C may be fixedly connected to transverse open members 32 and 42, as well as to transverse open members 812, 814, 816. The rigid connections may be made across and to the flange members of the respective open members. Each of the open member load distribution members 840 and 846 may extend at an angle relative to each of the open members to which they are connected. Referring to FIG. 6, the open member load distribution member 840 extends at an angle to the open members 30 and 40. By way of example, the angle may be between about 30 and 70 degrees, such as about 40 degrees. The open member load distribution member 846 may be generally similar to the member 840, but mirrored.

Figure 6A:
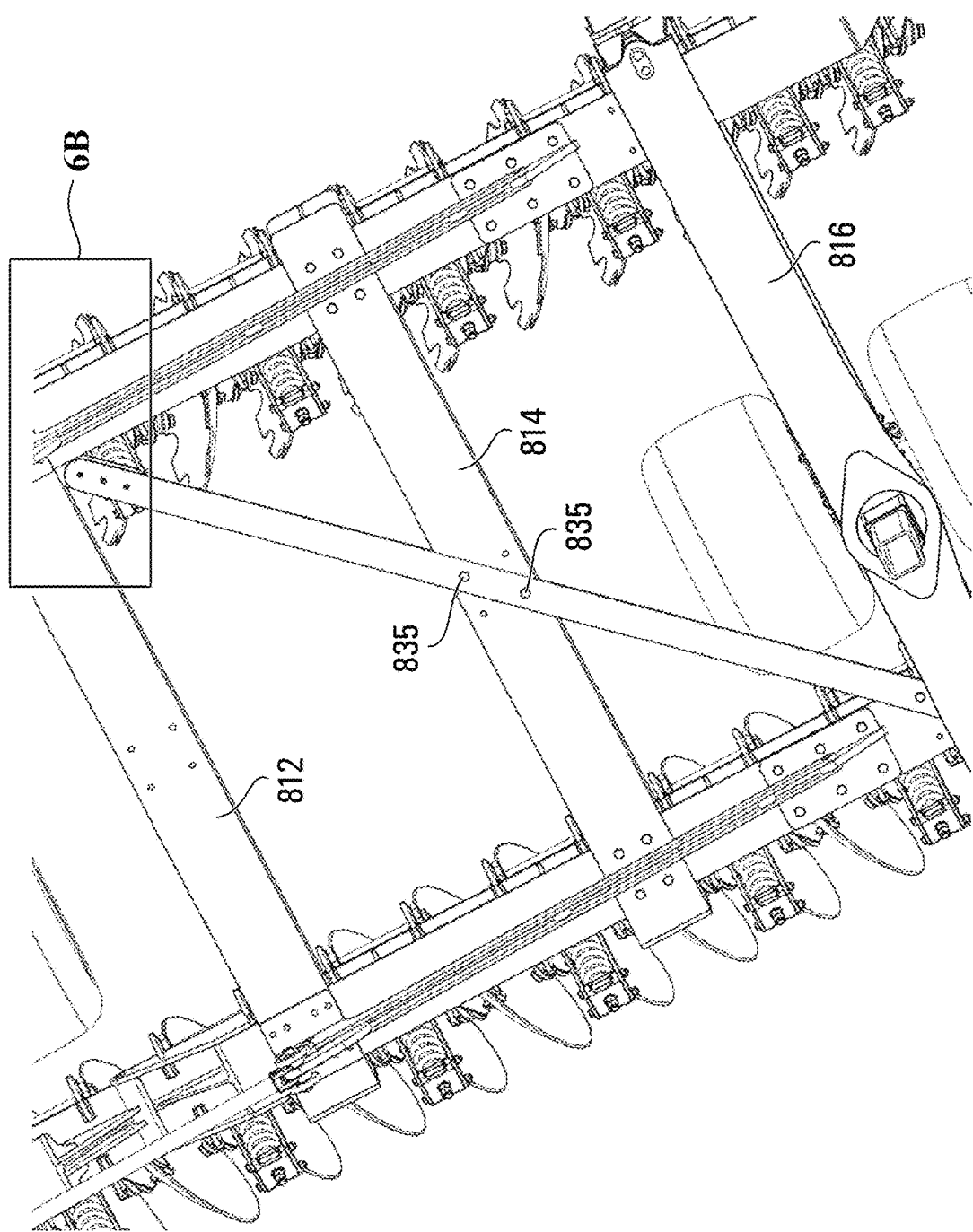
FIG. 6A is a top plan view of the part of the tillage apparatus shown in FIG. 1.
Figure 6B:
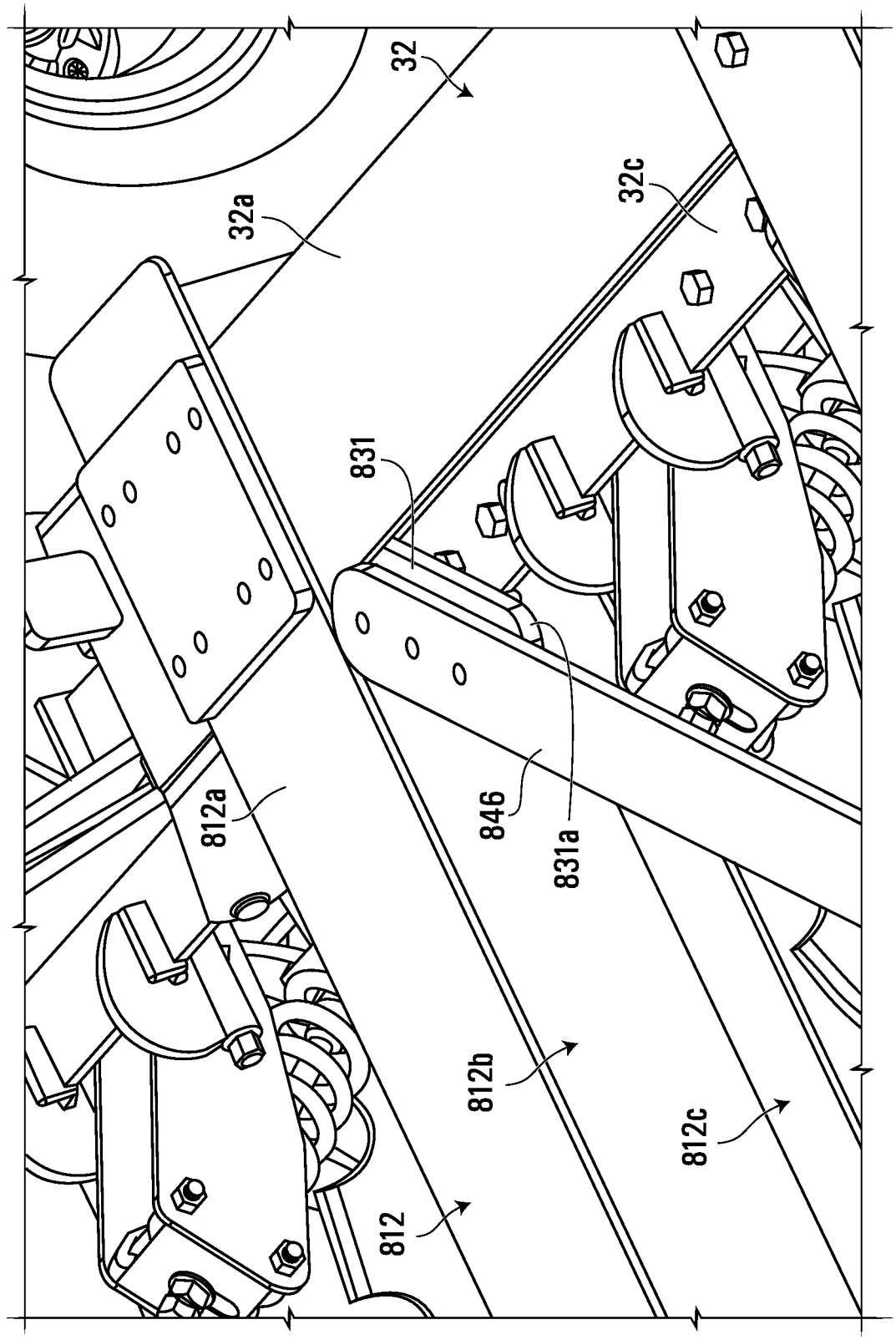
Figure 6C:
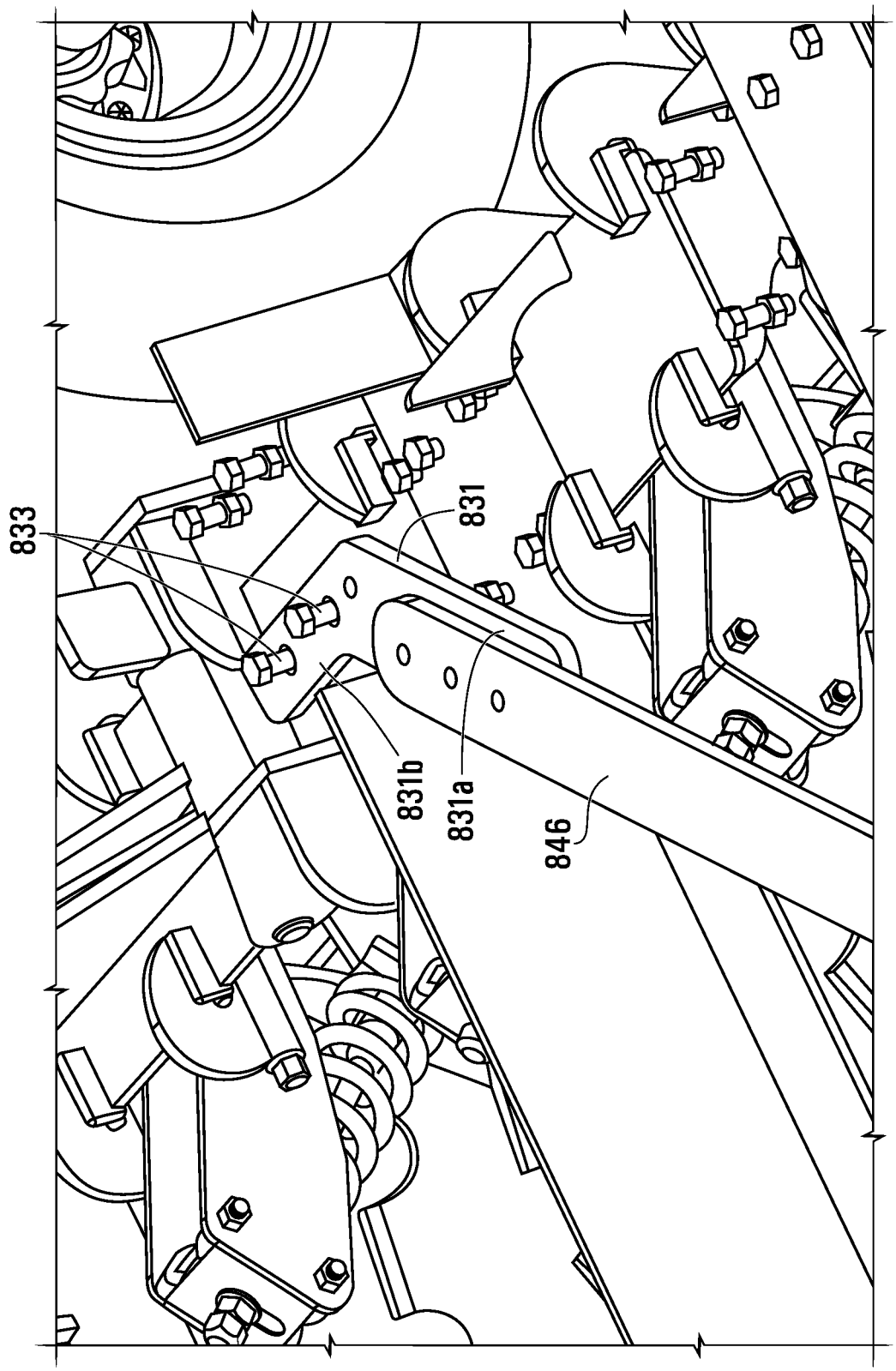

With particular reference to FIGS. 6A and 6B, a front end portion of load distribution member 846 may be fixedly connected with bolts to a leg 831a of an angled connector plate 831. The other leg 831b of connector plate 831 may be connected with blots 833 which pass through leg 831b as well as flange 32a of open member 32 and flange 812a of open member 812.

A similar connection may be made between front end portion of load distribution member 846 and open member 816.

Where load distribution member 846 crosses open member 814, it may be secured with bolts 835 (FIG. 6A) to the top flange of open member 814. Similarly where load distribution member 840 crosses open member 802, it may be secured with bolts) to the top flange of open member 802.

With reference to FIG. 1C, the rear end portion of load distribution member 840 may be secured with a bolt 843 that passes into top flange 40a of open member 40 and is secured with a nut (not shown). A rear end of load distribution member 840 may be received through an opening in bracket 821 and abut the rear surface of web portion of open member 800. This may reduce shear forces exerted on bolts 843 and reduce twisting at the bolt locations, thus assisting in maintaining tight connections.

Similarly, the rear end portion of load distribution member 846 may be secured with a bolt that passes into top flange 42a of open member 402 and is secured with a nut. A rear end of load distribution member 846 may be received through an opening in bracket like bracket 821 and abut the rear surface of web portion of open member 816.

Load distribution members 840 assists in distributing forces acting on the top flanges of each of the open members 32, 42 and particularly the longitudinal open members 812, 814, 816 in right frame section 18C. Similarly, load distribution member 846 assists in distributing forces acting on the top flanges of each of the open members 30, 40 and particularly the longitudinal open members 800, 802, 804 in left frame section 18B.

Figure 6E:
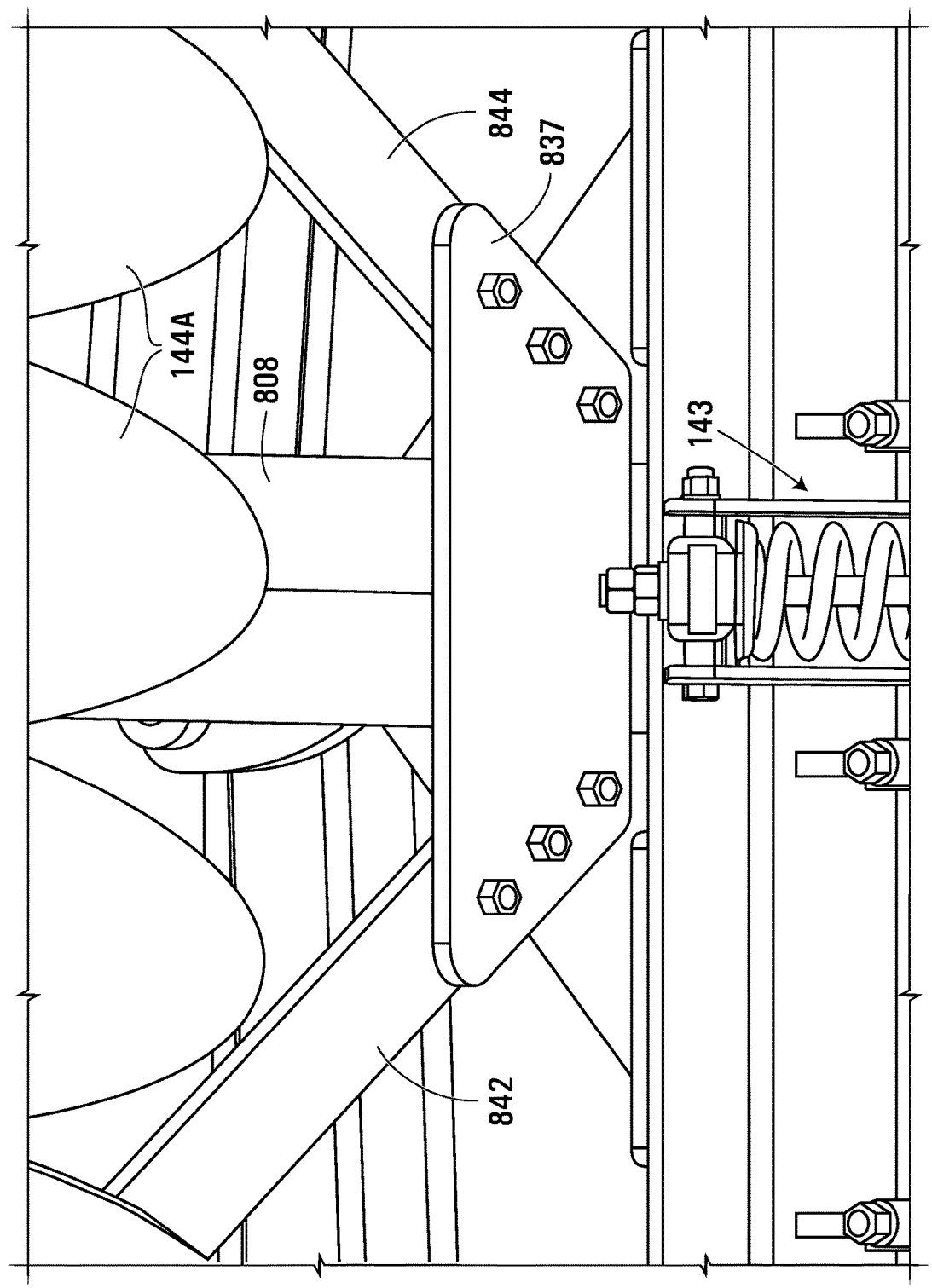
Figure 6F:
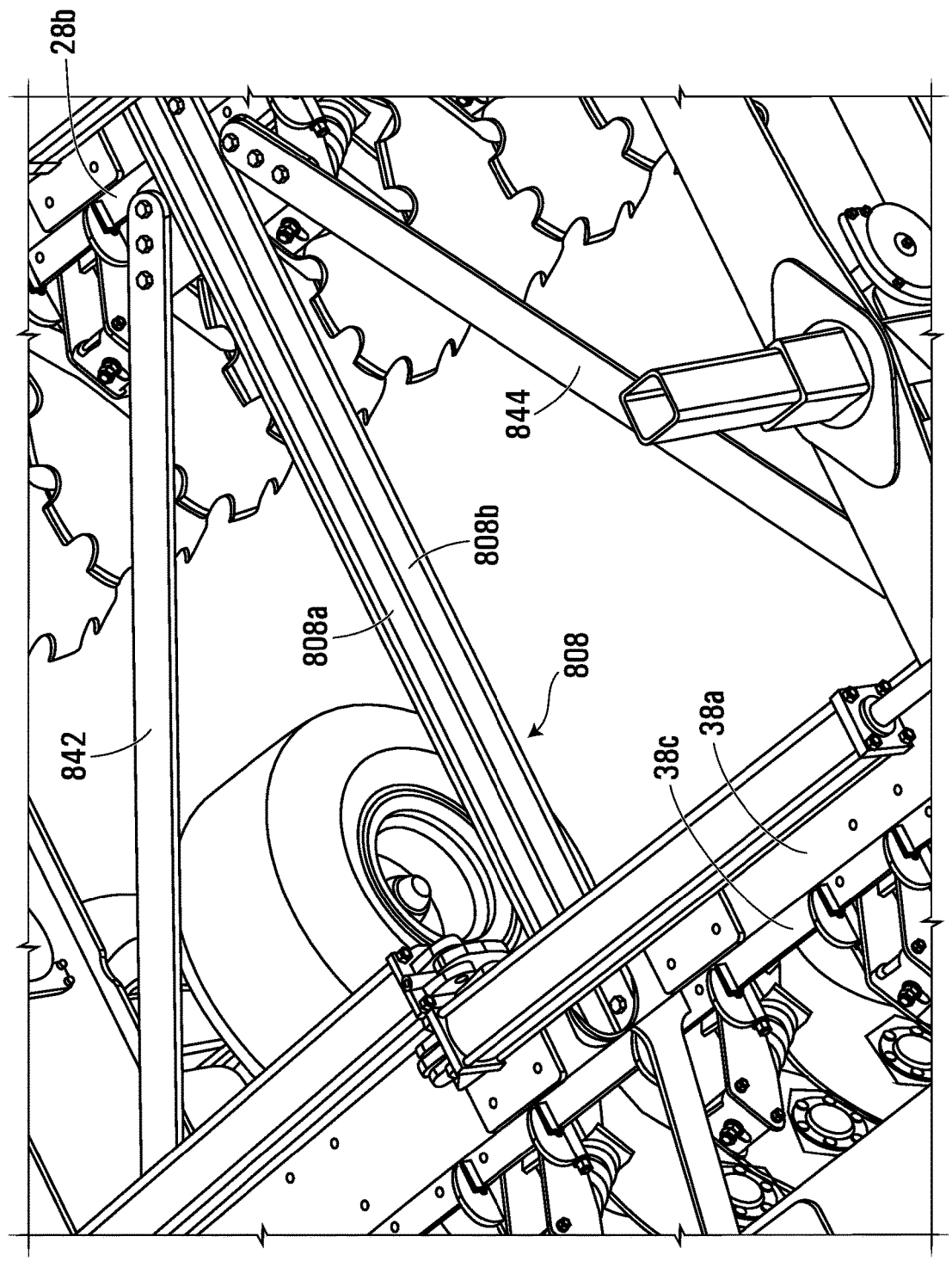

With reference to FIGS. 6D, 6E and 6F, the lower flanges 808b of central open member 808 may be bolted at a forward end to top flange 28a of central transverse open member 28. The lower flanges 808b at a rearward end of open member 808 may be bolted to a top flange 38a of central transverse open member 38.

Load distribution members 842 and 844, may function to provide a structure that may be fixedly connected at forward ends to a common, transverse plate 837 which is itself bolted to the lower flange 28b of transverse open member 28a. Load distribution members 842 and 844 extend at angles to open members 28 and 38. By way of example, the angles that open members 842 and 844 extend at relative to open members 28 and 38 may be between about 30 and 70 degrees, such as for example 60 degrees. In doing so open members 842 and 844 extend from corner to corner (middle front to longitudinal rear at angle) to provide cross bracing to keep frame section 18A generally square/rectangular in shape.

The use of the upper diagonal load distribution members 840, 842, 844, and 846 (see FIG. 1) prevents each of the frame sections 18A, 18B and 18C from trapezoiding (ie. collapsing) under heavy loading, which at the same time allowing the frame sections to bow while the tillage apparatus 10 is operating over uneven ground surface 16. This configuration provides stability to the frame sections 18A, 18B and 18C when loaded, both in normal forward movement during operation (eg. arrow 14 in FIG. 1) and in a reverse direction (as moving the tillage apparatus in the opposite direction while the ground engagers 140 are penetrated in the ground may sometimes be required. This may result in a reduction in shear forces acting on the bolts connecting members.

It should be noted that many components of frame sections 18A, 18B and 18C as described herein are configured to be bolted together. This allows the tillage apparatus to be more easily transported/delivered as a kit to an at least an initial user/customer location where it can be assembled relatively easily, without the need for a large amount of on-site welding at the user/customer.

With reference again to FIGS. 1A and 6, tillage apparatus 10 may include variable height rear wheeled supports 820, 822, 824, and 826 and the C-shaped cross sections of the open members 800, 806, 810, and 816 may facilitate wheeled supports 820, 822, 824, and 826 being mounted to respective open members 800, 806, 810, and 816, through openings in upper and lower flanges of these open members.

Tillage apparatus 10 also includes front variable height wheeled supports 828, 830, 832, and 834 connected to the open members 800, 806, 810, and 816 respectively generally at forward ends of the open members.

Wheeled supports 820-834 may act as surface following supports and may generally control the relative height/distance of frame 18, and frame sections 18A, 18B and 18C from ground surface 16. Some or all of wheeled supports 820-834 may each be associated with one or more hydraulic cylinders which are configured to vary the height of the frame 18 and its frame sections 18A-C, as described in further detail below.

Referring back to FIG. 1, in operation, tillage apparatus 10 may be moved across the surface 16 in the direction shown by the arrow 14 while supported by the wheeled supports 820-834 (see FIG. 6) with wheels 197 and the ground engagers 140 may condition the surface 16 as they are pulled across the surface. In various embodiments, as described above, the pivotal connectors 80, 82, 84, and 86 may facilitate differences in the orientation of adjacent open members such that each of the open members 28, 30, 32, 38, 40, and 42 of respective fame sections 18A-18C extends generally parallel or tangential to a contour of the surface below the open member. The ground engagers 140 may, in response to engaging the surface 16, flex one more of the open members 28, 30, and 32, and 38, 40, and 42 at least rotationally to facilitate the ground engagers following specific contours of the surface 16. This flexibility may be provided at least in part by the open member construction of the open members 28, 30, 32, 38, 40, and 42, and of the open members 800, 802, 804, 806, 808, 810, 812, 814 and 816, and the way in which they are interconnected. The flexibility may also be provided at least in part by the way that mount 142 of the ground engagers 140 are coupled to the lower flanges of the open members 28, 30, 32, 38, 40, and 42.

In various embodiments, the pivotal connections between the open members together with the flexibility of the open members in response to force or torque applied by the ground engagers may facilitate each ground engager maintaining a precise and consistent level or depth of engagement with the surface 16. In various applications, such a precise and consistent level of engagement with the surface 16 may result in healthy crops and high yields for crops grown in soil defining the surface 16. Precise and consistent levels of engagement may reduce wear and tear on machines used during tillage.

Referring still to FIG. 1, in various embodiments, the tillage apparatus 10 may include actuators 860, 862, 864, and 866 which are configured to raise or lower outer portions of the tillage apparatus 10 to reduce a width of the tillage apparatus during transport, for example. In the embodiment shown, the actuator 860 is coupled to the open members 30 and 28, the actuator 862 is coupled to the open members 28 and 32, the actuator 864 is coupled to the open members 38 and 40, and the actuator 866 is coupled to the open members 38 and 42. In operation, the actuators 860-866 may be retracted to raise the open members 30, 32, 40, and 42 such that the open members 30, 32, 40 and 42 pivot about the pivotal connectors 80, 82, 84, and 86. In various embodiments, the actuators 860-866 may be actuators which are configured to lift and hold substantial weight, such as, for example hydraulic actuators.

Figure 15A:
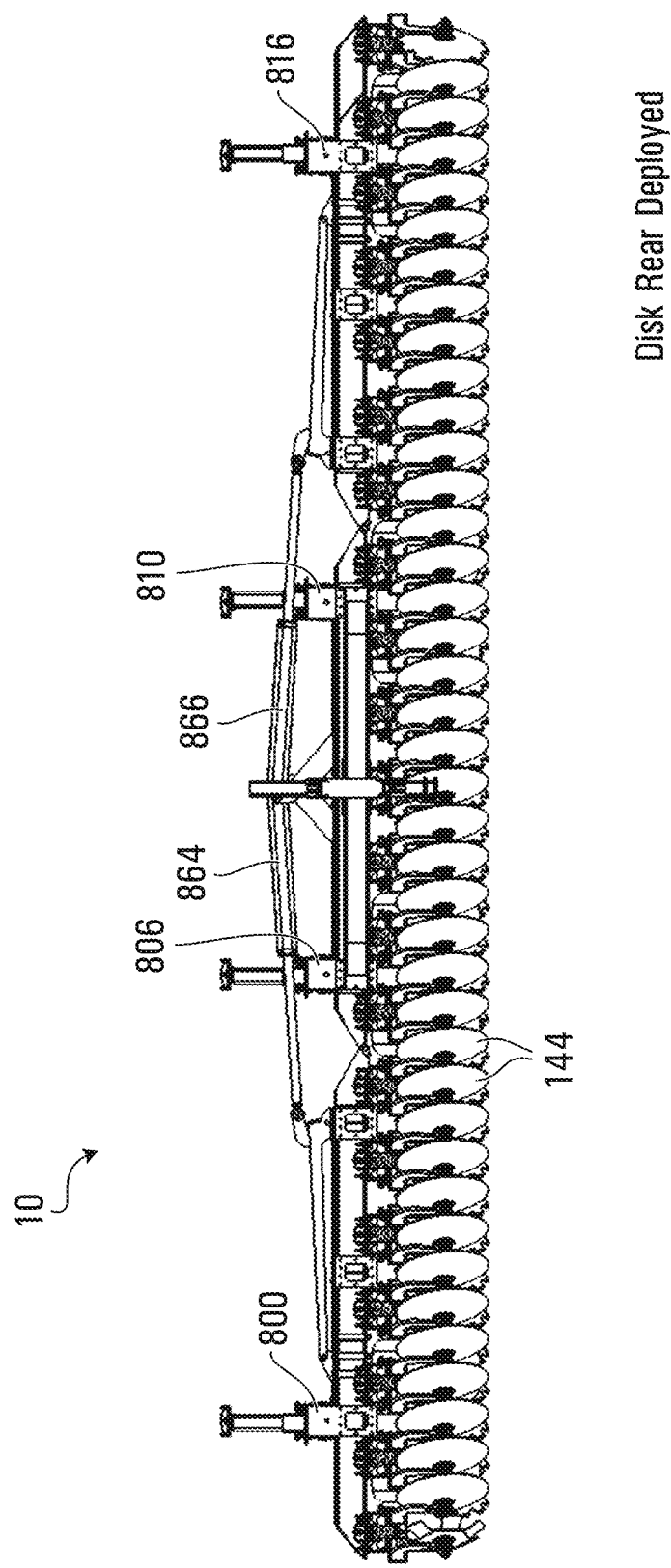
FIG. 15A is a rear elevation view of the tillage apparatus of FIG. 1 in a deployed configuration.
Figure 15B:
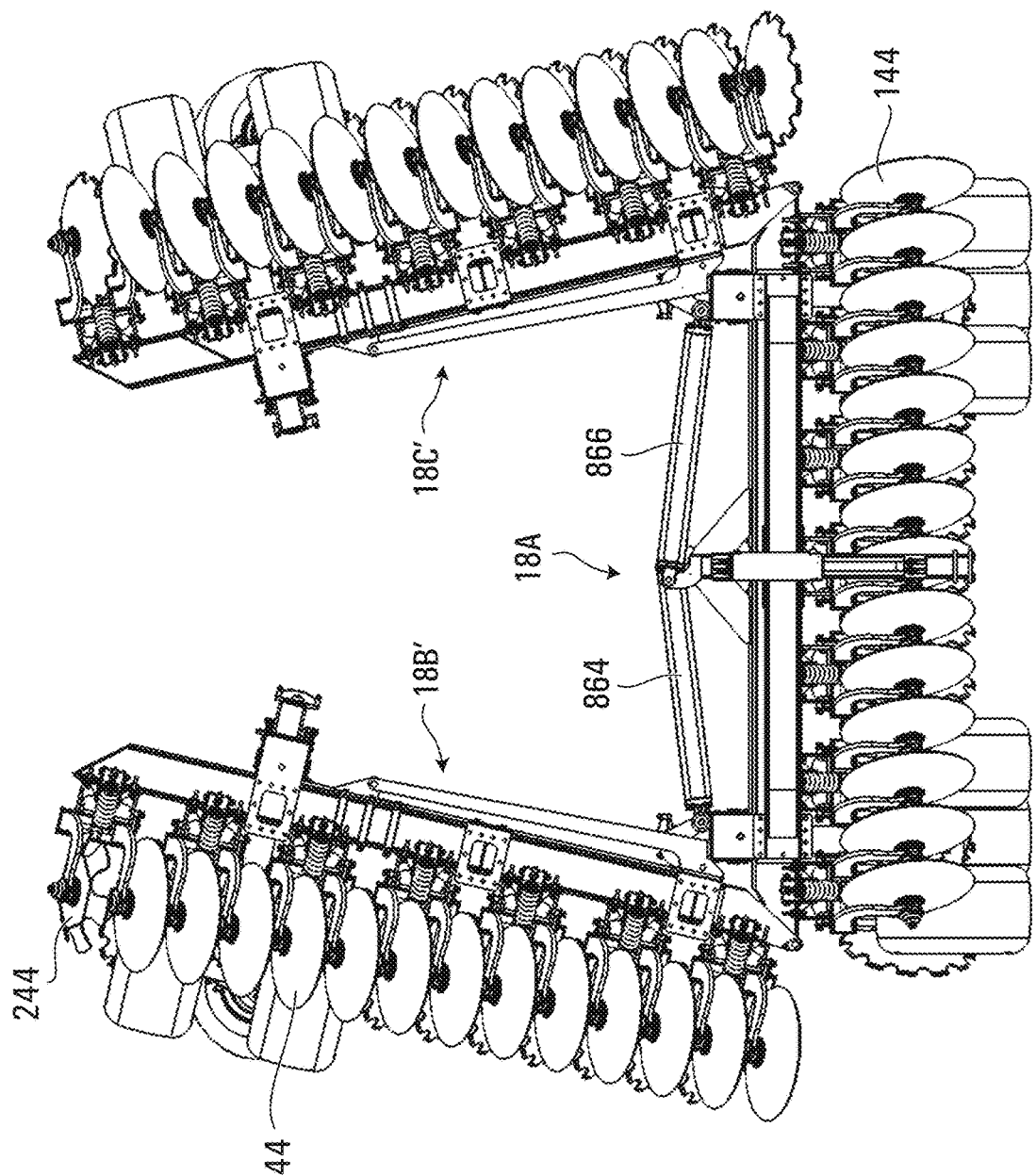
FIG. 15B is a rear elevation view of the tillage apparatus of FIG. 1 in a transport configuration.

With reference to FIG. 15A, apparatus 10 is shown in a deployed operational orientation. In FIG. 15B, apparatus 10 is shown in a raised orientation that may be suitable for storage and/or transportation.

Figure 12:
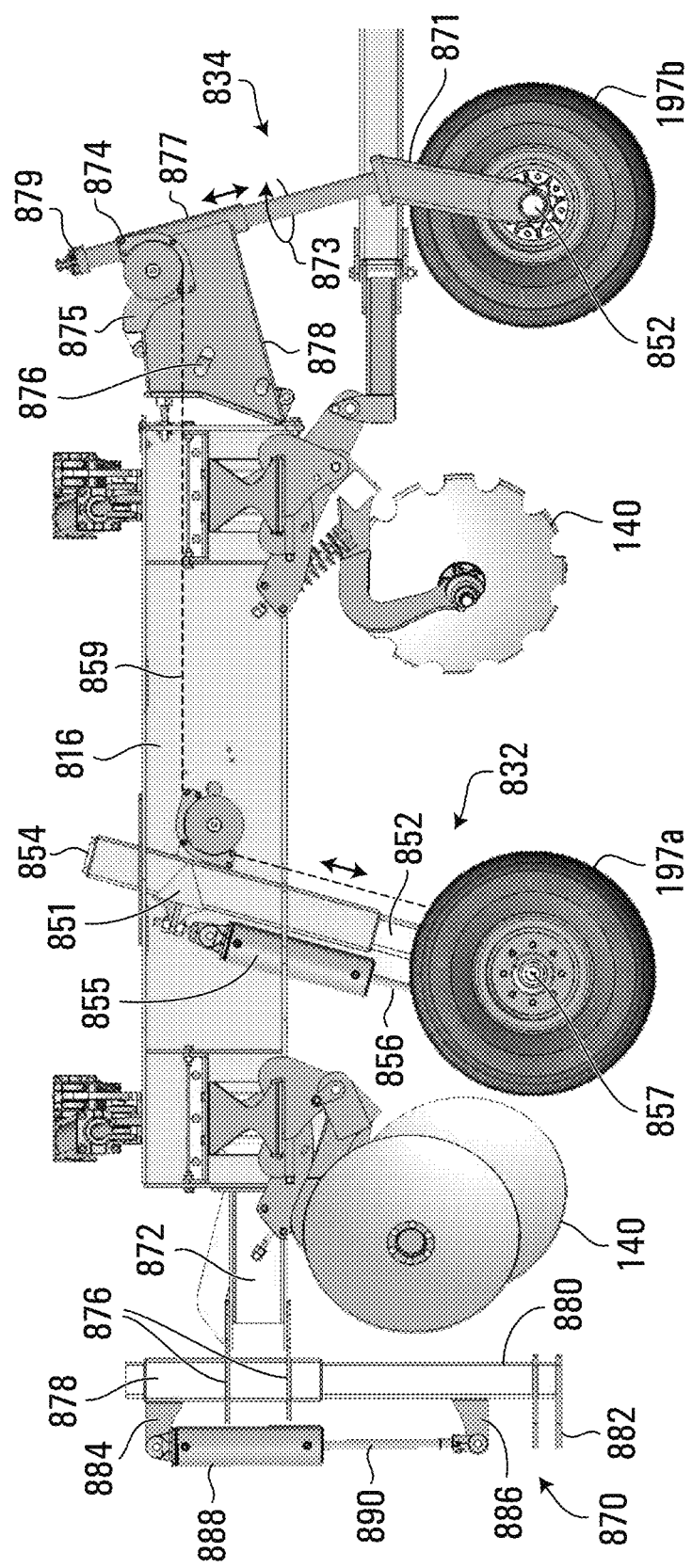
FIG. 12 is a side view of a portion of the apparatus of FIG. 1.
Figure 12A:
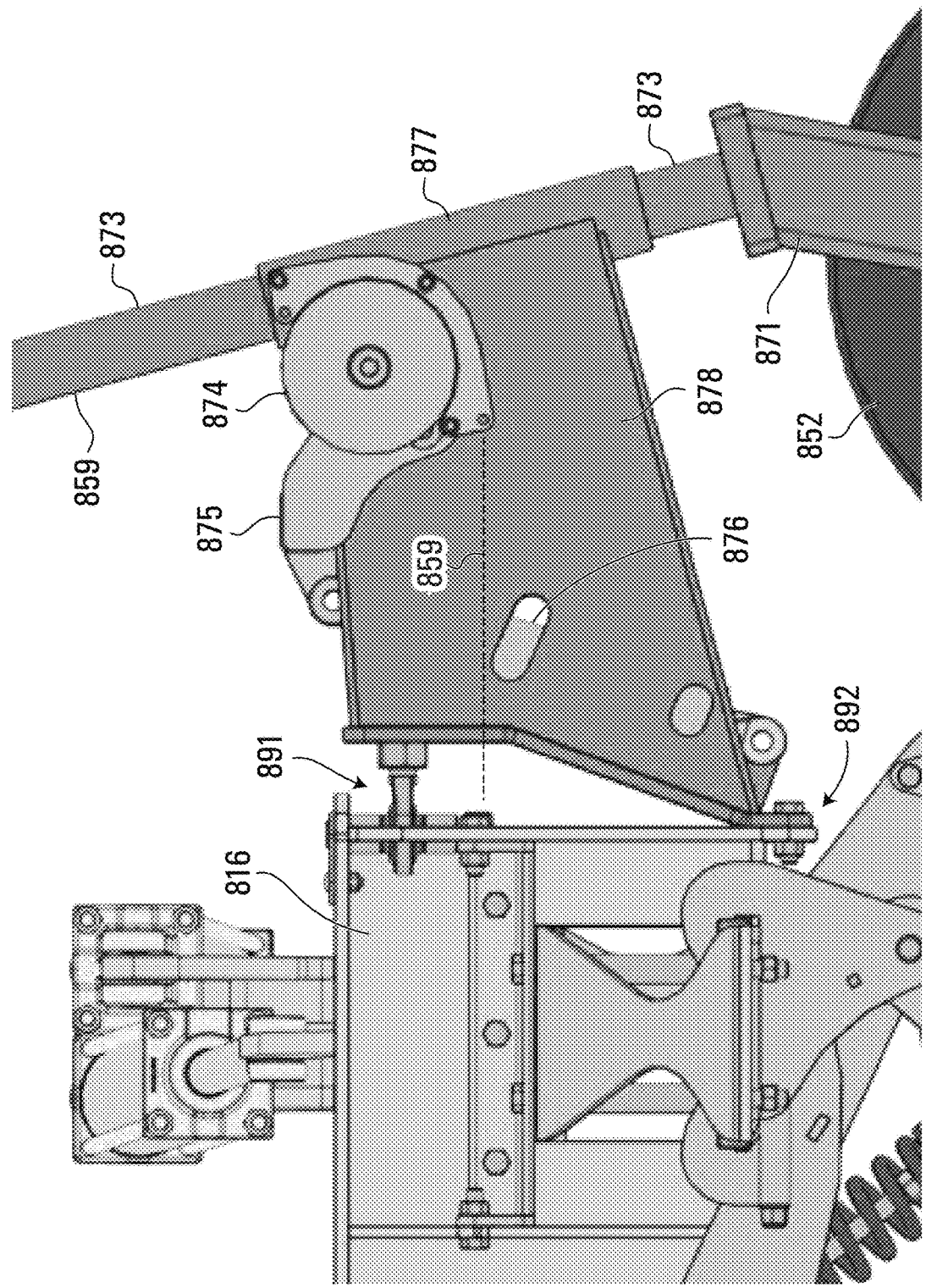
FIG. 12A is an enlarged side view of a part of portion shown in FIG. 12 of the apparatus of FIG. 1.
Figure 12B:
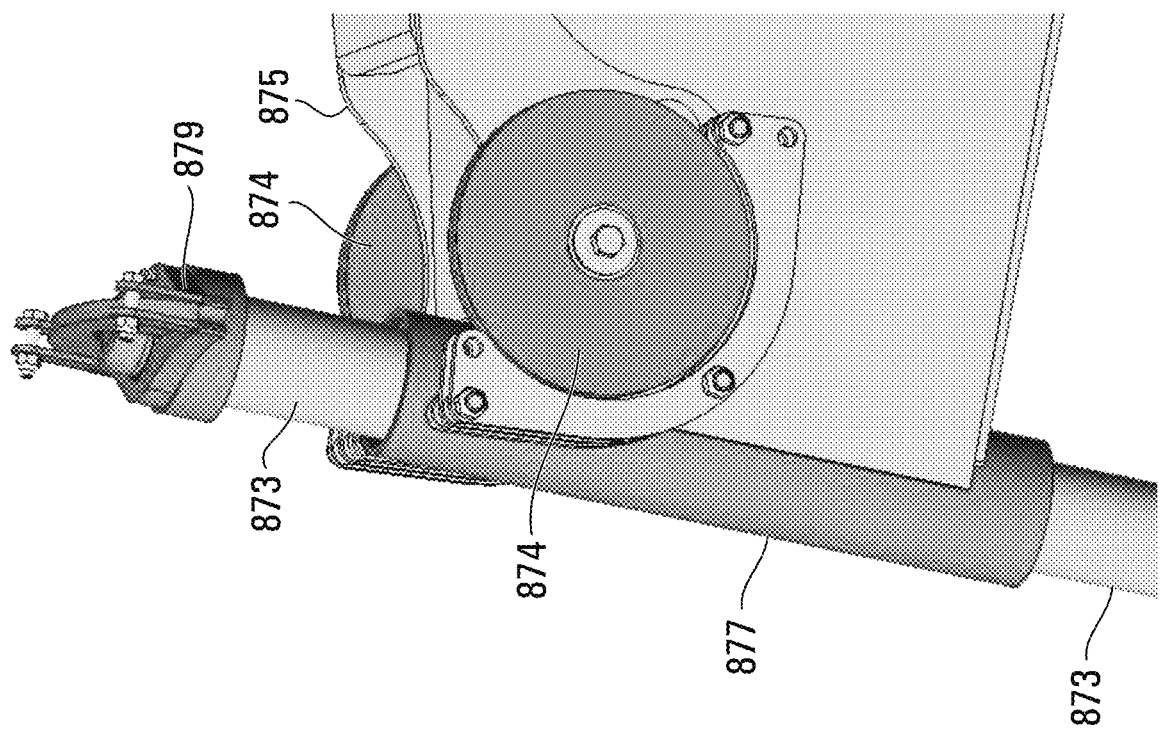
FIG. 12B is an enlarged perspective view of a part of the portion shown in FIG. 12 of the apparatus of FIG. 1.
Figure 12C:
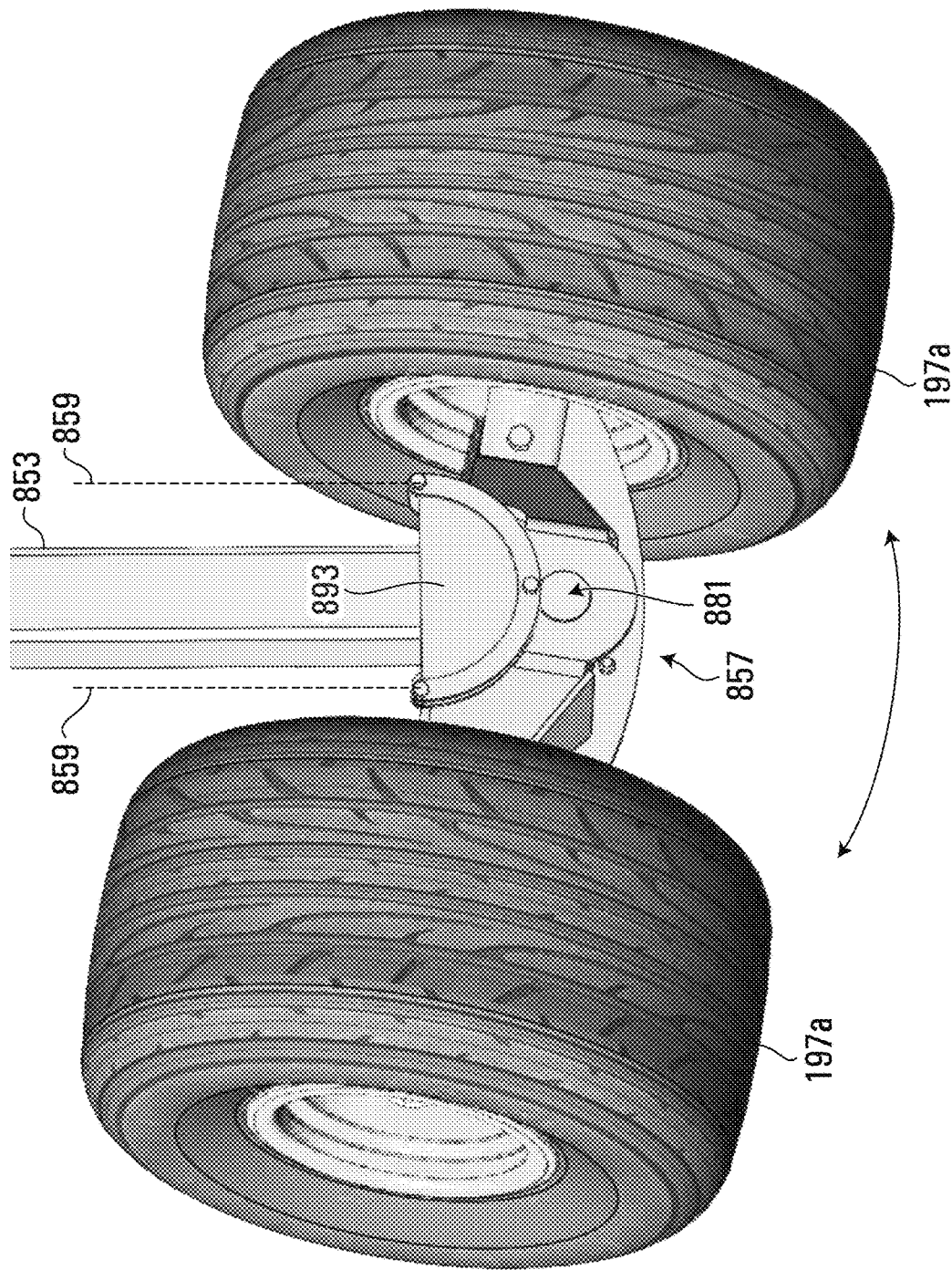
FIG. 12C is an enlarged perspective view of a portion shown in FIG. 12 of the apparatus of FIG. 1.

The height of each of longitudinally oriented open members 800, 806, 810, and 816 above ground surface 16 may be controlled and thus the height of each of the frame sections 18A, 18B and 18C may be controlled. With reference to FIGS. 12 to 12I, a representative example of the rear wheeled supports, rear wheeled support 832, is illustrated and may include a pair of transversely spaced apart rear wheels 197a supported at one lower end of a leg member 853. The wheels 197a may be attached to an axle/hub mechanism 857 (FIG. 12C) that is connected to leg member 853 in such a manner as to allow for free rotation of the wheels about the axis of the axle/hub 857. Leg member 853 may be generally rectangular in cross section and tubular and may be receivable for axial movement relative to a supporting hollow tubular support 854.

Axle/hub mechanism 157 may include a longitudinally oriented shaft 891 that allows wheels 197a to pivot transversely about the shaft. The main wheel axle may be aligned with the center section 18A of tillage frame 18. This allow the mass of the frame to be distributed between (eg. equally shared on) both wheels 197a when moving on uneven ground surface. This may be helpful or even necessary when the apparatus 10 is in the transport orientation (FIG. 15B) and moving on non-flat surfaces such as crowned roads. This may avoid the maximum tire pressures for wheels 197a being exceeded. It should be noted that the rotation is bi-directional.

Figure 12D:
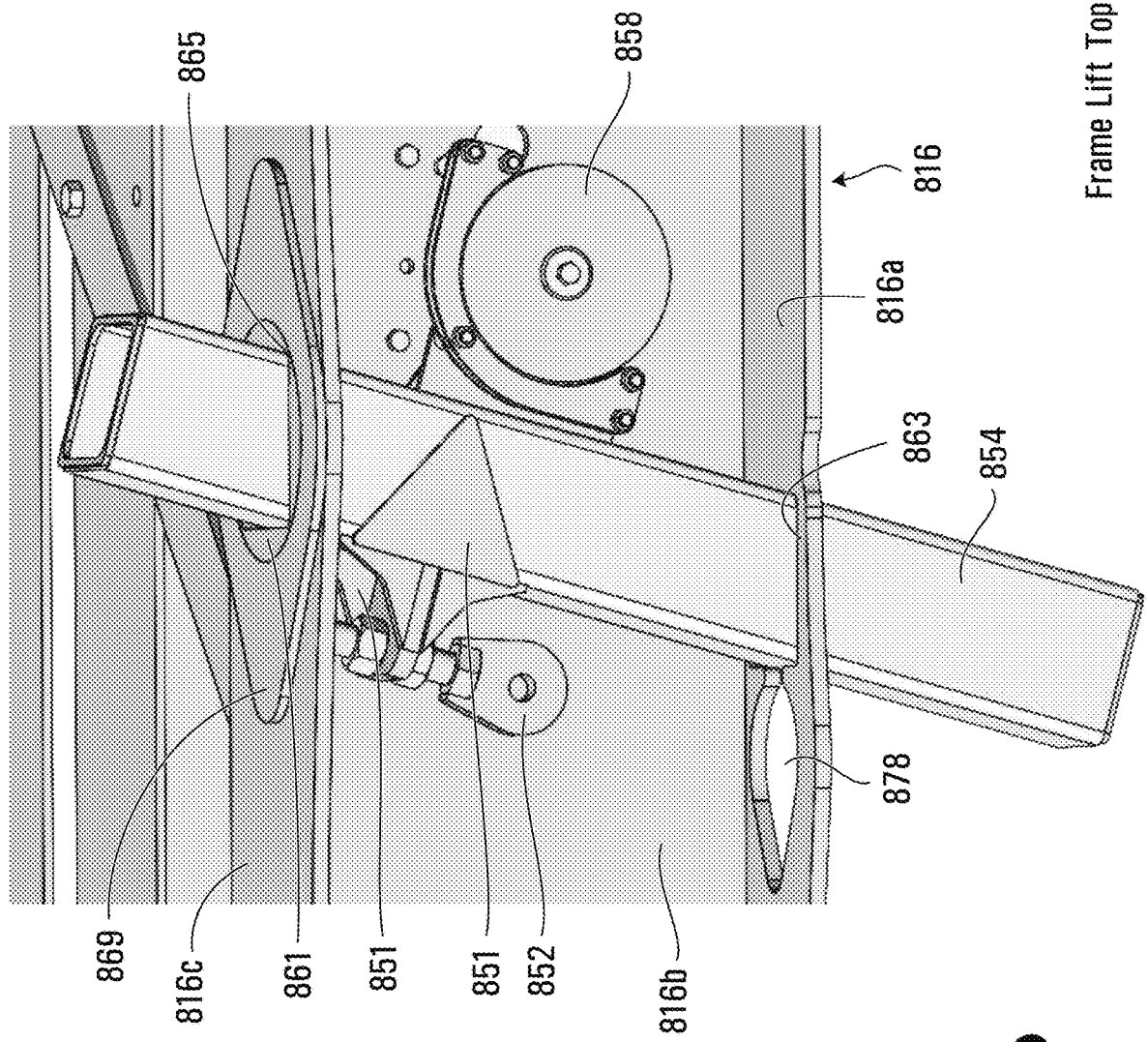
FIG. 12D is an enlarged side view of a part of the portion shown in FIG. 12 of the apparatus of FIG. 1.
Figure 12E:
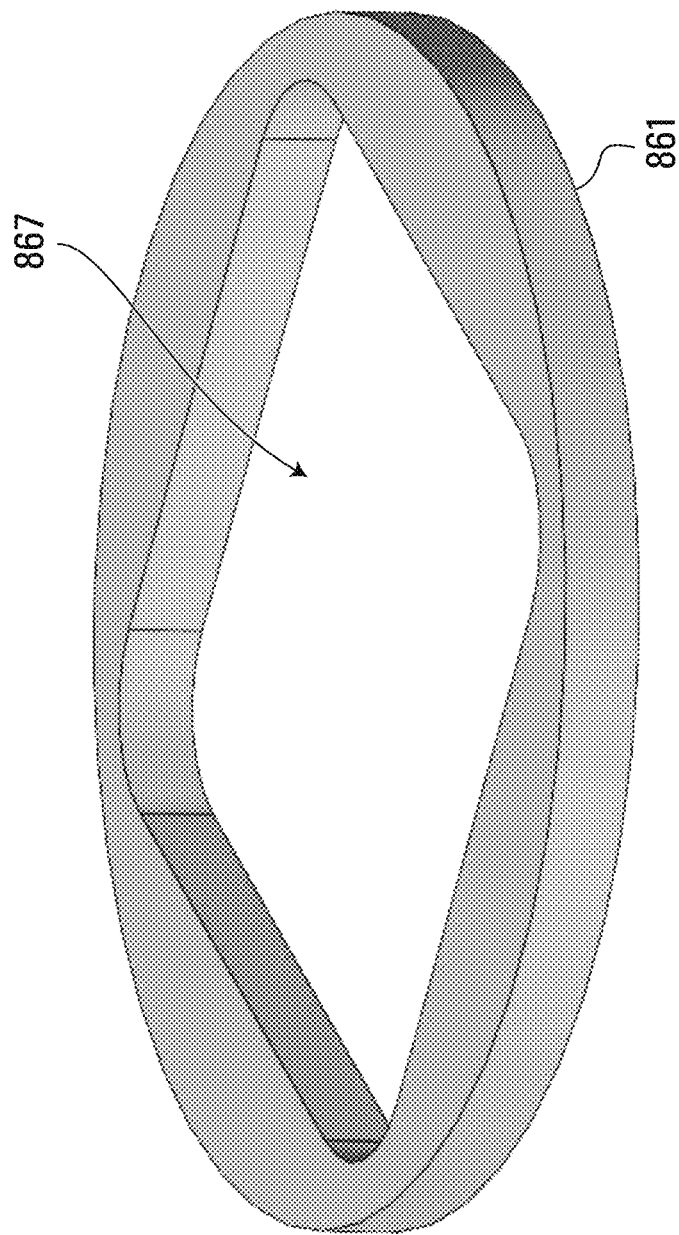
FIG. 12E is an enlarged perspective view of a part of the portion shown in FIG. 12 of the apparatus of FIG. 1.

With additional reference to FIGS. 1B, 12D, 12E tubular support 854 may be mounted so as to extend from a location above open member 816, through an opening 865 in upper flange 816c of open member 816, within the channel of open member 816 next to web 816b, and through and opening 863 in lower flange 816a to a location beneath lower flange 816a. Tubular support 854 may be fully welded to lower flange 816a to provide for a rigid connection at that location. However, the connection between the upper flange 816c and the tubular support 854 may be floating, such that there is a limited degree/amount of horizontal movement of tubular support 854 relative to upper flange 816c, although vertical movement is substantially prevented (eg. through the fixed connection at the lower flange 816a). A control ring 861 (FIG. 12E) may be positioned over opening 863 of upper flange 816c may be fixedly attached (such as by welding) to tubular support 864. Tubular support 854 may be received through the generally square opening 867 in control ring 861. Control ring 861 may be held within a support plate 869 (FIG. 12D). Support plate 869 may be secured such as by welding, to the upper surface of upper flange 816c and lay flat thereon. Control ring 861 may be configured to guide and support tubular support 854. The control ring 861 may guide tubular support 854 at the required angle. Another opening 878 in lower flange 816a is provided to permit a hydraulic cylinder 855 (FIG. 12) to be received there through.

Still with particular reference to FIG. 12D, a bracket 852 may be mounted such as by welding to tubular support 854. Bracket 852 may have a pair of spaced arms 851 which may be secured such as by welding to outer surfaces of tubular support 854. Tubular support 854 may be only secured such as by welding to lower flange 816a.

Tubular support 854 may thus be constrained in its movement horizontally and rotationally, to move with control ring 861. But upper flange 816c can twist to some extent relative to tubular support 854.

A two way acting hydraulic cylinder 855 may be interposed between open member 816 and axle/hub 857. Hydraulic cylinder 855 may have an upper end interconnected to bracket 852 which has describe above is also secured to tubular support 854. Hydraulic cylinder 855 may have an extendible piston rod 856. The end of piston rod 856 may be connected to axle/hub 857. The operation of hydraulic cylinder 855 may be controlled by an actuator and/or controller (as described further hereinafter), which may control valves in a hydraulic fluid circuit to control the flow of pressurized hydraulic fluid to and from hydraulic cylinder 855. By extending piston rod 856, the distance between wheel 197a and the open member 816 may be increased, and by retracting the piston rod 856, the distance between wheel 197a and the open member 816 may be decreased.

Secured to opposed sides of web portion 816b of open member 816 may be a pair of pulley devices 858 (only one of which is visible in FIG. 12). One or more cables (such as a single continuous cable 859) may be secured around an arcuate guide 893 which may be fixedly mounted to axle/hub 857 associated with wheels 197a. Cable 859 may extend around arcuate guide 893 of axle/hub 857 (see FIG. 12C) upwards on both sides to transversely opposed rearward pulley devices 858 and then follow curved paths around pulley devices 858 on opposite sides of web 816b of open member 816 and extend to a pair of corresponding opposed forward pulley devices 874 associated with front wheeled support 834 (see FIG. 12B).

With reference to FIGS. 12, 12A, 12B, 12F and 12G, a representative example of the front wheeled supports, front wheeled support 834 is also illustrated and may include a single caster wheel 197b supported at one end of a leg member 871 which may be attached to an axle/hub mechanism 872 in such a manner as to allow for free rotation of the wheel about the axis of the axle/hub 872. In other embodiments, where for example loading may be of a magnitude to require it, front wheeled support 834 may include two, side by side, caster wheels. Leg member 873 may be generally rectangular in cross section and tubular and may be connected at a top end portion to a cylindrical rotatable support post 873. Post 873 may be receivable for axial movement relative to a supporting hollow cylindrical tubular support 877. Post 873 may also be rotatable about a longitudinal axis of tubular support 877. Tubular support 877 may be mounted to a forward end portion of a mount 878.

Figure 12F:
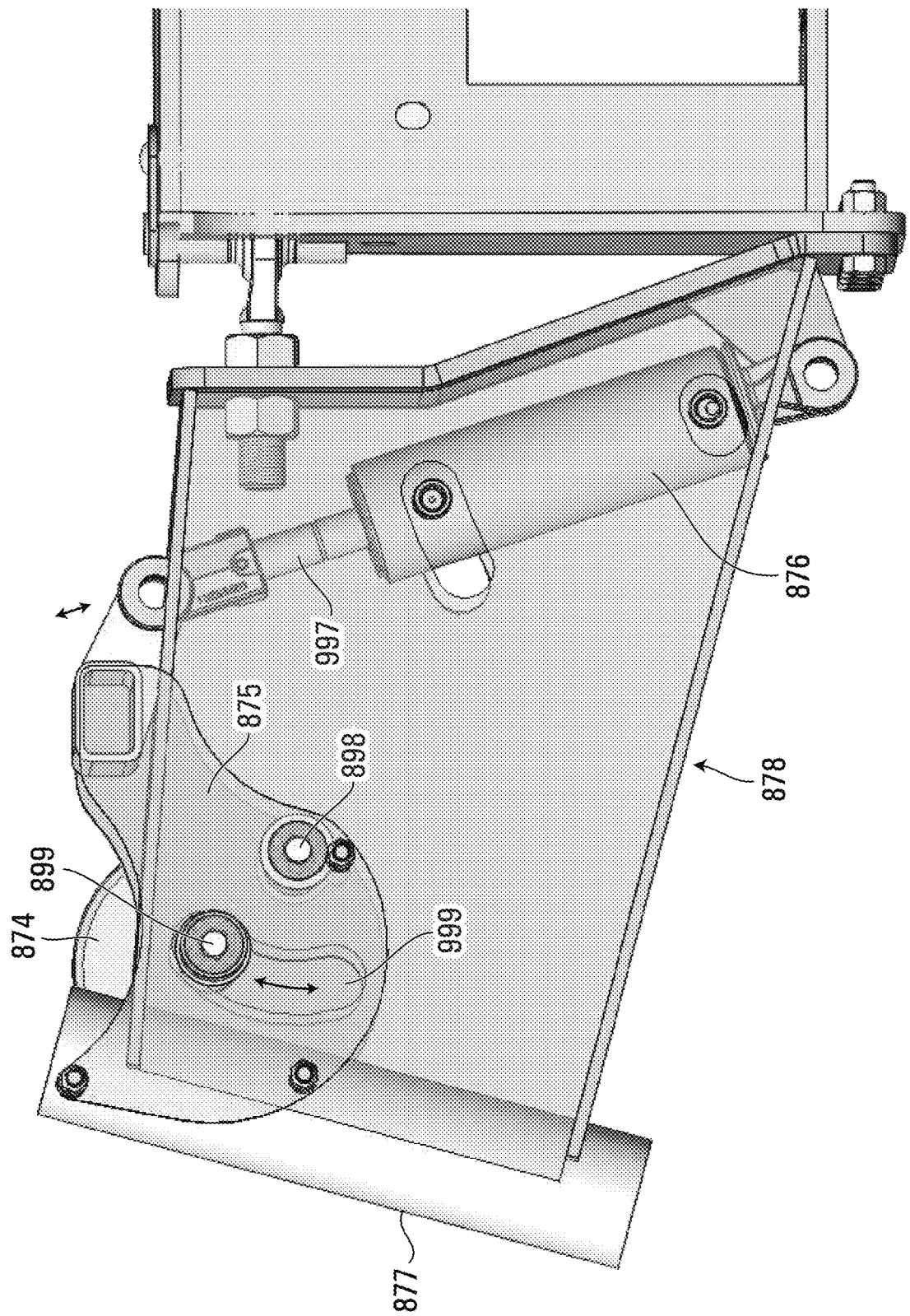
FIG. 12F is an enlarged side view of a part of the portion shown in FIG. 12 of the apparatus of FIG. 1.
Figure 12G:
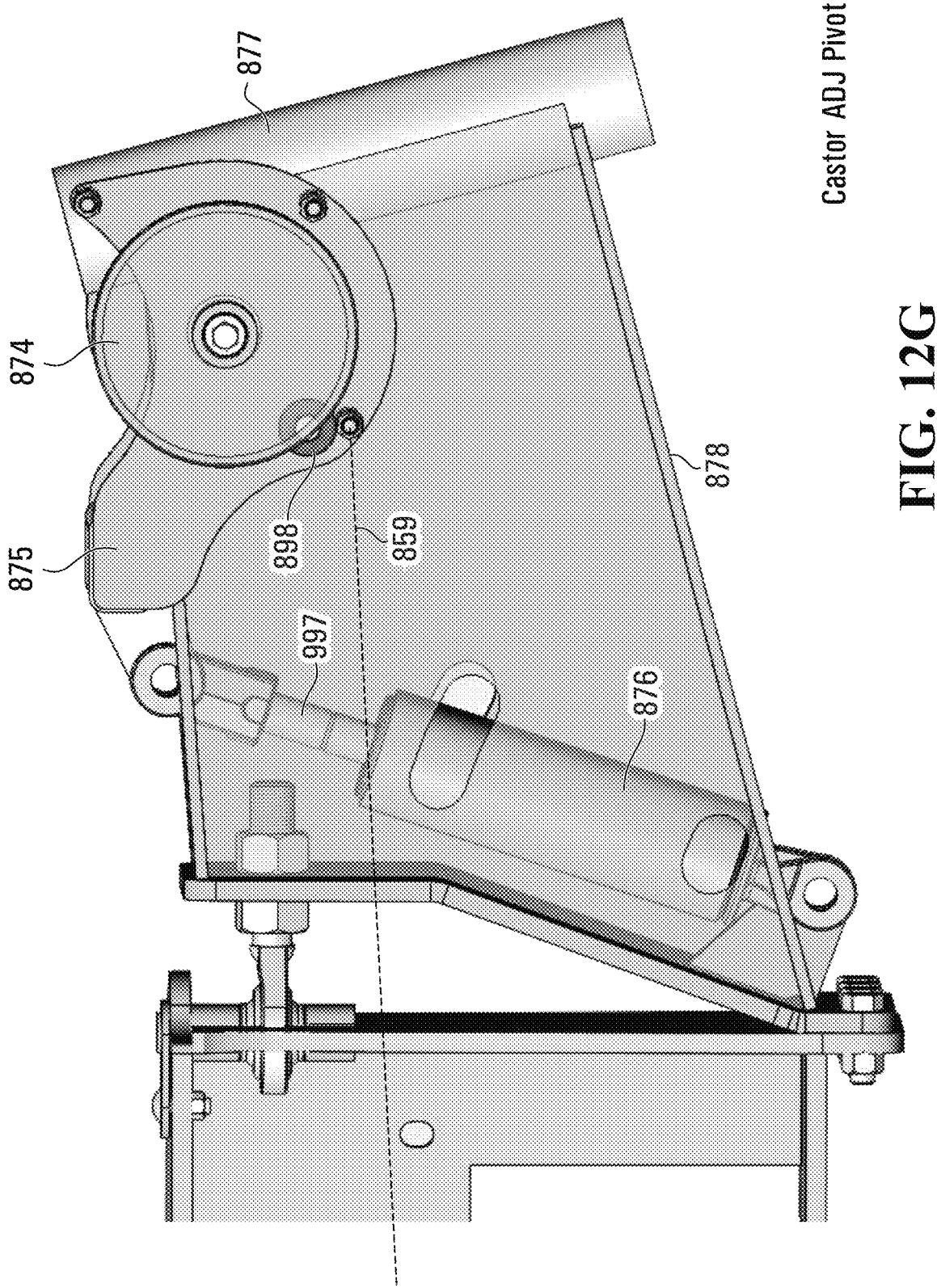
FIG. 12G is an enlarged side view of a part of the portion shown in FIG. 12 of the apparatus of FIG. 1.

Pulley devices 874 have a common transverse axle for rotation and may be mounted on a common shaft 899 (FIG. 12F). Shaft 899 may be mounted to a lever arm device 875. Lever arm device 875 maybe mounted to mounting block 878 for pivoting movement about a pivot location 898. An end arm portion of lever arm device 875 may be pivotally connected to an end of a piston rod of a two way acting hydraulic cylinder 876 that is also mounted to mounting block 878. Hydraulic cylinder 876 may have an extendible piston rod 997. The operation of hydraulic cylinder 876 may be controlled by an actuator and/or controller which may control valves in a hydraulic fluid circuit to control the flow of pressurized hydraulic fluid to and from hydraulic cylinder 876. By extending or retracting piston rod 997 of hydraulic cylinder 876, lever arm 875 may be pivoted about pivot location 898. The shaft 899 connecting pulley device 874 may move within a slot 999 in mounting block 878. By this movement, the position of pulley devices 874 can be altered. By moving the position of pulley devices 874, the path distance for cable 859 between the pulley devices 874 and trunnion device 879 can be increased or decreased. An increase in this distance will cause the front wheel 197b to be moved closer to frame 18—thus lowering the frame and causing the front row of ground engagers 140 to penetrate into the ground more. A decrease in this distance between the pulley devices 874 and trunnion device 879 will cause the front wheel 197b to be moved further away from frame 18—thus raising the frame 18 relative to the wheel and the ground surface 16 and causing the front row of ground engagers 140 to penetrate into the ground to a lesser extent.

The result is that each of the front castor wheels 197a of front wheel assemblies 828, 830, 832 and 834 can be independently adjusted independently of the main frame height setting that is controlled by operation of each of the main hydraulic cylinders 855 (FIG. 12).

As noted above, continuous cable 859 may extend from axle/hub 857 upwards to pulley devices 858 and then follow a curved path around pulley devices 858 and extend to forward pulley devices 874. The opposite sides of cable 859 may follow a path upwards and are affixed to cable trunnion 879 located at the upper end of post 873. Opposed sides of cable 859 pass over and meet at the cable trunnion 879. Thus the continuous path of cable 859 is completed.

Figure 12H:
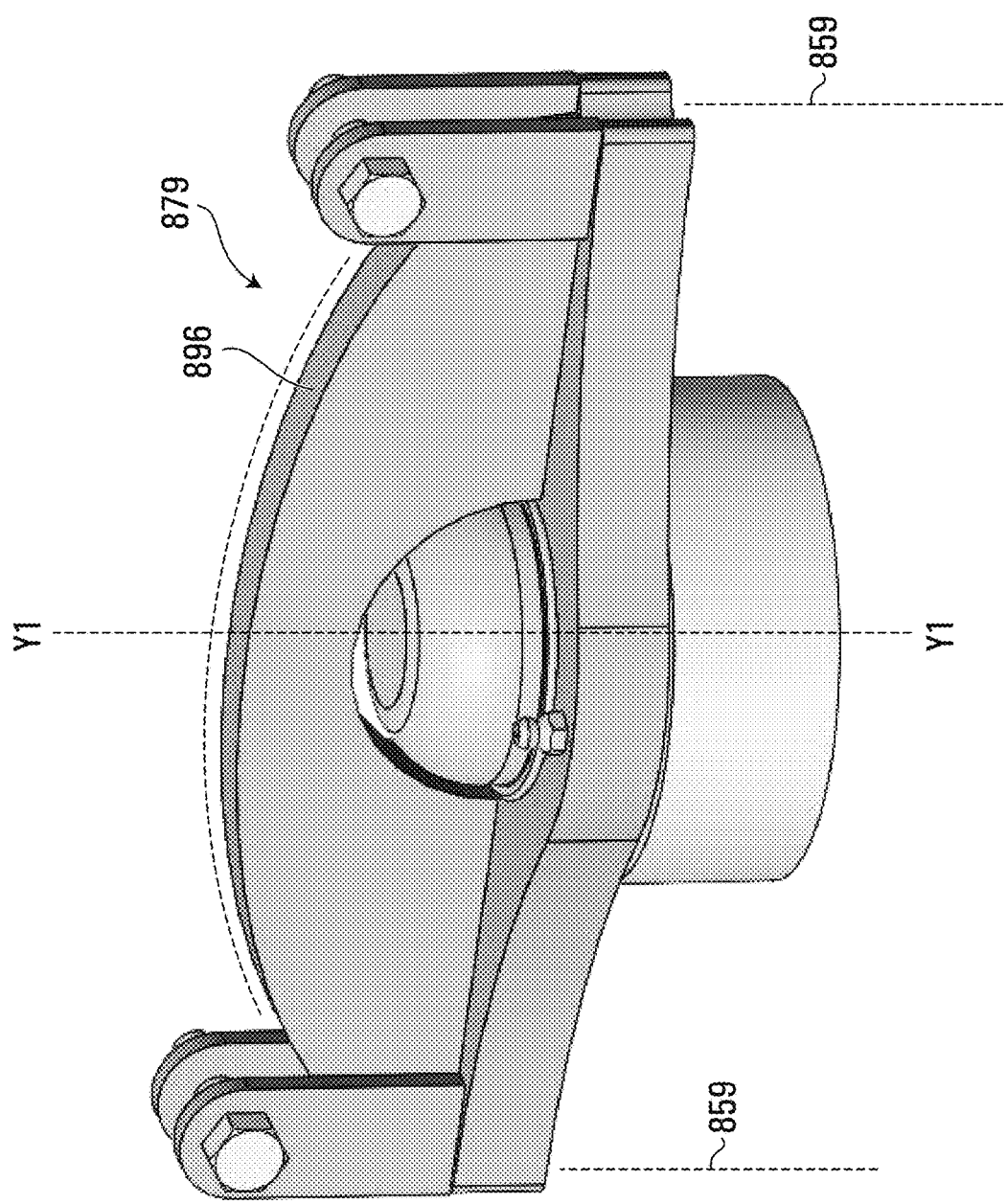
FIG. 12H is an enlarged perspective view of a part of the portion shown in FIG. 12 of the apparatus of FIG. 1.
Figure 12I:
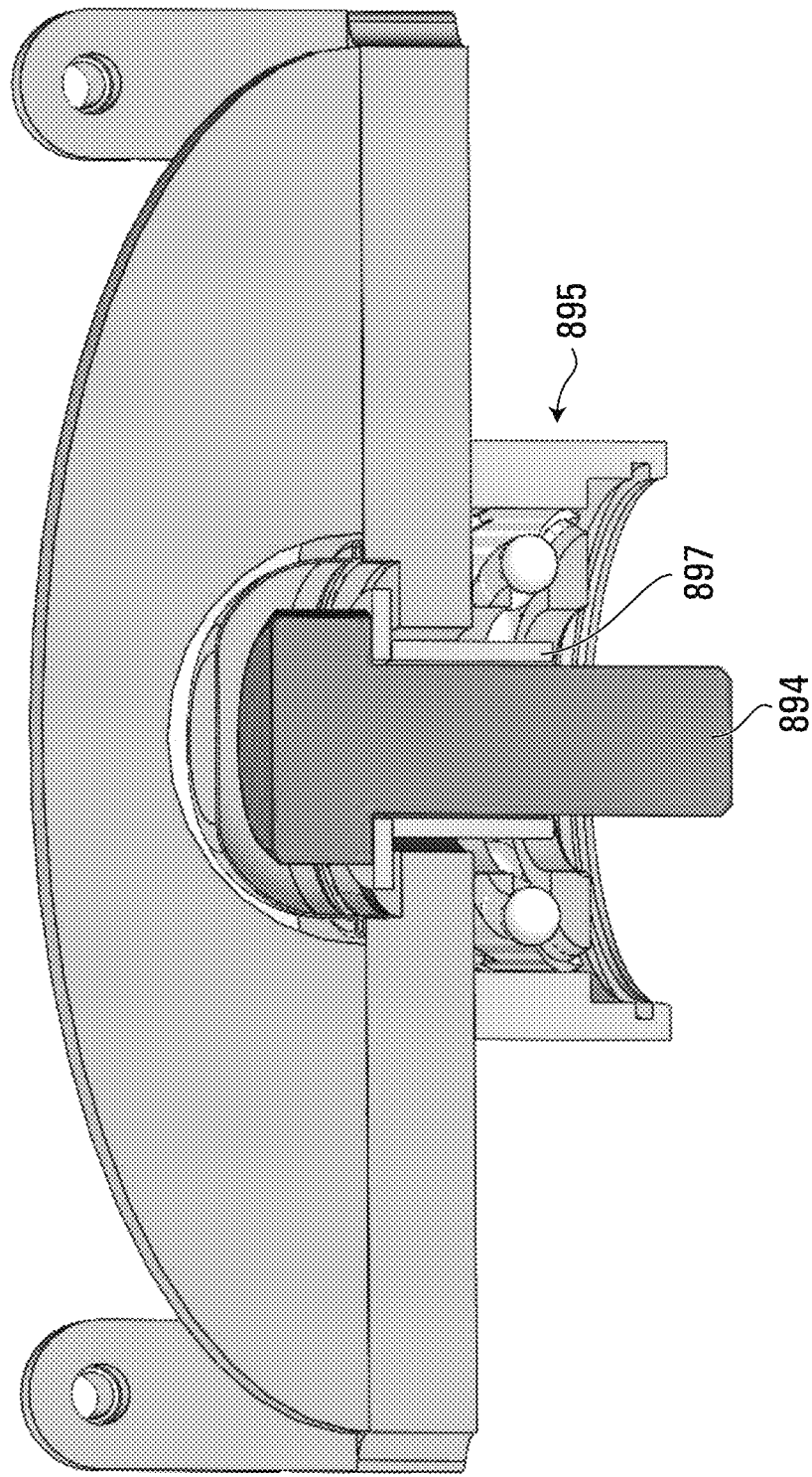
FIG. 12I is an enlarged side sectional view of the part of FIG. 12H.

Isolated views of cable trunnion 879 are shown in FIGS. 12H and 12I. Cable trunnion 879 includes an upper arcuate guide member 896 which will be held at a fixed angle (ie. top down rotational angle) by the tension in cable 859 that passes over arcuate guide member 896 has runs vertically down each side thereof. This arrangement will keep cable trunnion 879 from rotating angular about a vertical axis Y1 (FIG. 12H). Trunnion 879 will be mounted on a thrust bearing device 895 (FIG. 12I) the inner race 897 of which is attached to a bolt 894. Bolt 894 is fixedly attached to the top of rotatable wheel post 873. Bolt 894 will thus be capable of rotating with post 873 about a generally vertical/upwardly directed axis within thrust bearing 895. This allows post 873, leg member 871 and castor wheel 197*b* to rotate about a generally vertical axis, without interfering with the positioning of cable 859.

By extending piston rod 876 of hydraulic cylinder 876, the distance between pulley devices 874 and cap device 879 can be altered. Post 873 may be rotatable relative to end cap device 859 such that post 873 rotates about a longitudinal axis. But when post 873 rotates, the cables 879 attached to end cap device 879 are not rotated.

It should be noted that for sensing the castor angle, a sensor may be attached to arcuate cable guide 896 so that the sensors rotational centerline will be in line with the rotational centerline of bolt 894. A rotating part of the sensor (eg. sensor arm) may be keyed/attached to the centerline of bolt 894 for rotation with bolt 894, wheel post 873 and front castor wheel 197*b*.

Mounting block 878 may have a rear portion connected to an end of open member 816 at a three point connection, with a pair of transversely spaced lower connection locations 892 and s single upper connection location 891. This three point connection assists in ensuring that the castor wheels 197*b* remain substantially vertical even when main frame 18 and its members such as open members like member 816 are twisting during operation.

In operation of tillage device 10, for example when tillage device is about to commence tilling of the ground material beneath ground surface 16, it may be desirable to lower frame 18 and including the front row of open members 20 and rear row of open members 22 an equal amount relative to the ground surface 16. This may cause front row 120 and rear row 122 of discs 122 to penetrate into the ground material beneath surface 16 an equal distance. It may be appreciated that in many typical operating environments, the overall weight of the frame 18, mounts 142 and discs 144 will be considerable and will typically cause the discs 144 to penetrate into the ground to a desired depth if the frame 18 is lowered relative to wheel supports 820 to 834. In other words, within typically operating depths, the contact surface areas of the discs 144 with the ground material beneath surface 16 will not provide sufficient upward forces to alone counteract the force of gravity acting on frame 18, mounts 142 and discs 144. The front wheel supports 828, 830, 832 and 834, and rear wheeled supports 820, 822, 824 and 826, are required to support the weight of these components above surface 16.

Assuming the frame 18 starts from a generally horizontally level manner, both longitudinally and transversely to lower the frame 18 and the mounts 142 and discs 144 attached thereto, in a level manner, piston rod 856 of hydraulic cylinder 855 of each of rear wheel supports 820, 822, 824 and 826 may be retracted. This will cause corresponding pairs of wheels 197*a* to move up relative to the frame 18 including respective open members 816, 810, 806 and 800. This movement will cause in respect of each rear wheel supports 820, 822, 824 and 826, the distance of the respective cables 859 between their respective axles/hubs 857 to shorten, with the result is that the distance between pulleys 874 on mounts 878 and trunnions 879 for each of front wheel supports 828, 830, 832 and 834 will extend. This will create a corresponding shortening of the distance between caster wheels 197*b* and mounting blocks 878 for each front wheel support 828, 830, 832 and 834 and respective open members such as open member 816, 810, 806 and 800. The result is that the open members 816, 810, 806 and 800 will move towards their respective front wheels 197*a* and rear wheels 197*b* a substantially equal amount resulting in a level movement downwards and an equal movement of front row 120 of ground engagers and rear row 122 of ground engagers (eg. discs 144) across the entirety of frame 18.

To raise frame 18 and discs 144 attached thereto in a level manner, piston rod 856 of hydraulic cylinder 855 of each of rear wheel supports 820, 822, 824 and 826, may be extended. This will cause corresponding rear pair of wheels 197*a* to move down relative to frame 18 including open members 816, 810, 806 and 800. This movement will cause the distance of cables 859 between respective axles/hubs 857 of each rear wheel supports 820, 822, 824 and 826 to lengthen, with the result is that the distance between pulleys 874 on mounting blocks 878 and trunnions 879 of each front wheel supports 828, 830, 832 and 834 will be reduced. This will create a corresponding lengthening of the distance between wheel 197*b* and mount 878 for each front wheel supports 828, 830, 832 and 834 and respective open members 816, 810, 806 and 800. The result is that such as open members 816, 810, 806 and 800 will move towards respective rear wheels 197*a* and front caster wheels 197*b* a substantially equal amount resulting in a level movement upwards and an equal movement of front row 120 of ground engagers and rear row 122 of ground engagers (eg. discs 144).

Referring to FIGS. 1, 1A and 6, the forward row of ground engagers 140 may be disposed at an angle such that when the first row of ground engagers 140 engage with the ground material beneath surface 16, a force acting in a direction transversely (direction Z) right to the direction of travel 14 of tillage apparatus 10 is exerted on the ground engagers which is transmitted to frame 18. Conversely, the rear row of ground engagers 140 may be disposed at an angle such that when the ground engagers engage the ground material beneath surface 16, a force acting in a direction transversely (direction Z) left to the direction of travel 14 of tillage apparatus 10 is exerted on the ground engagers which is transmitted to frame 18.

In some situations, when the forward and rearward set of ground engagers 140 and 122 engage with the surface 16 at generally the same depth, transverse forces exerted by the surface 16 on the forward and rear sets of ground engagers 140 and 122 may offset each other, and the transverse forces may in some circumstances be substantially the same magnitude and opposite in direction, such that the tillage apparatus 10 keeps the generally square orientation relative to the propulsion unit 12 shown in FIG. 1 and travels substantially in the direction 14 with propulsion unit 12 across the surface 16.

However, there may be situations where the ground engagers 140 penetrating the ground material may not provide transverse forces that are equal in the opposite transverse directions, which may rotate tillage apparatus 10 into a skewed or skidding orientation, relative to the direction of travel 14 and propulsion unit 12.

For example, even if the surface 16 is substantially level, and the front row 20 of ground engagers 140 and the rear row 22 of ground engagers 140 penetrate to substantially the same depth, the front row of ground engagers 140 may have a more difficult task in breaking up the ground material as they engage the ground material before the rear row of ground engagers 140. The result may be that the front row of ground engagers 140 have a greater transverse force exerted on them in a right transverse direction, than the transverse force exerted on the rear row of ground engagers 140 exerted on them in a left transverse direction. This force imbalance may rotate tillage apparatus 10 into a skewed or skidding orientation, relative to the direction of travel 14 and propulsion unit 12.

In another type of situation, if and when some or all of ground engagers of the forward and rear set of ground engagers 140 and 122 engage with the ground material beneath surface 16 at different depths, the transverse forces acting on tillage apparatus 10 as a result of the ground engagers penetrating the ground material may not be equal in the opposite transverse directions, which may rotate tillage apparatus 10 into a skewed or skidding orientation, relative to the direction of travel 14 and propulsion unit 12.

Referring back to FIG. 1, as tillage apparatus 10 is pulled across the surface 16, the contours of the surface 16 may cause the forward set of ground engagers 140 to engage the surface 16 more deeply than the rear set of ground engagers 140, or vice versa.

With reference to FIG. 5A, a modified left frame section 18B' is shown. For simplicity, no ground engagers 140 are shown schematically in this FIG. 5A, but it should be understood that frame section 18B' would also generally have the features of frame section 18B, including rows 120, 122 of ground engagers 140 including their mounts 142, as shown in FIG. 6. A main difference between frame section 18B illustrated in for example FIG. 6, and frame section 18B' is that transverse open member 40' in frame section 18B' is extended laterally outwards beyond the furthest lateral extension of open member 30. This permits additional ground engagers 140 to be mounted in the extended region of open member 40.

Similarly with reference to FIGS. 5C and 5D, a modified right frame section 18C' is shown. For simplicity, only a few of ground engagers 140 are shown schematically in FIG. 5D, but it should be understood that frame section 18C' would also generally have the same features of frame section 18C, including 120, 122 rows of ground engagers 140 and their mounts 142, as shown in FIG. 6. A main difference between frame section 18C illustrated in for example FIG. 6, and frame section 18C' is that transverse open member 32' in frame section 18C' has been extended laterally outwards beyond the furthest lateral extension of open member 42. This permits additional ground engagers 140 to be mounted in the extended region of open member 32'.

With reference to FIG. 5G, the additional ground engagers 144 on the extensions of frame sections 18B' and 18C' will assist in maintaining the surface 16 over which tillage apparatus 10 passes to remain relatively flat and reduce the likelihood or amount of any berm of ground material forming at the intersection of passes in opposite longitudinal directions of tillage apparatus 10.

Figure 18:
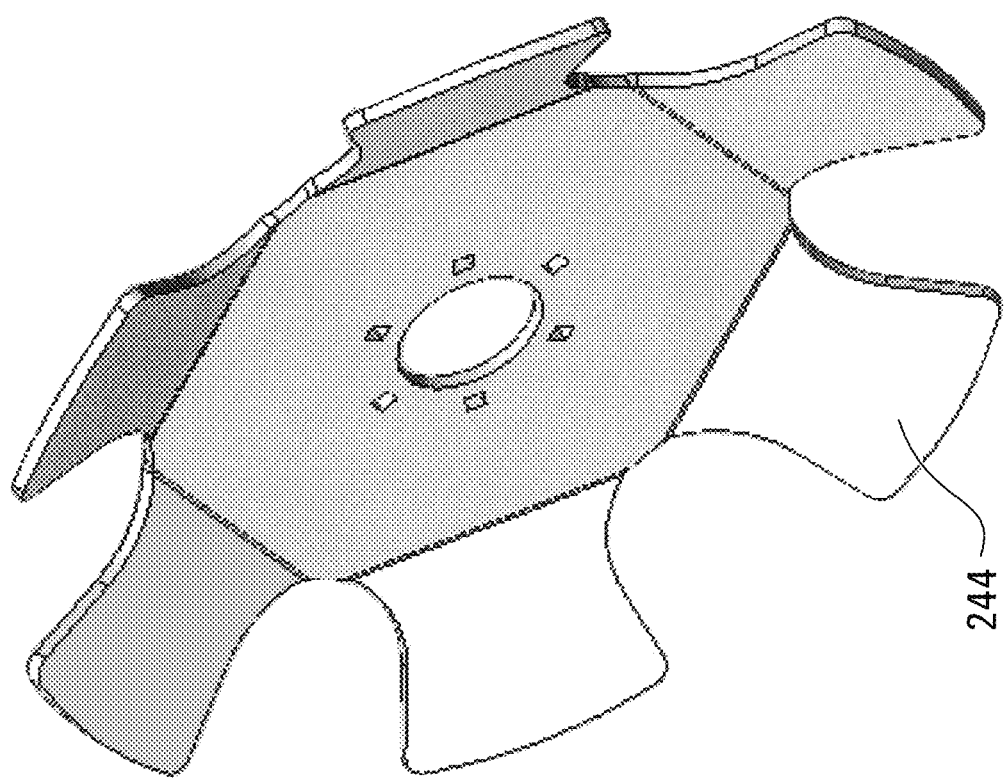
FIG. 18 is a perspective view of an alternate engaging tool.

With reference to FIGS. 1, 15B and 18, it an alternate form of disc 244 (which may be referred to as a "flower" disc due to its resemblance to a flower shape). Disc 244, while having the same diameter as discs 144, 144A, may have a gaps or spaces in its radial body that may result in a reduction of in the range of about 40 to 60% of the body (eg. about 50% reduction). The result is that this disc will only "throw"/move about half as much dirt to the side and thus will be less prone to forming berms of tilled material after tillage apparatus makes a pass over surface area. A disc 244 may be provided at the very end of the rear row of 122 of ground engagers 140.

Tillage apparatus 10 may be adapted as partly described further below, to adjust the relative heights of the front row of ground engagers 140 relative to the rear row of ground engagers 140 and thereby modify the relative transverse forces that are acting upon the frame in opposite directions. The apparatus that facilitates this adjustment will now be described.

With reference again to FIGS. 12, 12A and 12B, as noted above, pulley devices 874 may be mounted to mounting blocks 878 and may be connected to a lever device 875. The operation of hydraulic cylinder 876 may be controlled by an actuator and/or controller which may control valves in a hydraulic fluid circuit to control the flow of pressurized hydraulic fluid to and from hydraulic cylinder 876. By extending or retracting piston rod of hydraulic cylinder 876, the position of pulley devices 874 on each mounting block of each front wheel assembly 820, 822, 824 and 826 can be altered. By altering the position of pulley device 874, the path length of each respective cable 859 between pulley device 874 and trunnion 879 may be lengthened or shortened independently of the main height control of the frame provided by operation of hydraulic cylinders 855. By lengthening the path length between pulley devices 874 and trunnions 879, resultant axial movement of post 873 will cause the distance between caster wheels 197b and the respective open members such as open member 816, will be shortened, thus lowering the open members and the front side of frame 18, relative to the surface 16. This will cause front row of ground engagers 140 to penetrate the ground material to a greater depth, thus increasing the transverse force in a right transverse direction.

Similarly, by shortening the path length between pulley devices 874 and trunnion 879, axial movement of post 873 will cause the distance between caster wheels 197b and the respective open members such as open member 816, will be lengthened, thus raising the open members and the front side of frame 18, relative to the surface 16. This will cause front row of ground engagers 140 to penetrate the ground material to a lesser depth, thus decreasing the transverse force in a right transverse direction.

The upward and downward movement of the front of the frame 18 relative to the rear of the frame 18, may be controlled by actuation of hydraulic cylinders 876. This may be controlled manually by an operator or by a control system with a suitable sensing system that interfaces with a system controller.

Figure 13:
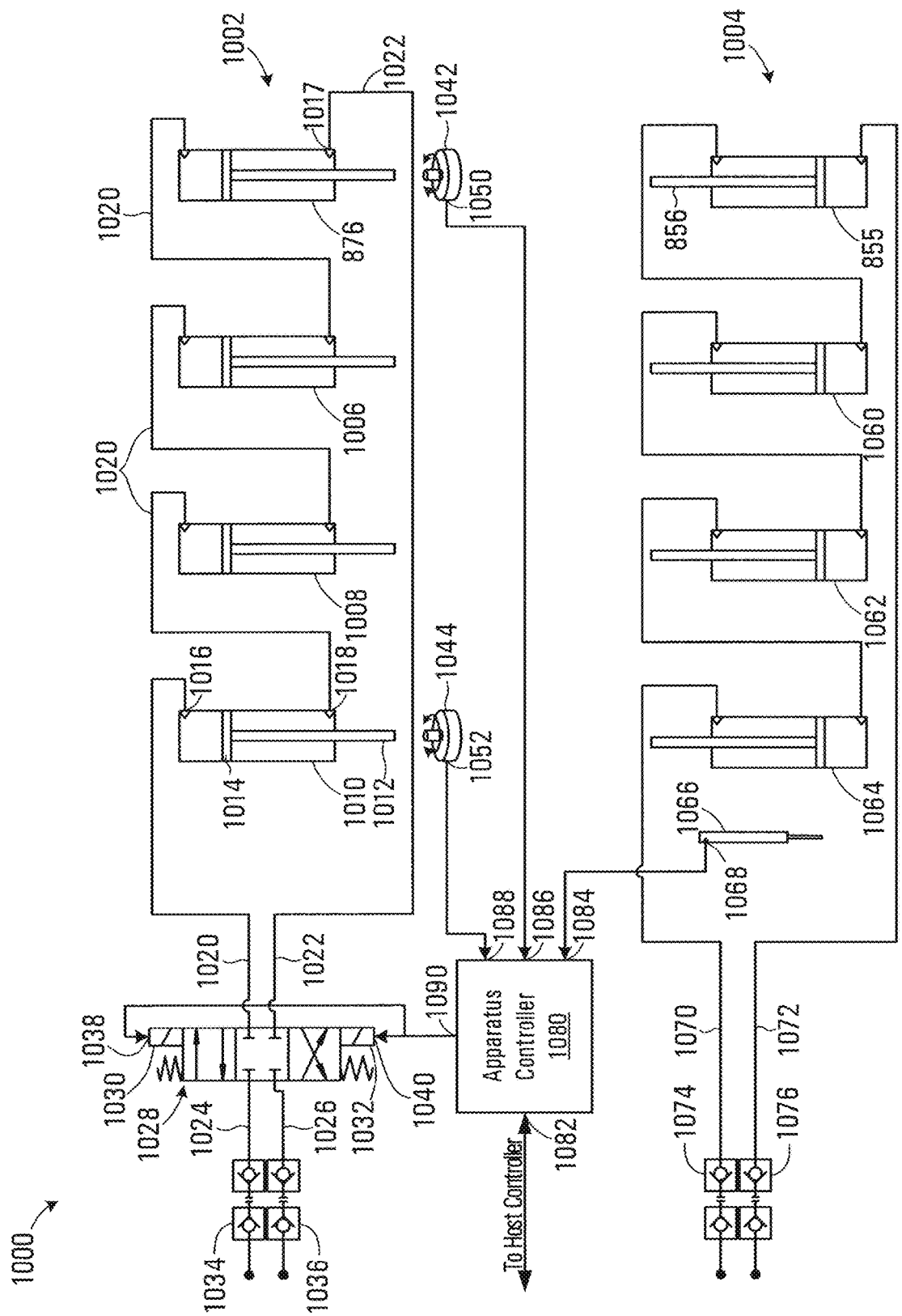
FIG. 13 is a schematic view of a control system for the tillage apparatuses.

With reference now to FIG. 13, an embodiment of a control system for tillage apparatus 10 is shown generally at 1000. The control system 1000 includes a front row control system 1002 for controlling a height of the front row of longitudinally axially aligned open members 20. The control system 1000 also includes a frame height control system 1004 for controlling an overall height of the frame 18. The front row control system 1002 includes the hydraulic cylinder 876 of the front wheeled support unit 834 (shown in FIG. 12). The front row control system 1002 also includes respective hydraulic cylinders 1006, 1008, and 1010 associated with each of the front wheeled support units 828, 830, and 832. The hydraulic cylinders 876, 1006, 1008, and 1010 are disposed on respective mounts (such as the mount 878 shown in FIG. 12) for raising or lowering the respective wheeled support units 834, 832, 830, and 828 to cause the open members 816, 812, 806, and 800 of the frame 18 to be raised or lowered to counteract skidding of the tillage apparatus 10 as described above. Each cylinder has an actuator rod connected to a moveable piston (for the hydraulic cylinder 1010, the rod is shown at 1012 and the piston at 1014). The moveable piston 1014 divides the cylinder 1010 into a cap end chamber having a cap end hydraulic fluid port 1016 and rod end chamber having a rod end hydraulic fluid port 1018. The hydraulic cylinders 876, 1006, 1008 are similarly configured in the embodiment shown and are hydraulically connected in series via a hydraulic fluid line 1020, which is in fluid communication with the cap end port 1016. The line 1020 also couples between the rod end port 1018 and a cap end port of the cylinder 1008 and between respective rod end and cap end ports of the successive downstream cylinders 1006 and 876. A rod end port 1017 of the cylinder 876 is coupled to a hydraulic fluid line 1022.

The hydraulic fluid lines 1020 and 1022 are selectively connected to a pressurized hydraulic fluid supply line 1024 and a return line 1026 through a proportionally controlled directional valve 1028 (shown schematically in FIG. 13). The lines 1024 and 1026 may be coupled via respective quick connect fittings 1034 and 1036 to a pressurized hydraulic fluid supply (not shown) on the host propulsion unit 12. The directional valve 1028 includes an internal control spool that may be actuated for straight-through flow via solenoids 1030 and 1032 to selectively permit fluid flow from the supply line 1024 and through the line 1020 to the cap end port 1016 of the cylinder 1010 and to permit fluid to flow back from the rod end port of the cylinder 876 via the line 1020 to the return line 1026. Alternatively, the directional control valve 1028 may be actuated for cross-flow to selectively permit fluid flow from the supply line 1024 and through the line 1022 to the rod end hydraulic fluid port 1017 of the cylinder 876 and to permit fluid to flow back from the cap end port 1016 of the cylinder 1010 and via the line 1020 to the fluid return line 1026. The solenoids 1028 and 1030 are responsive to electrical control signals provided at inputs 1038 and 1040 to cause the internal control spool to move between the straight-through flow and cross-flow configurations. For example, the control signal may be a DC current that varies over a range between amperages of $-I_0$, 0, and $+I_0$, where the positive $I_0$ current causes the valve 1028 to be completely open in the straight-through flow configuration and a negative $I_0$ current causes the valve 1028 to be completely open in the cross-flow configuration. A current of 0 A causes the valve to be substantially closed. A DC current of less than positive or negative $I_0$ supplied to the solenoids causes the valve to be proportionally opened for flow in the respective directions.

The front row control system 1002 also includes a rotation sensor 1042 associated with the front wheeled support unit 834 and a rotation sensor 1044 associated with the front wheeled support unit 828. The rotation sensor 1042 and rotation sensor 1044 have respective outputs 1050 and 1052 for generating rotation signals representing the rotation of the respective front wheeled support units 834 and 828. Referring back to FIG. 12B, in one embodiment the rotational sensor 1042 may be disposed within the end cap device 879 and configured to generate rotation signals at the output 1050 representing an angle of rotation of the leg member 873 with respect to the end cap. As described above, in operation, engagement of the end cap device 879 by the cable 859 effectively prevents rotation of the end cap when the leg member 873 rotates within the cylindrical tubular support 877. The rotation sensors 1042 and 1044 each produce rotation signals representing the respective rotation of the front wheeled support units 834 and 828. In one embodiment the rotation sensors 1042 and 1044 may be configured to each produce rotation signals representing a zero angular rotation when the respective front wheeled support units 834 and 828 are oriented straight ahead in the direction of travel as shown in FIG. 6. An angular deviation of the wheeled support unit 834 to one side would result in a positive angle signal and an angular deviation to the other side would result in a negative angular signal. Rotation sensors may include an element (such as a magnet in the case of a Hall effect sensor) that moves relative to a base of the sensor and generates a rotational displacement signal and this element may be mounted on or coupled to the leg member 873. Various other rotation sensors may be used such as inductive sensors, resistive sensors, or optical rotary encoders.

The frame height control system 1004 includes the hydraulic cylinder 855 associated with the rear wheeled support 826, which includes the extendible piston rod 856. The frame height control system 1004 also includes respective hydraulic cylinders 1060, 1062, and 1064 associated with each of the rear wheeled support units 824, 822, and 820. The cylinders 855, 1060, 1062, and 1064 are connected in series via hydraulic fluid lines 1070 and 1072. As described above, by extending or retracting the piston rods of the cylinders 855, 1060, 1062, and 1064, the front row 120 of ground engagers and rear row 122 of ground engagers across the entirety of frame 18 are both raised or lowered by substantially equal amounts resulting in a level movement. In the embodiment shown in FIG. 13, the frame height control system 1004 also includes a linear sensor 1066 having an output 1068 for producing a frame height signal representative of a height of the frame 18.

In this embodiment, the frame height control system 1004 is hydraulically actuated by hydraulic fluid pressure provided via hydraulic the fluid lines 1070 and 1072, which is generated and controlled at the host propulsion unit 12. The lines 1070 and 1072 may be coupled via respective quick connect fittings 1074 and 1076 to a pressurized hydraulic fluid supply on the host propulsion unit 12. In other embodiments, a directional control valve similar to the proportionally controlled directional valve 1028 of the front row control system 1002 may be provided on the tillage apparatus 10 for controlling frame height.

The hydraulic cylinders 876, 1006, 1008, and 1010 of the front row control system 1002 and the hydraulic cylinders 855, 1060, 1062, and 1064 of the frame height control system 1004 are thus driven in unison by fluid pressure received via the respective lines 1020, 1022, 1070 and 1072. In operation, leakage around the pistons of the cylinders may cause a phasing difference between motion of the respective piston rods over time. In one embodiment the cylinders 876, 1006, 1008, 1010, 855, 1060, 1062, and 1064 may be implemented using phased cylinders. Phased cylinders are configured to permit hydraulic fluid to bypass the piston and flow through the cylinder when the piston is in a re-phasing position. Re-phasing may be required from time to time to prevent one of the cylinders in series (typically the downstream cylinder) from reaching a fully extended or fully retracted position before the upstream cylinders and thus blocking further extension or retraction of these upstream cylinders.

The control system 1000 also includes a tillage apparatus controller 1080, which in the embodiment shown receives sensor signals and produces control signals for controlling the front row control system 1002 to counteract skidding and thus correct a direction of travel of a tillage apparatus moving across a ground surface with respect to a desired direction of travel (the desired direction of travel would generally be a straight-ahead condition). In this embodiment, the controller 1080 has an input 1084 for receiving the frame height signal from the output 1068 of the frame height linear sensor 1066. The controller 1080 may process the signal and transmit data at the communications port 1082 to the host propulsion unit controller to facilitate display of frame height information to an operator of the host. In embodiments where the frame height signal at the output 1068 is an analog signal, the controller 1080 may include analog to digital converters for converting the signal into a digital representation for transmission to the host controller on the CAN bus.

The controller 1080 also includes inputs 1086 and 1088 for receiving the rotation signals from the respective outputs 1050 and 1052 of the rotation sensors 1042 and 1044. The controller 1080 further includes an output 1090 for producing a valve control signal for driving the solenoids 1030 and 1032 to control the directional valve 1028.

The controller may be implemented using a low-cost microprocessor based controller such as the Eaton HFX Family of programmable controllers (available from Eaton Corporation plc, Dublin, Ireland) or the JCA electronics Oriole controller (available from JCA Electronics Manitoba, Canada). These controllers implement a Controller Area Network bus (CAN bus) that may act as a communications port 1082 for receiving commands from a host controller and also provide inputs and outputs that may be configured to act as the output 1090 and inputs 1084, 1086 and 1088.

In this embodiment the communications port 1082 of the controller 1080 facilitates connection to a control bus of the host propulsion unit 12 for receiving and sending control signals between the host and the tillage apparatus. The host propulsion unit 12 will generally include a host controller (not shown) that operates via a data bus (such as a CAN bus) for controlling the propulsion unit and connected farm implements such as the tillage apparatus 10. Command signals may be received from the host controller at the communications port 1082 for controlling operations of the front row control system 1002 and frame height control system 1004.

Figure 14:
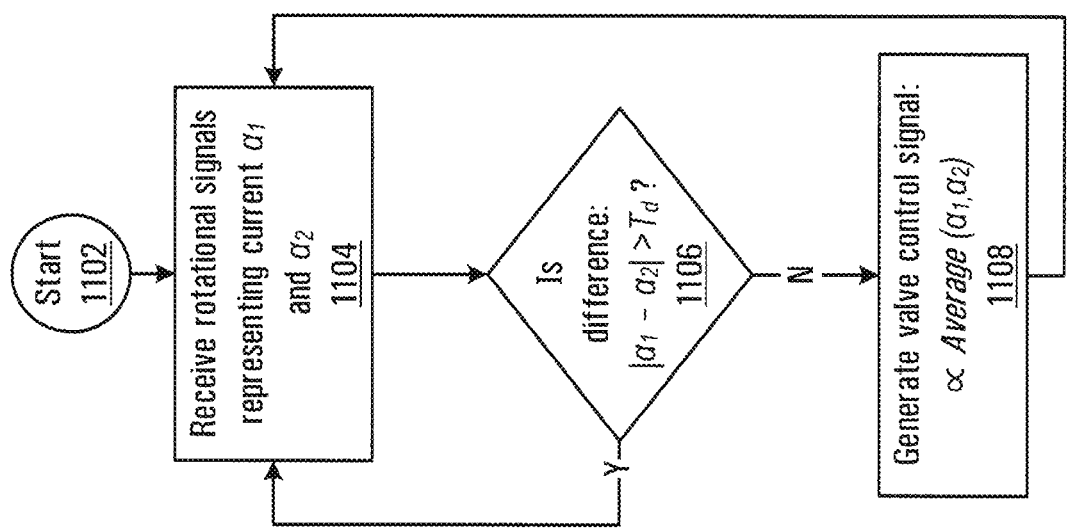
FIG. 14 is a flowchart of a process for detecting and controlling skidding of the tillage apparatus during tilling operations.
Figure 14A:
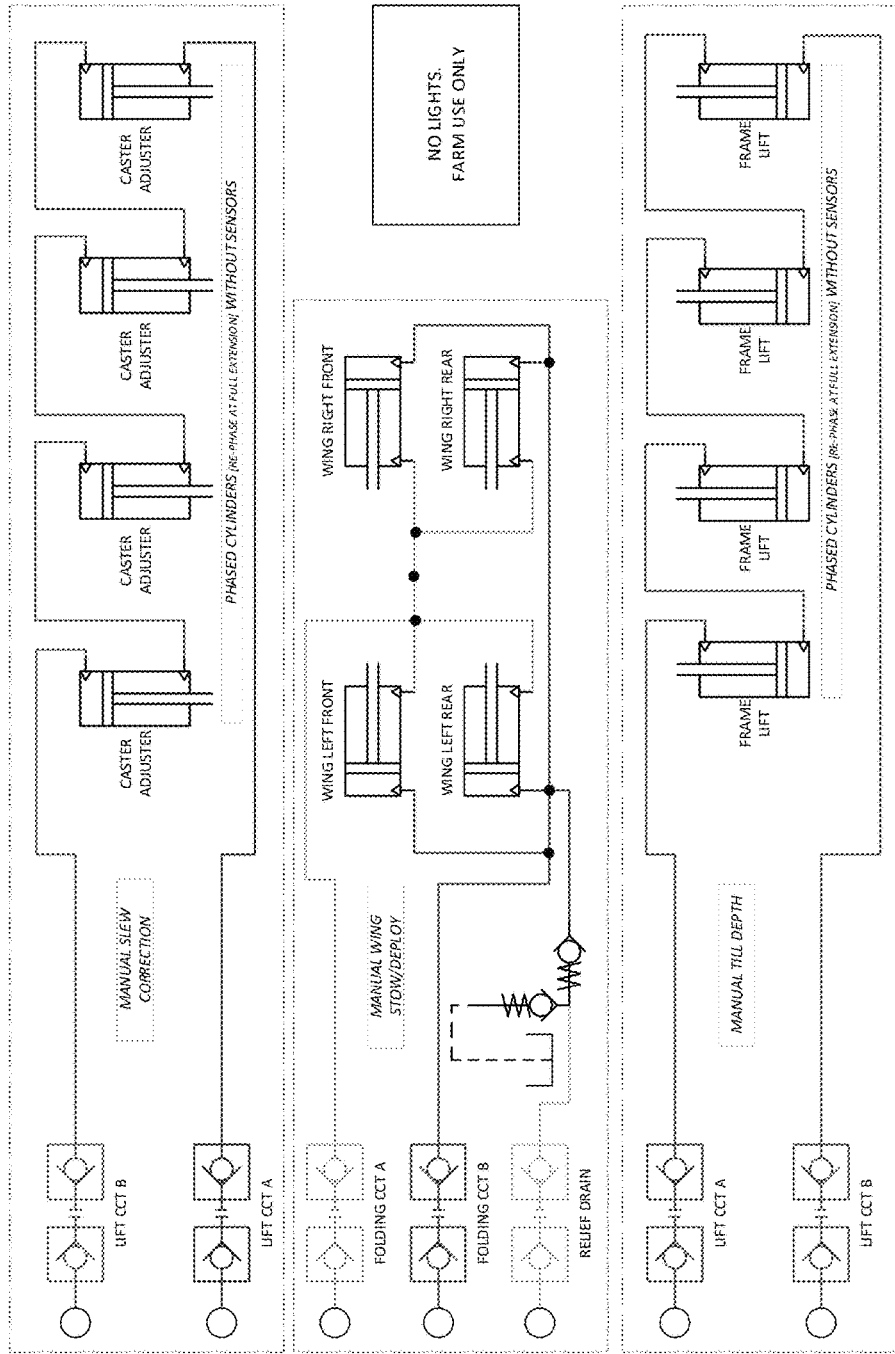
FIGS. 14A, 14B, 14C, and 14D are schematic views of alternate control system for the tillage apparatuses.
Figure 14B:
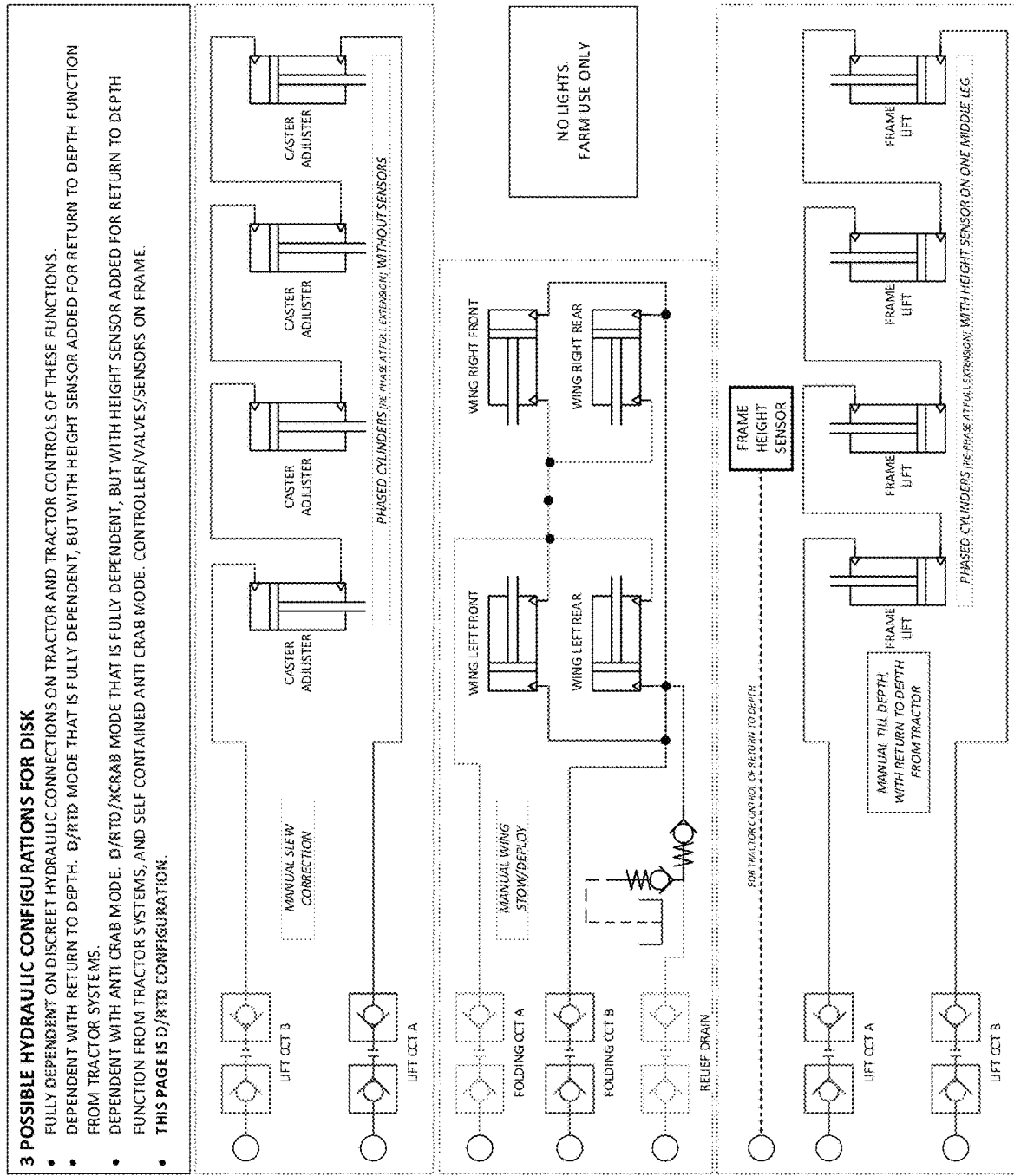
Figure 14C:
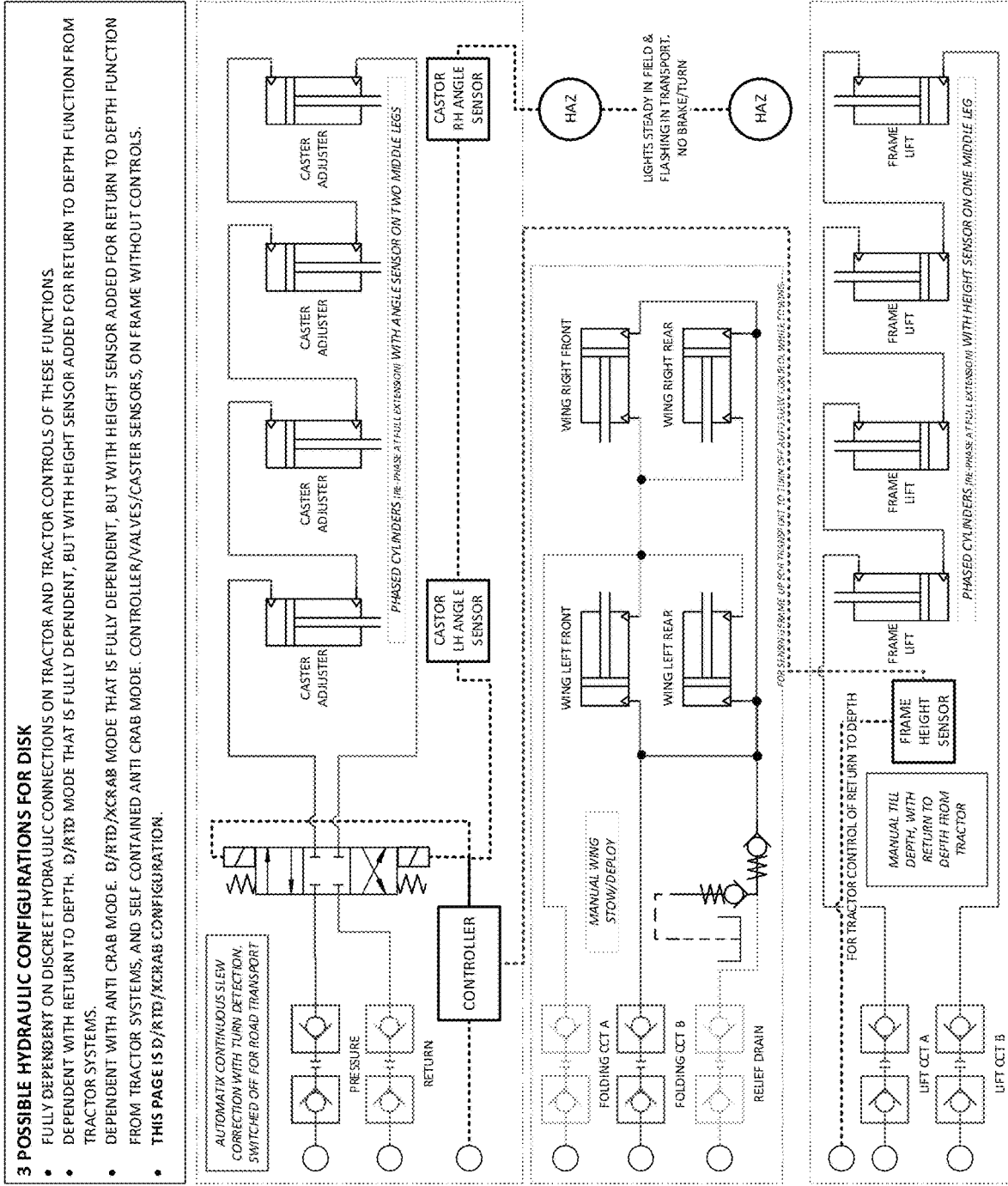
Figure 14D:
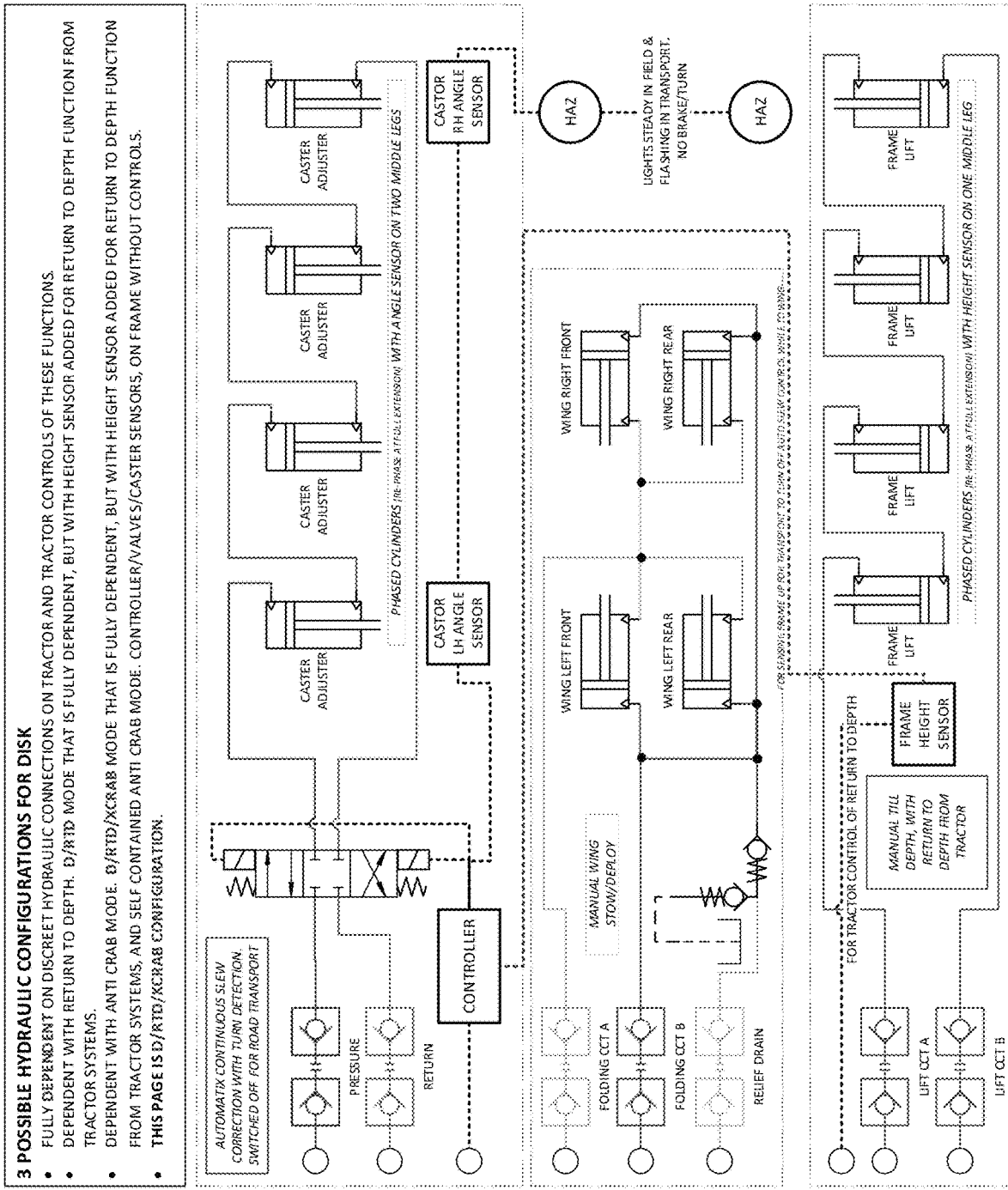

Referring to FIG. 14, a process for detecting skidding of the tillage apparatus 10 during tilling operations and correcting a direction of travel is shown as a process flowchart at 1100. The process starts at block 1102, when the controller 1080 receives a command via the communications port 1082 to commence controlling skidding of the tillage apparatus 10. At block 1104, a rotational signal is received at the controller 1080 from the output 1050 of the rotation sensor 1042 representing the current angle of rotation $\alpha_1$ of the leg member 873 with respect to the end cap. A rotational signal is also received at the controller 1080 from the output 1052 of the rotation sensor 1044 representing the current angle of rotation $\alpha_2$ of a leg member of the front wheeled support unit 828 with respect to its end cap. In one embodiment the signals representing angles $\alpha_1$ and $\alpha_2$ are received as analog signals at the inputs 1086 and 1088 and converted into digital signals using analog-digital converter circuitry in the controller 1080. In other embodiments the signals representing angles $\alpha_1$ and $\alpha_2$ may already be in digital format as provided by the rotation sensors 1042 and 1044. When the wheeled support units 828 and 834 are aligned in a straight ahead condition (i.e. at an angle of 0° as shown in FIG. 6) the sensors 1042 and 1044 may be configured to each produce angles $\alpha_1$ and $\alpha_2$ having a zero value. Alternatively, the controller 1080 may be configured to offset the received angle signals to produce zero values for processing at block 1106.

At block 1106, the controller determines the difference between the angles and determines whether an absolute value of the difference is greater than a threshold $T_d$. If the condition in block 1106 is met, then the front wheeled support units 834 and 828 are determined to be at different angles, which is indicative of the propulsion unit 12 towing the tillage apparatus 10 through a turn to the left or right. Since the front wheeled support units 834 and 828 are spaced apart by a relatively large distance, when turning the inner wheeled support unit will oriented at a greater angular deviation from the straight ahead condition than the outer wheeled support unit. The threshold $T_d$ may be set to a small angular difference value that prevents the front row control system 1002 from reacting to very small disturbances due to normal angular movements by the wheeled support units when the frame 18 is moving straight ahead over the ground surface 16. If the condition in block 1106 is met, then the tillage apparatus controller 1080 determines that the propulsion unit 12 is executing a turn and the blocks 1102-1106 are simply repeated. Accordingly, when the controller 1080 determines that the angles $\alpha_1$ and $\alpha_2$ are indicative of the tillage apparatus going through a turn the controller inhibits generation of the control signals at the output 1090 and no corrections to the direction of travel are made during the turn.

Figure 11:
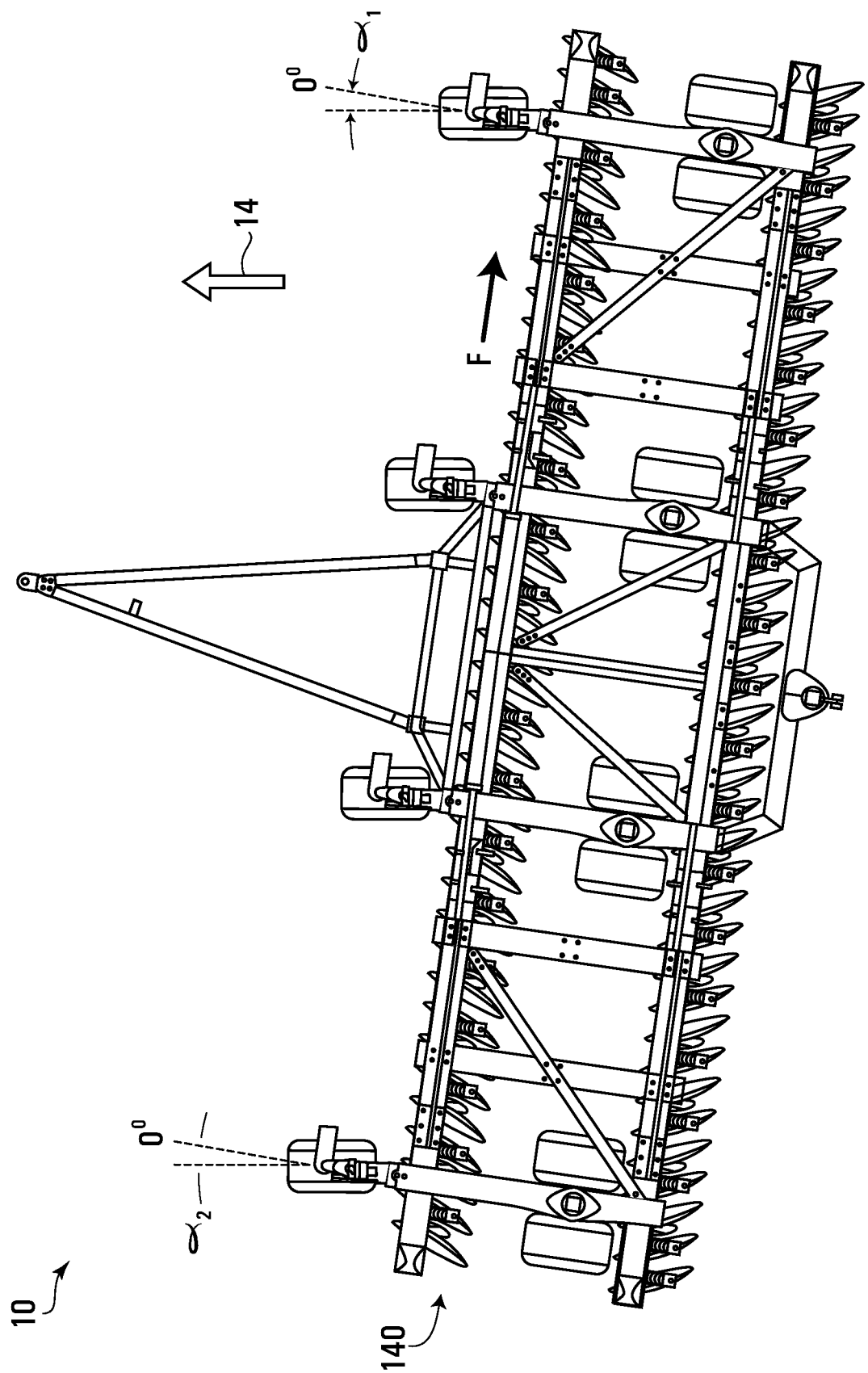
FIG. 11 is a top plan view of the tillage apparatus of FIG. 1.

If the condition in block 1106 is not met then the wheeled support units 834 and 828 are at generally similar angular deviations from the straight ahead condition, as shown in FIG. 11. In FIG. 11, the wheeled support units 834 and 828 are at approximately equal small negative angles $\alpha_1$ and $\alpha_2$ with respect to the straight ahead 0° reference lines. Under these conditions the tillage apparatus 10 is determined to be skidding with respect to the direction of travel denoted by arrow 14. The skidding may be caused by several factors including a side force F generated by the plurality of ground engagers 140 of the front row 20.

At block 1108 the controller 1080 generates a valve control signal at the output 1090 to activate the front row control system 1002. The valve control signal is generated in proportion to the deviation of the wheeled support units 834 and 828 from the straight ahead condition. In the embodiment shown the valve control signal is generated based on an average of the signals representing the respective $\alpha_1$ and $\alpha_2$ deviations of the wheeled support units 834 and 828 and includes an amplification factor K that may be selected to provide an appropriate response for counteracting skidding of the frame 18.

Referring back to FIG. 6, when the tillage apparatus 10 is moving in the direction of travel denoted by arrow 14, the $\alpha_1$ and $\alpha_2$ angles will be near zero or very small. The front row control system 1002 will be activated since the threshold Td should be greater than the small angles $\alpha_1$ and $\alpha_2$. The valve control signal generated by the controller 1080 and received from the at the valve inputs 1038 and 1040 will cause the valve 1028 to remain substantially closed thus maintaining the front row height and the degree of engagement of the plurality of surface engagement devices 120 with the ground surface 16.

Referring now to FIG. 11, when the $\alpha_1$ and $\alpha_2$ angles have non-zero negative values as shown, the valve control signal generated at the output 1090 by the 1080 will have a negative value proportional to the angular deviation of the wheeled support units 834 and 828. The negative valve control signal will thus cause the valve 1028 to be configured for cross-flow and increased hydraulic fluid pressure will be supplied to the rod end port 1017 of the cylinder 876 via the hydraulic fluid line 1022 causing the rod of the cylinder to retract. This causes a shortening of the cable 859 and results in the front of the frame 18 being raised. Each of the hydraulic cylinders 1006, 1008, and 1010 are similarly actuated to raise the respective frame portions thus raising the front row of open members 20 and the plurality of ground engagers 140. Reduced engagement of the plurality of ground engagers 140 with the ground causes the side force F to be reduced thus reducing the skidding force toward the right in FIG. 11.

The process 1108 then returns to block 1104 and the $\alpha_1$ and $\alpha_2$ angles are again evaluated to determine whether the propulsion unit 12 is going through a turn. If the frame 18 is still skidding, at block 1108 the controller continues the attempt to correct by further raising the front row of open members 20 and the plurality of ground engagers 140.

Should the side or transverse force F be in a direction opposite to that shown in FIG. 11, the skidding will be to the left and the $\alpha_1$ and $\alpha_2$ angles will have positive values. A positive valve control signal will be generated and will cause the valve 1028 to be configured for straight-through flow and increased hydraulic fluid pressure will be supplied to the port 1016 of the cylinder 1010 via the hydraulic fluid line 1020 causing the rod 1012 of the cylinder to extend. This causes a lengthening of the cable 859 and results in the front of the frame 18 being lowered. Each of the hydraulic cylinders 1006, 1008, and 1010 are similarly actuated to lower the respective frame portions thus lowering the front row of open members 20 and the plurality of ground engagers 140. Increased engagement of the plurality of ground engagers 140 with the ground causes the side force F to be increased thus reducing the skidding force toward the left.

Blocks 1104-1108 effectively implement a closed loop feedback control system that will react to any deviation of the wheeled support units 834 and 828 that produce $\alpha_1$ and $\alpha_2$ angles of similar non-zero magnitude. The magnitude of the amplification factor K represents a loop gain that may be selected to provide a sufficiently quick response for counteracting skidding without overcorrecting. If K is too large the front row control system 1002 may cause oscillating overcorrection and unstable control of the frame height.

While the tillage apparatus controller 1080 has been described above for a digital control system, the same functions may be implemented using an analog feedback control system that receives analog signals from the rotation sensors 1042 and 1044 and uses analog amplifies to generate the valve control signal.

Referring back to FIG. 13, in one embodiment operation of the controller 1080 for controlling the valve 1028 to correct the direction of travel of the tillage apparatus 10 is inhibited when the frame 18 is lifted to cause the ground engagers to clear the ground surface for transport. In this embodiment the frame height signal produced by the frame height linear sensor 1066 may be used to detect that the frame has been fully lifted and the controller 1080 may inhibit further control of direction of travel of the tillage apparatus.

Additional details of various embodiment of the control system 1000 are shown in FIGS. 14A to 14D. In the embodiments shown in FIGS. 14A to 14D the control system further includes wing stow/deploy hydraulic cylinders for causing the left side section 18B and right side section 18C (shown in FIGS. 1A and 6) to be raised with respect to the central section 18A for transport.

Referring back to FIG. 1, the tillage device 10 further includes a rear hitch shown generally at 870. The rear hitch 870 is provided to facilitate coupling and towing additional tools or accessories (not shown) behind the tillage device 10. In some embodiments the tillage device 10 may not provide a satisfactory soil finish for some applications and the additional tool may be used in conjunction with the tillage device to further condition the soil. The rear hitch 870 is centrally located on a rear portion of the tillage device 10 and is mounted to the rear row 22. In this embodiment further open members 872 and 874 are welded to the open members 38, 40, and 42 and the rear hitch 870 is attached to a transverse open member 876 extending between the open members 872 and 874.

Referring again to FIG. 12, the rear hitch 870 of the tillage device 10 is shown in elevational view and includes a collar 878 mounted to the transverse open member 876 for slidingly receiving a jack leg 880. The jack leg 880 has a plate 882 for attaching a hitch point for coupling to the additional tool. The collar 878 has a flange 884 and the jack leg 880 has a corresponding flange 886. The rear hitch 870 also includes a cylinder 888, which is connected to the flange 884 on the collar 878 and has an extendible piston rod 890 coupled to the flange 886 on the jack leg 880.

In some embodiments the cylinder 888 is driven in tandem with the hydraulic cylinder 855 associated with the frame height control system 1004 shown in FIG. 13. As such, when the frame height 18 is raised or lowered by operating the cylinders 855, 1060, 1062, and 1064, the jack leg 880 is raised or lowered through a corresponding distance so that the plate 882 on the jack leg remains at a substantially constant height with respect to the wheels 197a and 197b of the tillage device 10. For example, if the cylinder 855 is operated to extend the piton rod 856, thus raising the height of the frame 18, the extendible piston rod 890 of the cylinder 888 is also extended to move the jack leg 880 and plate 882 downwardly by a distance corresponding to the change in frame height. Similarly, when the cylinder 855 is operated to retract the piton rod 856, thus lowering the height of the frame 18, the extendible piston rod 890 of the cylinder 888 is also retracted to move the jack leg 880 and plate 882 upwardly by a distance corresponding to the change in frame height. In one embodiment the cylinder 888 may be fed in series with the cylinders 855, 1060, 1062, and 1064 via the hydraulic fluid lines 1070 and 1072, as generally shown in FIG. 13.

With reference to FIGS. 14A to 14D various alternate hydraulic fluid circuits for providing hydraulic fluid power to components of tillage apparatus 10 are disclosed.

Figure 7:
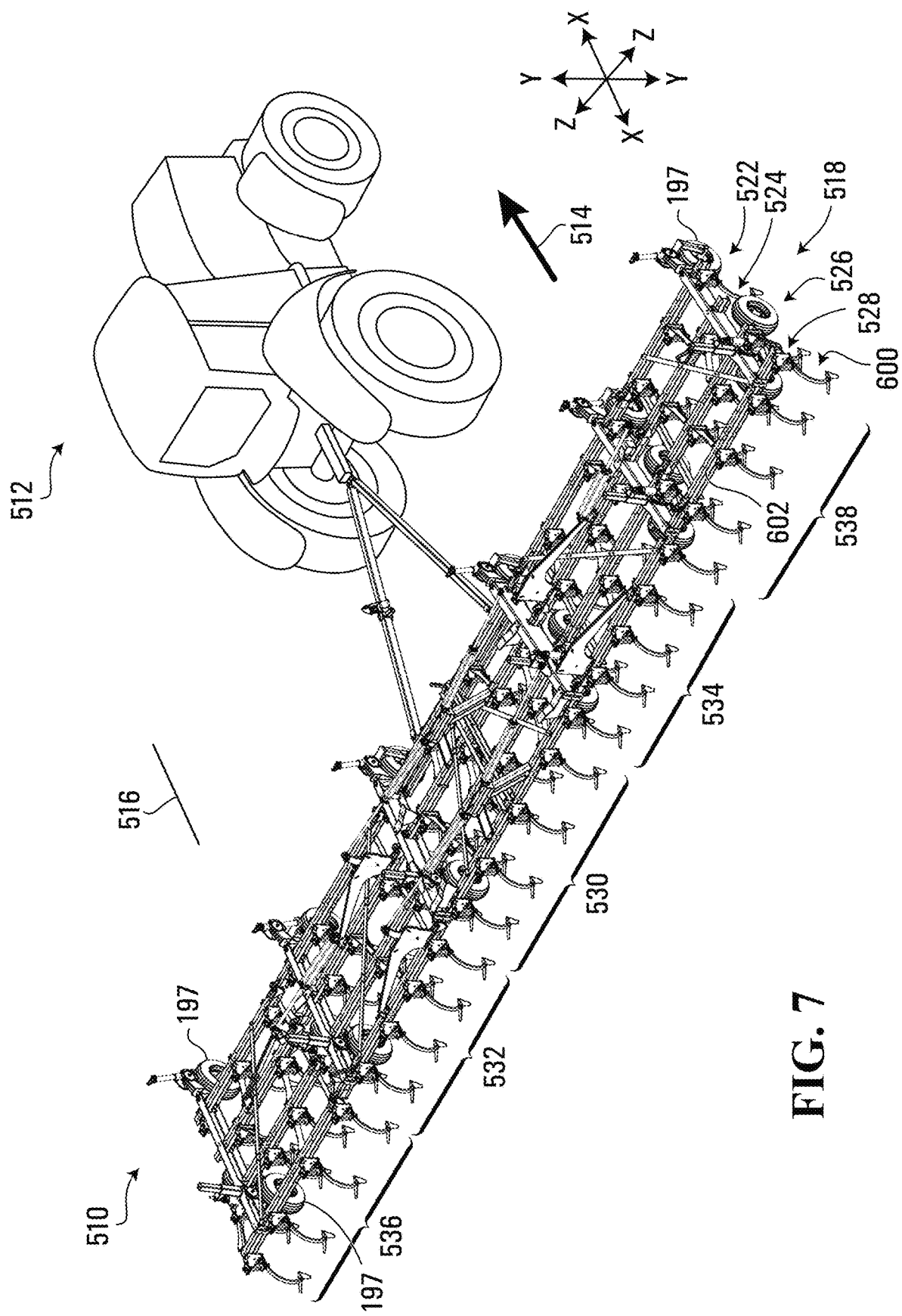
FIG. 7 is a perspective view of an alternate tillage apparatus and propulsion apparatus.

Referring now to FIG. 7, a tillage apparatus 510 is which may include generally the same features to those described above having regard to the tillage apparatus 10 shown in FIG. 1 and may be operated generally similarly to the tillage apparatus 10. The main functional difference between tillage apparatus 510 and tillage apparatus 10 is that because tillage apparatus 510 utilizes chisel plows in its ground engagers 600, there is not the same need to provide for the anti-slide and anti-skew system as described above in relation to tillage apparatus 10.

In operation, the tillage apparatus 510 is pulled behind a propulsion unit 512 in a direction of travel denoted by arrow 514 across a field surface 516 and engages with and/or conditions the surface 516 as it is moved in the direction of travel.

The tillage apparatus 510 includes a frame 518 including rows 522, 524, 526, and 528 of transversely oriented open members. The frame 518 includes a central section 530, left and right inner sections 532 and 534, and left and right outer sections 536 and 538. The open members of the frame 518 may be generally similar to the open members of the frame 18 shown in FIG. 1.

Referring to FIG. 7, the frame 518 includes pivotal connectors in each row between the central section 530 and the left and right inner sections 532 and 534, and between the left and right inner sections 532 and 534 and the left and right outer sections 536 and 538. Each of the pivotal connectors may facilitate a pivotal connection between adjacent open members such that the adjacent open members are operable to pivot to orientations generally parallel to a contour of the surface 516 when the tillage apparatus 510 is moved across the surface 516. The pivotal connections between transverse open members may be substantially the same as the pivotal connections described above.

Figure 8:
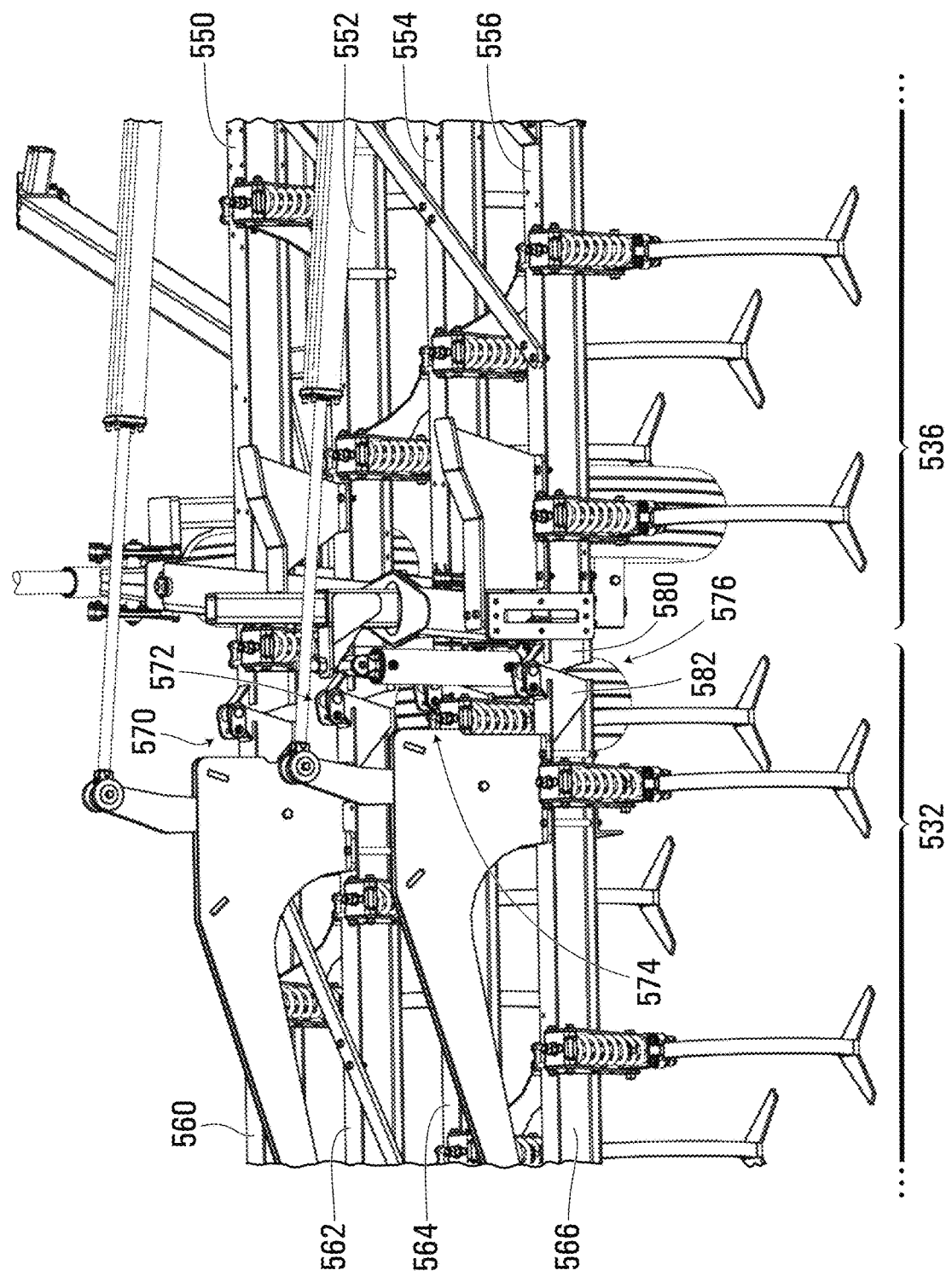
FIG. 8 is a rear perspective view of a portion of the tillage apparatus shown in FIG. 7.
Figure 8A:
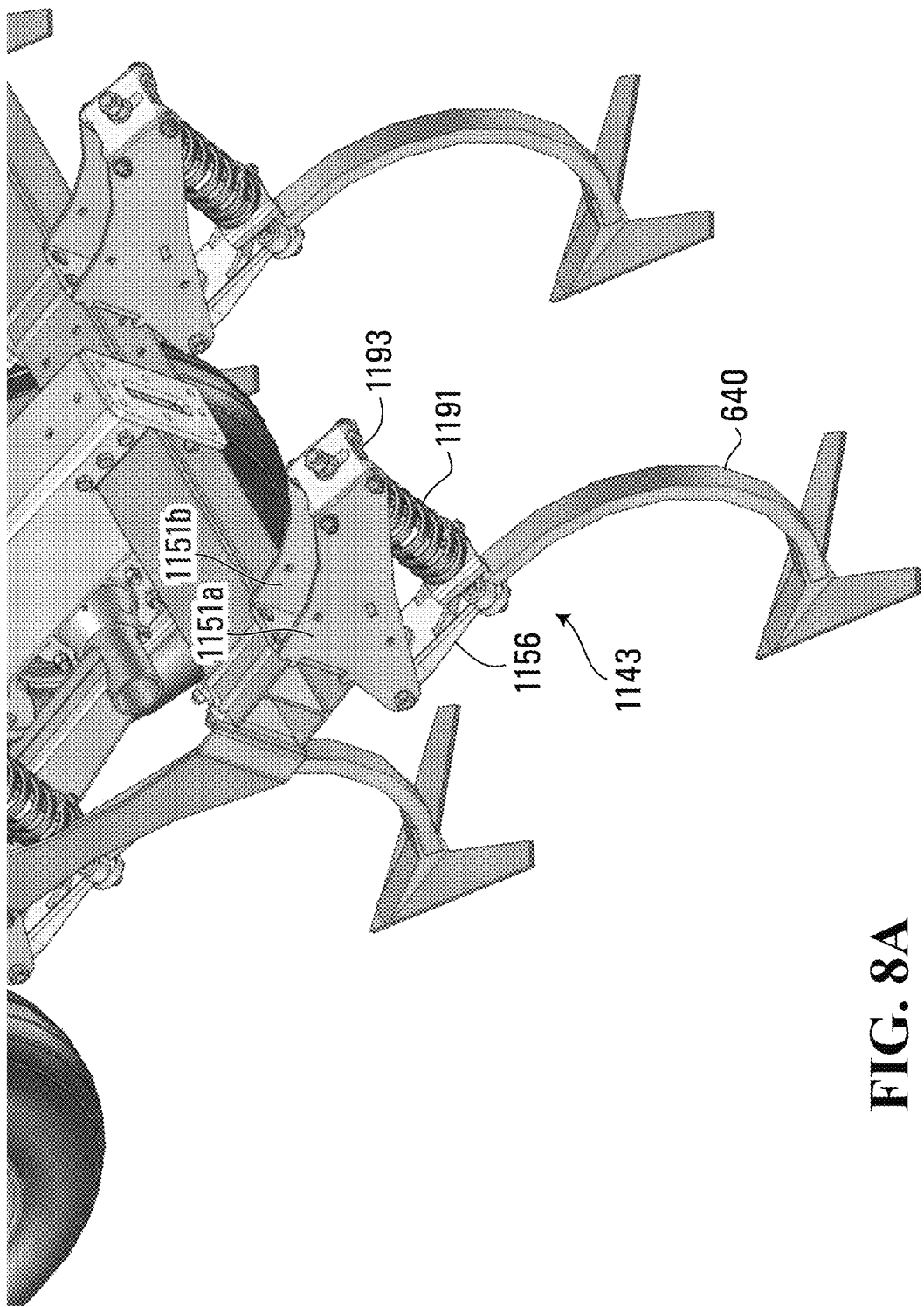
FIG. 8A is a rear perspective view of a portion of the tillage apparatus shown in FIG. 7.
Figure 8B:
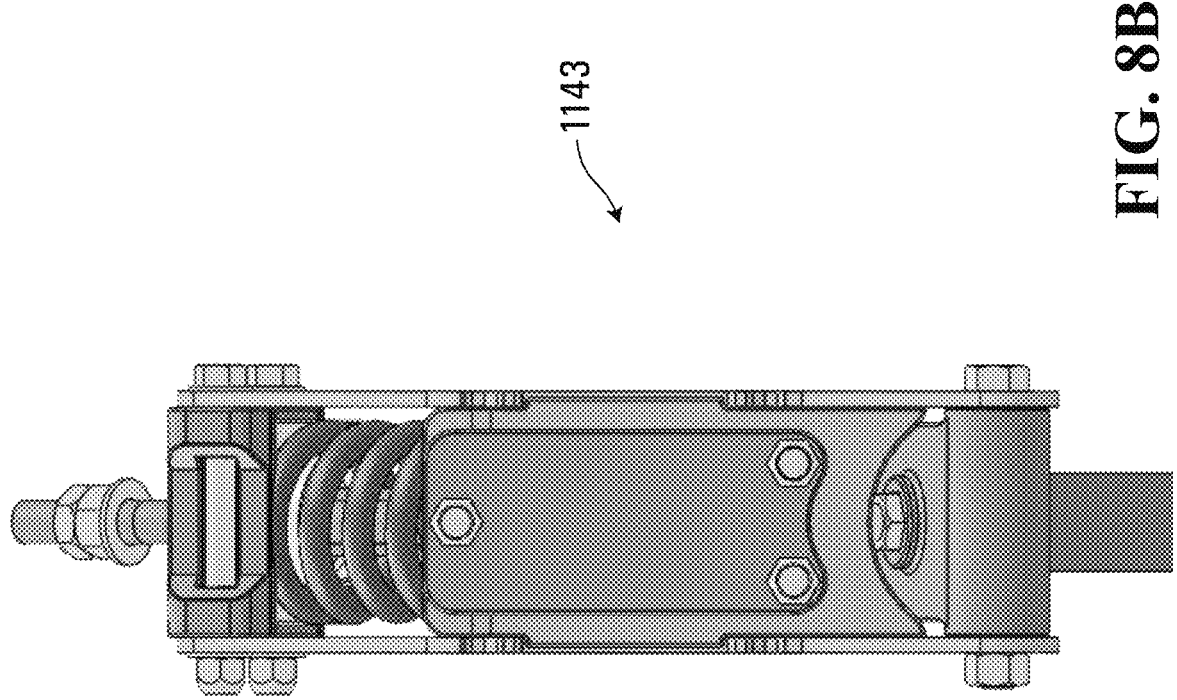
FIG. 8B is a view of a portion of part of a trip mechanism forming part of the tillage apparatus shown in FIG. 7.
Figure 8C:
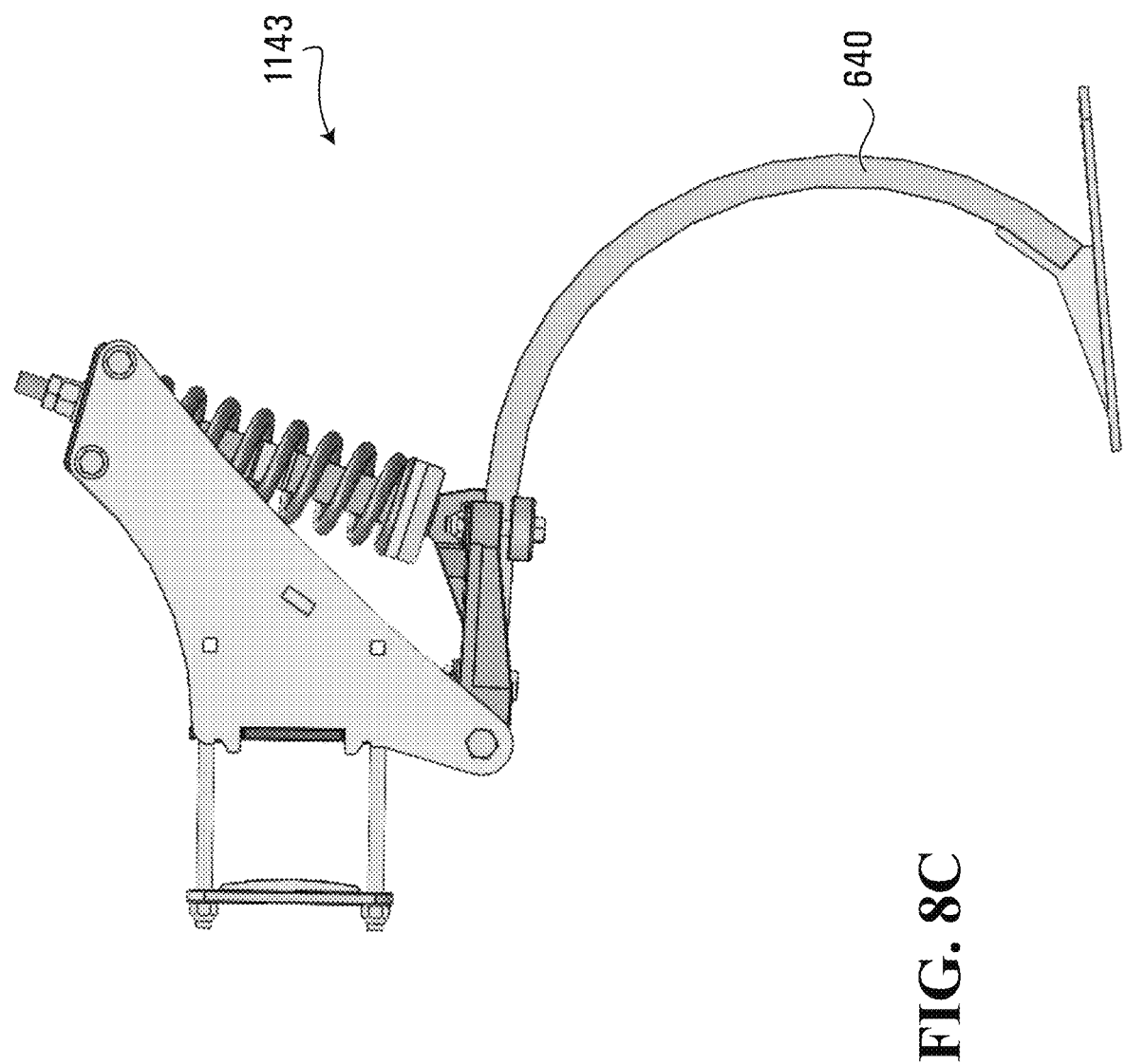
FIGS. 8C and 8D are side views of a portion of the tillage apparatus shown in FIG. 7 in un-tripped and tripped modes of operation.
Figure 8D:
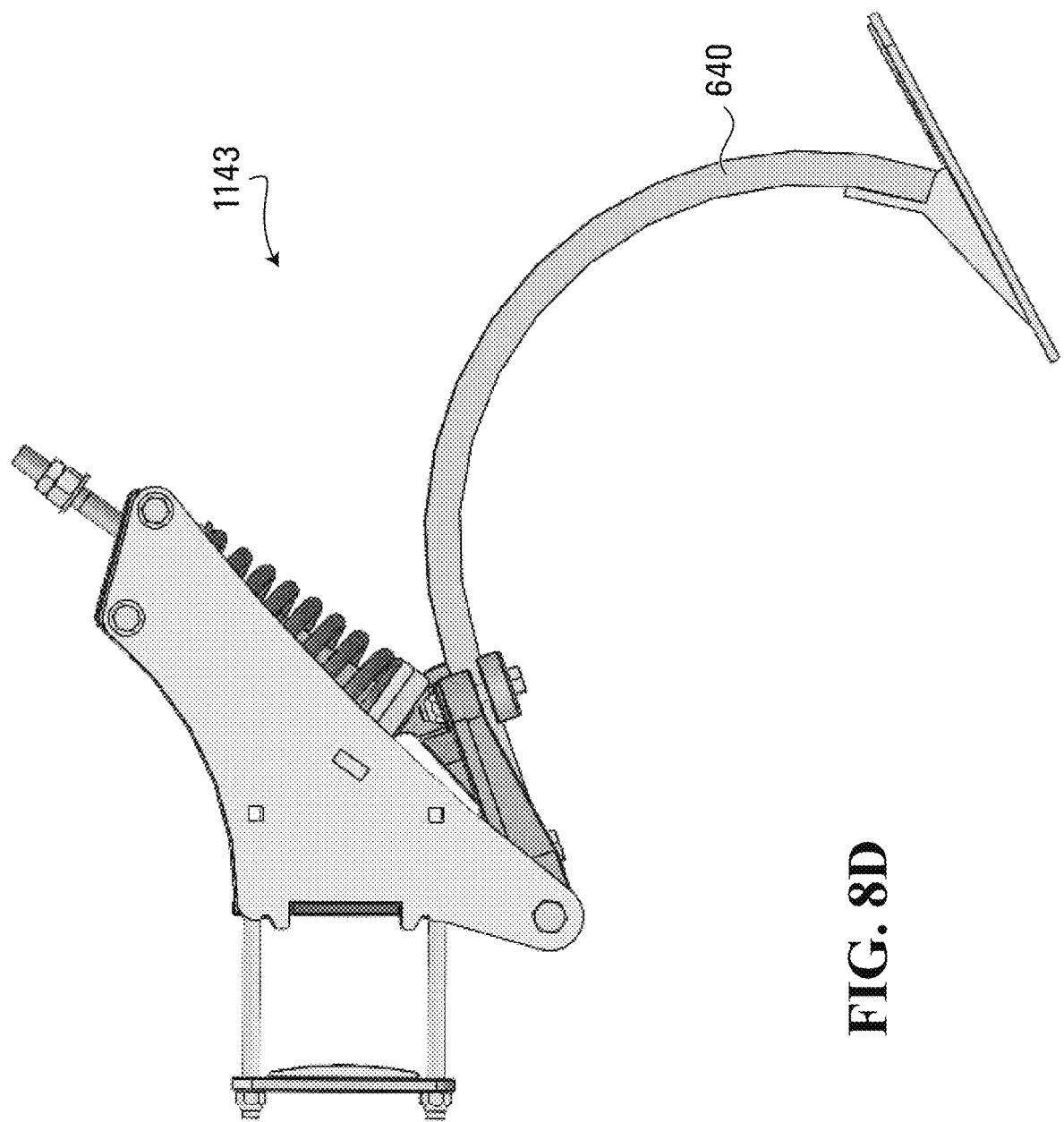

Referring now to FIG. 8, a rear perspective view of a portion of the central section 530 and a portion of the left inner section 532 of the frame 518 is shown. The central section 530 includes open members 550, 552, 554, and 556. The left inner section 532 includes open members 560, 562, 564, and 566 which are pivotally connected to the open members 550, 552, 554, and 556 via pivotal connectors 570, 572, 574, and 576. By way of example, the pivotal connector 576 includes first and second connector portions 580 and 582 which are welded to the open members 556 and 566 respectively, to facilitate a pivotal connection between the open members. Each of the pivotal connectors 570, 572, and 574 may each include generally similar features to that of the pivotal connector 576. This allows rotational torsion of the members to be transferred across the pivot connection as described above.

Referring back to FIG. 7, the tillage apparatus 510 also includes one or more ground engagers coupled to each of the open members. One of the ground engagers is denoted at 600 in FIG. 1 for exemplary purposes. In the embodiment shown, the ground engagers 600 include chisel plows. Each of the ground engagers is coupled to at least one flange of one of the open members in the rows 522, 524, 526, and 528 and configured to engage the surface 516 when the tillage apparatus 510 is moved across the surface 516. Referring to FIG. 7, the ground engager 600 is coupled to an open member 602 included in the row of open members 528.

Figure 9:
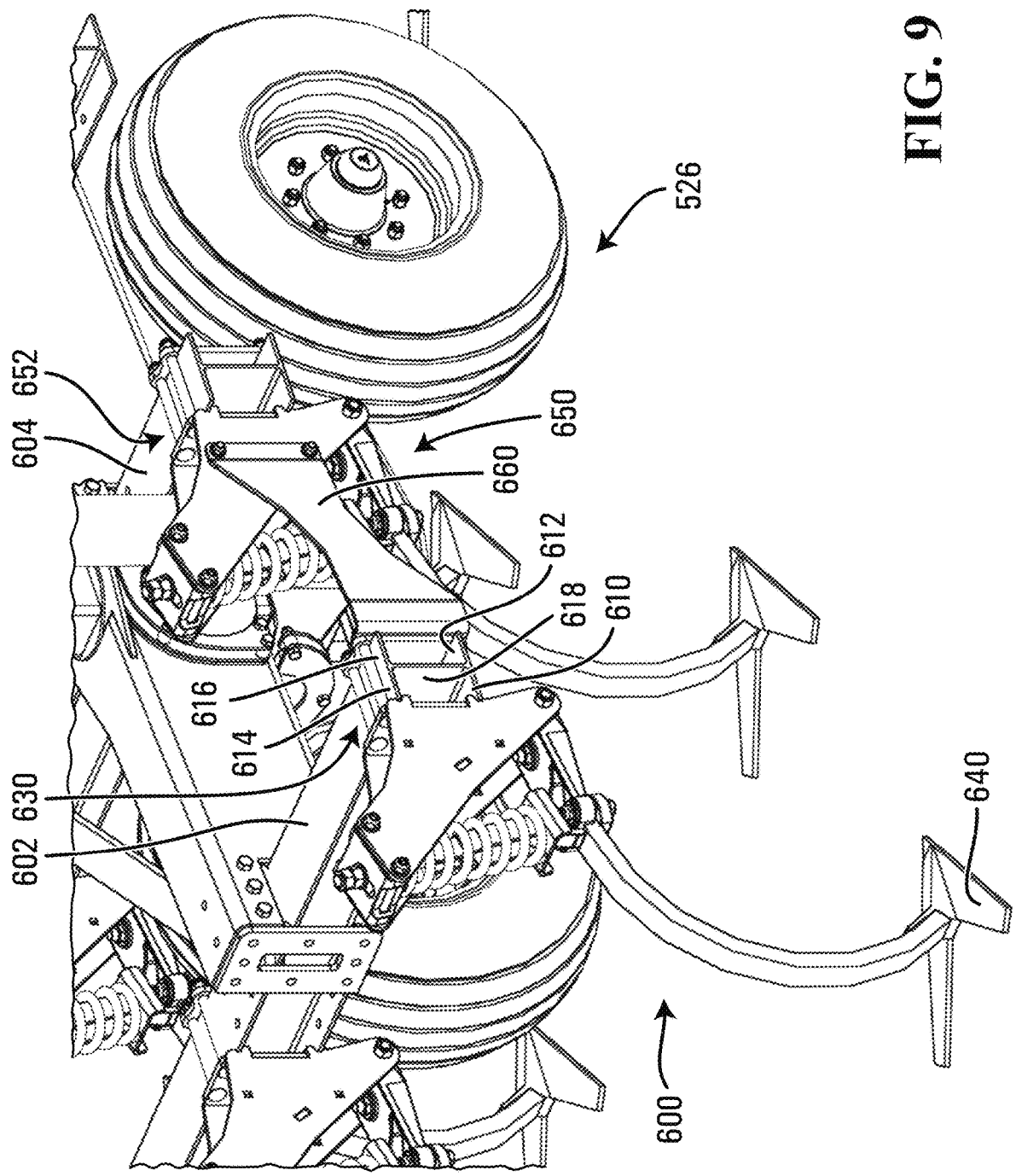
FIG. 9 is a side perspective view of a portion of the tillage apparatus shown in FIG. 7.

Referring now to FIG. 9, the ground engager 600 and the open member 602 are shown in further detail. The open member 602 includes flanges 610, 612, 614, and 616 and a web 618. The ground engager 600 includes a mount 630 which is coupled to the flanges 610, 612, 614, and 616 of the open member 602. The ground engager 600 also includes a chisel shank member 640 which is coupled to the mount 630 and which is operable to engage with the surface 516 as the tillage apparatus 510 shown in FIG. 7 is moved across the surface 516.

Referring still to FIG. 9, the tillage apparatus 510 includes a ground engager 650 having generally similar features to the ground engager 630, which includes a mount 652 coupled to an open member 604 in the row 526 of open members. In the embodiment shown in FIG. 9, the tillage apparatus 510 further includes a mount load distributor 660 coupled to the mount 652 of the ground engager 650 and to the open member 602 such that the mount load distributor 660 links the mount 652 and the open member 602. The mount load distributor 652 may facilitate load distribution from the ground engager 650 to the open member 602 instead of to just the open member 604. In some embodiments, this may facilitate limiting or reducing the application of torque to the open member 604 by the mount 652 and reduce the likelihood of the ground engager damaging the open member 604. The mount load distributors 660 shown in FIG. 9 are configured and designed to share the twisting load that may arise between open members 602 and 604. In difficult tilling conditions, impact with an obstacle could cause an over-twisting of the mount. The use of mount load distributors 660 helps to alleviate the risk of this type of over loading occurring, which may also otherwise result in bent flanges due to overloading.

With particular reference to FIGS. 8A to 8D, a spring trip device 1143 may be provided which may function and be constructed in substantially the same manner as spring device 143 as described above and each may operate to provide a trip mechanism for a single chisel shank member 640.

Each spring trip device 1143 may provide a trip mechanism that normally provides constant vertical positioning of the respective chisel shank member 640 to which it is interconnected relative to the frame 618. A pre-set force is exerted by each spring trip device 1143 on pivotable support plate 1156 fixedly connected to chisel shank member 640. Until a force acting against the pre-loading force provided by spring trip device 1143, exceeds the pre-load force imparted by spring trip device 1143, then spring 1191 of spring trip device 1143 will not compress. This pre-load force may then assist in maintaining reasonably consistent depth engagement of the respective chisel shank member 640 inter-connected to the frame 18 by struts 1151a, 1151b. However if chisel shank member 640 of impacts with a very strong, impenetrable item or material in the ground (eg. a large rock), the force imparted by such impact on may exceed a maximum allowable threshold force—which corresponds with a force on the spring 1191 greater than the pre-load force Fs. If the force Fg imparted on such chisel shank member 640 does exceed the threshold level associated with the pre-load force Fs, then the spring trip device 1143 will "trip" by virtue of its spring 1191 undergoing compression. This compression of the spring 1191 and the corresponding force causing such compression, permits pivoting of chisel shank member 640 on bracket 1156 to relieve the force on chisel shank member 640 and on the frame 18 to which to which it is interconnected. This will then relieve the contact forces being imparted by the ground (eg. the rock) on the chisel shank member 640 as the chisel shank member 640 will pivot away from the full engagement position.

Like spring device 143, spring trip device 1143 may be constructed to include a body portion having longitudinally oriented support struts 1151a, 1151b. Support struts 1151a, 1151b may be fixedly and strongly connected to a transverse member of tillage apparatus 510.

A rotator cuff unit 1193 that may be provided like rotator cuff unit 193 and also a rod may also be provided as described above.

Spring device 1143 may be operable to during normal operation, to provide a generally downward force on and to bias the chisel shank member 640 into a position whereby it engages with and penetrate the ground material beneath surface 516. However, spring device 143 may be configured and adapted such that if chisel shank members 640 associated with one or more mounts 142 engage with a substantially impenetrable material (eg. a large granite rock), then to avoid having the force of such impact transmitted throughout the rest of that frame section of which those mounts form a part, and beyond the rest of frame 18, (potentially causing structural damage to the frame and/or ground engagers 140) spring device 1143 will release the biasing force exerted by spring 1191 and allow the chisel shank member 640 attached thereto to pivot substantially freely away from the impenetrable material.

Once the spring trip device 1143 has been tripped, there is a downwards force that is still exerted on chisel shank member 640 (eg. the weight of chisel.). This will then enable the chisel shank member 640 to be returned to an operational position with a relatively easy amount of additional force. Indeed, the spring trip devices 1143 and their respective ground engagers may be configured such that the spring trip device 1143 will automatically re-set itself once the chisel shank member 640 has cleared the obstacle in the ground.

In other embodiments, instead of a single spring 191, a second spring (eg. a corresponding axially aligned inner spring housed within spring 191) may be provided to permit the ground force required to trip the spring trip device 143, to be increased.

Figure 10:
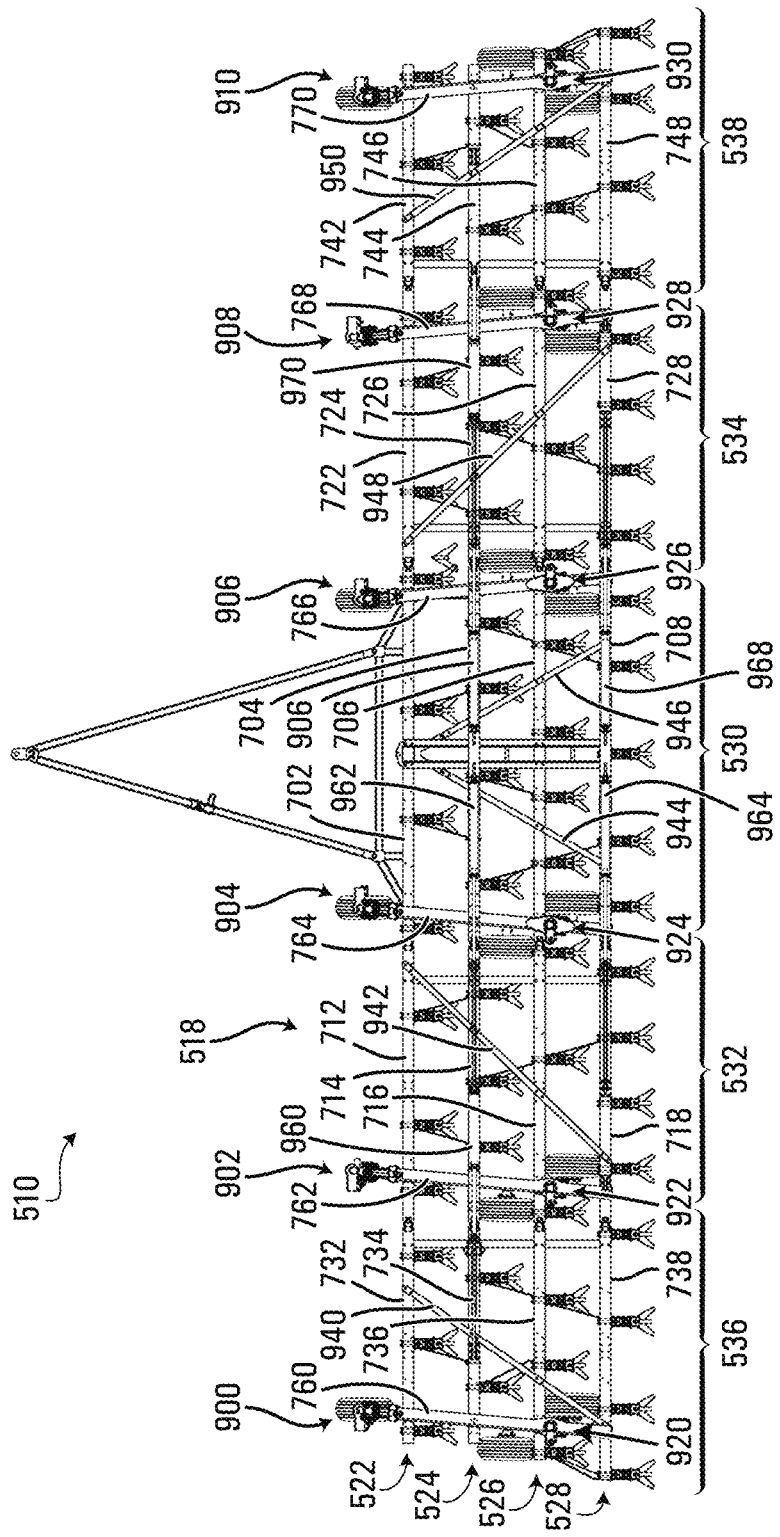
FIG. 10 is a top view of a portion of the tillage apparatus shown in FIG. 6.

Referring now to FIG. 10, a top view of the tillage apparatus 510 shown in FIG. 7 is provided. The frame 518 of the tillage apparatus 510 includes open members 702, 712, 722, 732, and 742 in the row 522, open members 704, 714, 724, 734, and 744 in the row 524, open members 706, 716, 726, 736, and 746 in the row 526, and open members 708, 718, 728, 738, and 748 in the row 528.

The frame 518 of the tillage apparatus 10 also includes row supporting open members 760, 762, 764, 766, and 768 which connect the rows 522, 524, 526, and 528 of open members. For example, the open member 760 is connected to the open members 732-738, the open member 72 is connected to the open members 712-718, the open members 764 and 766 are connected to the open members 702-708, the open member 768 is connected to the open members 722-728, and the open member 770 is connected to the open members 742-748. In the embodiment shown, the open members 760-768 have C-shaped cross sections.

The inter-connection between the transverse members and the longitudinal members may generally be done in the same way as described above.

In various embodiments, the tillage apparatus 510 may include variable height wheeled supports 920, 922, 924, 926, 928, and 930 and the C-shaped cross sections of the open members 760-770 may facilitate the wheeled supports being mounted to the open members through openings in flanges of the open members. The tillage apparatus 510 also includes variable height wheeled supports 900, 902, 904, 906, 908, and 910 connected to the open members 760-770 respectively generally at forward ends of the open members. In various embodiments, the wheeled supports 900-910 and 920-930 may act as surface following supports and may keep the frame 518 at a relative height from the surface 16. In various embodiments, the wheeled supports 900-910 and 920-930 may each include a hydraulic cylinder which is configured to vary the height of the support, as described in further detail below.

Referring still to FIG. 10, the frame 518 also includes open member load distribution members 940, 942, 944, 946, and 948. The open member load distribution member 940 is connected to the open members 732, 734, 736, and 738, the open member load distribution member 942 is connected to the open members 712, 714, 716, and 718, the open member load distribution members 944 and 946 are connected to the open members 702, 704, 706, and 708, the open member load distribution member 948 is connected to the open members 722, 724, 726, and 728, and the open member load distribution member 950 is connected to the open members 742, 744, 746, and 748. In various embodiments, each of the open member load distribution members 940, 942, 944, 946, 948, and 950 may extend at an angle to the open members to which they are connected.

Referring to FIG. 10, each of the open member load distribution members 940, 942, 948, and 950, and 948 extends at an angle of between about 30 and 70 degrees relative to the open member to which they are connected. In the embodiment shown, the angle may be about 45 degrees. The open member load distribution members 944 and 946 extend at angles of between about 30 and 70 degrees and in the embodiment shown, the angles that the open members 944 and 946 extend are each about 60 degrees. In various embodiments, the load distribution members extending at angles to the open members in the rows 522, 524, 526, and 528 may facilitate rigidity in the frame 518.

Referring still to FIG. 10, in various embodiments, the tillage apparatus 10 may include actuators 960, 962, 964, 966, 968, and 970 which are configured to raise and lower portions of the tillage apparatus 510 to reduce a width of the tillage apparatus during transport, for example. In the embodiment shown, the actuator 960 is coupled to the open members 732 and 712 and configured to retract to pivot the outer left portion 536 of the frame 518 about the pivotal connectors between the outer left portion 536 and the inner left portion 532. The actuator 962 is coupled to the open members 704 and 714 and the actuator 964 is coupled to the open members 708 and 718. In operation, the actuators 962 and 964 may be retracted from the configuration shown in FIG. 10 to rotate the left inner portion 532 upwards relative to the center portion 530 of the frame 518. The actuators 966, 968, and 970 may be generally similar to the actuators 962, 964, and 960.

In various embodiments, the actuators 966, 968, and 970 may be retracted generally simultaneously with the actuators 960, 962, and 964, to rotate the right inner and outer portions 534 and 538 inwards as the left inner and outer portions 532 and 536 are rotated inwards. In various embodiments, the actuators 960-966 may be actuators which are configured to lift and hold substantial weight, such as, for example hydraulic actuators.

Figure 7A:
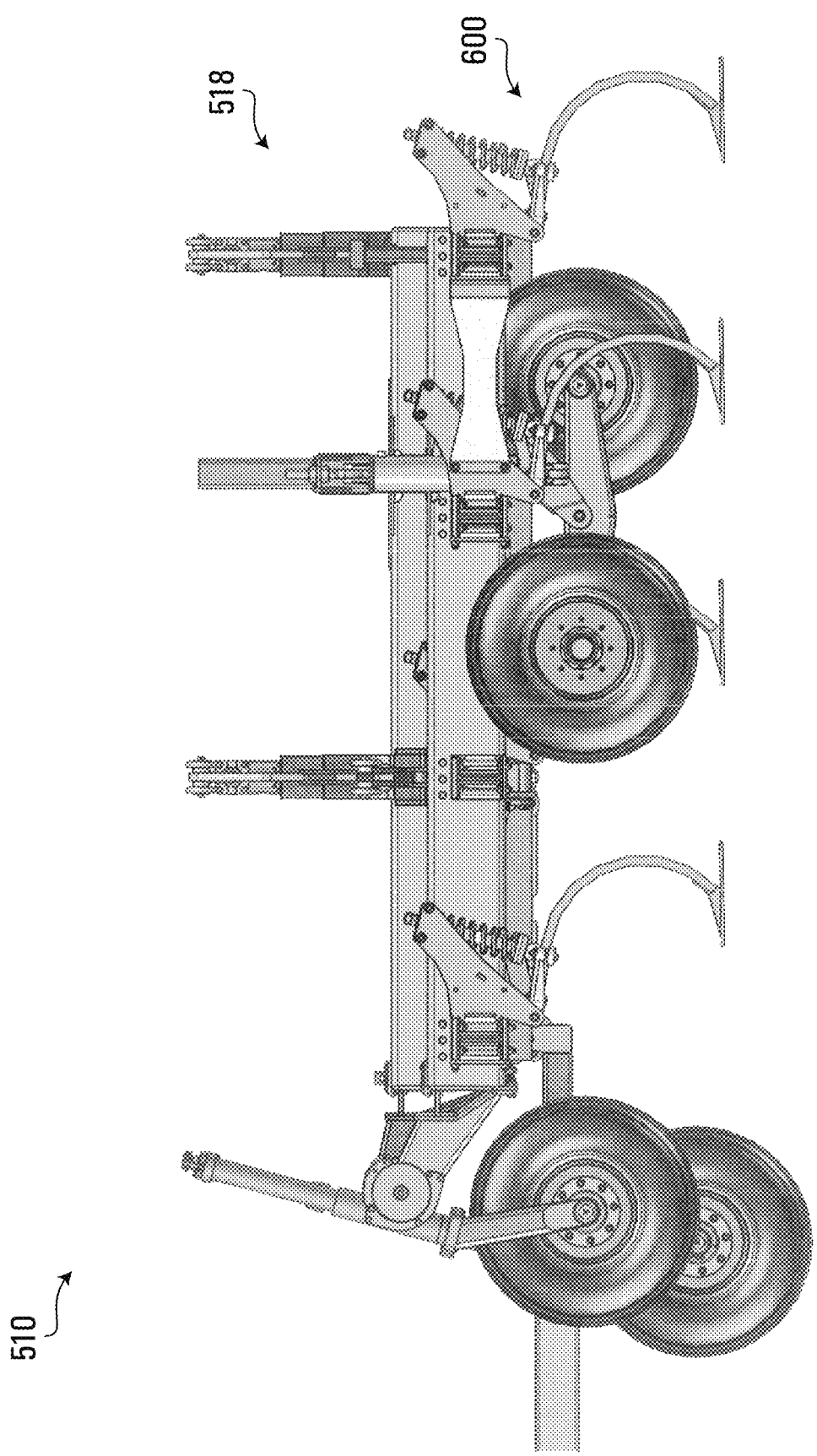
FIG. 7A is a side view of a portion of the tillage apparatus shown in FIG. 7.
Figure 7B:
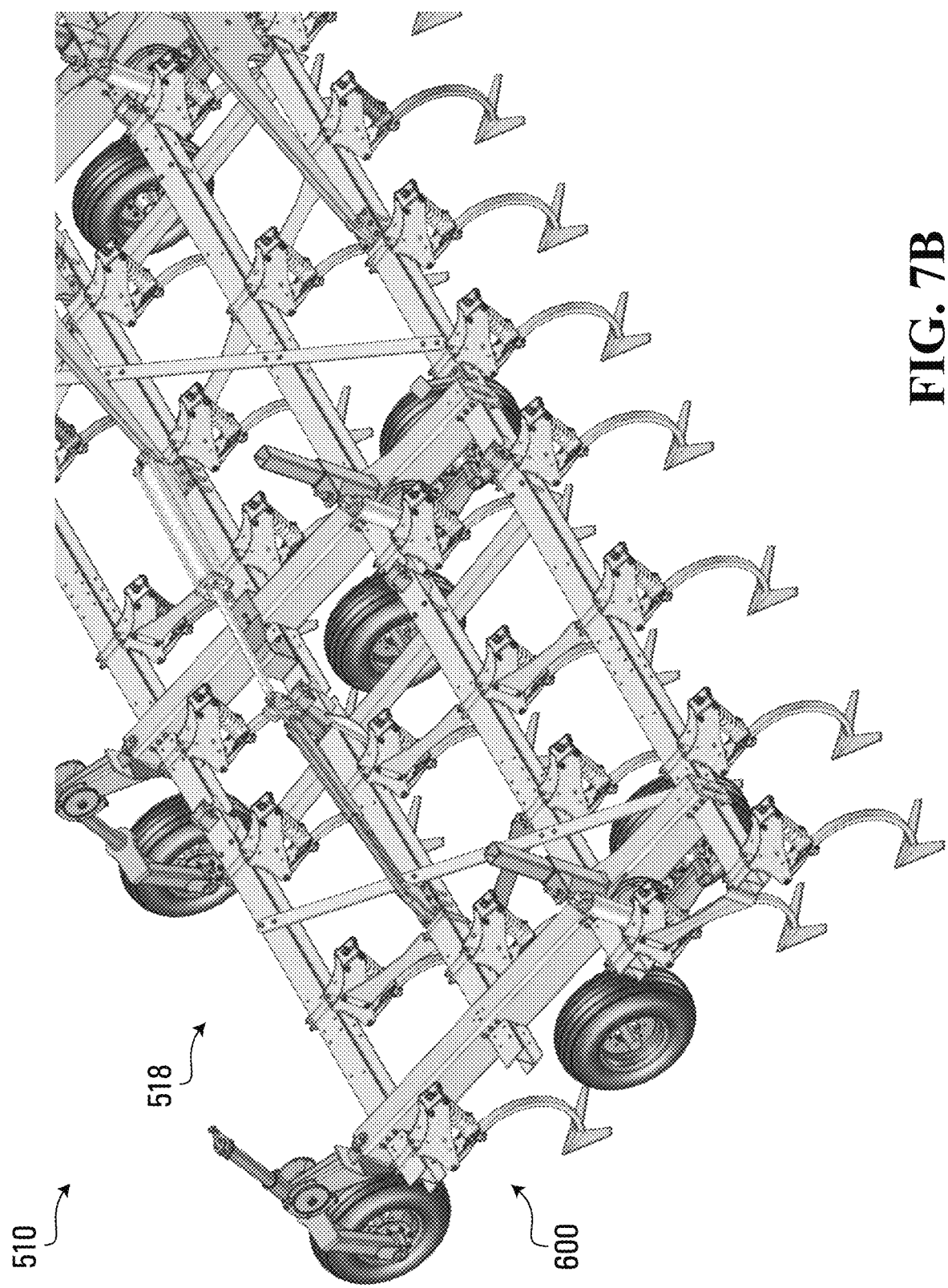
FIG. 7B is a top perspective view of a portion of the tillage apparatus shown in FIG. 7.
Figure 7C:
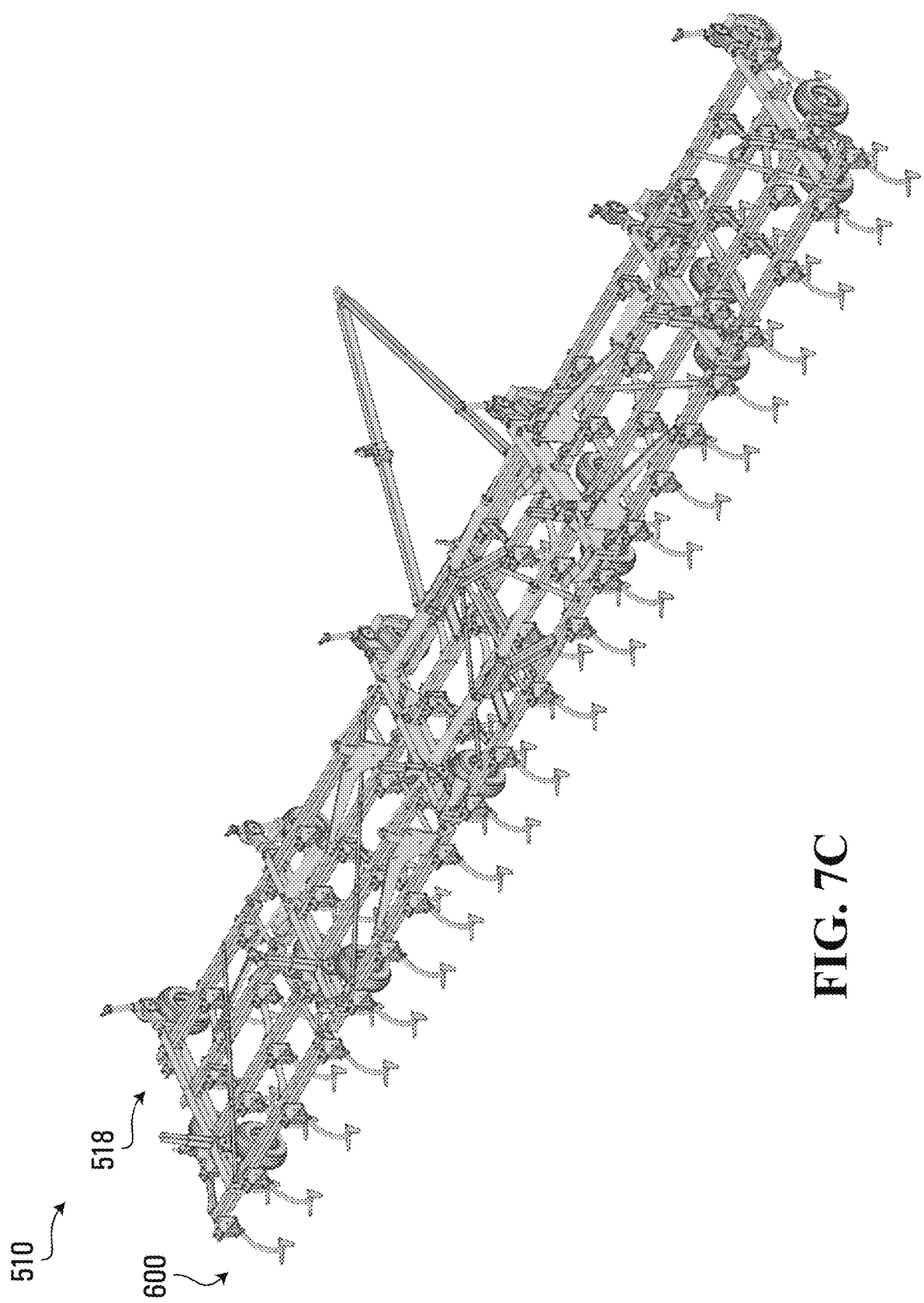
FIG. 7C is a rear perspective view of the tillage apparatus shown in FIG. 7 in isolation.

As will be evident from FIGS. 7A and 7B, a system like that described above for raising and lowering the frame 518 relative to the wheels, may be provided, including a pulley and cable mechanism, along with a hydraulic cylinder that may be supplied with fluid from a supply system and controlled by a controller.

Figure 16A:
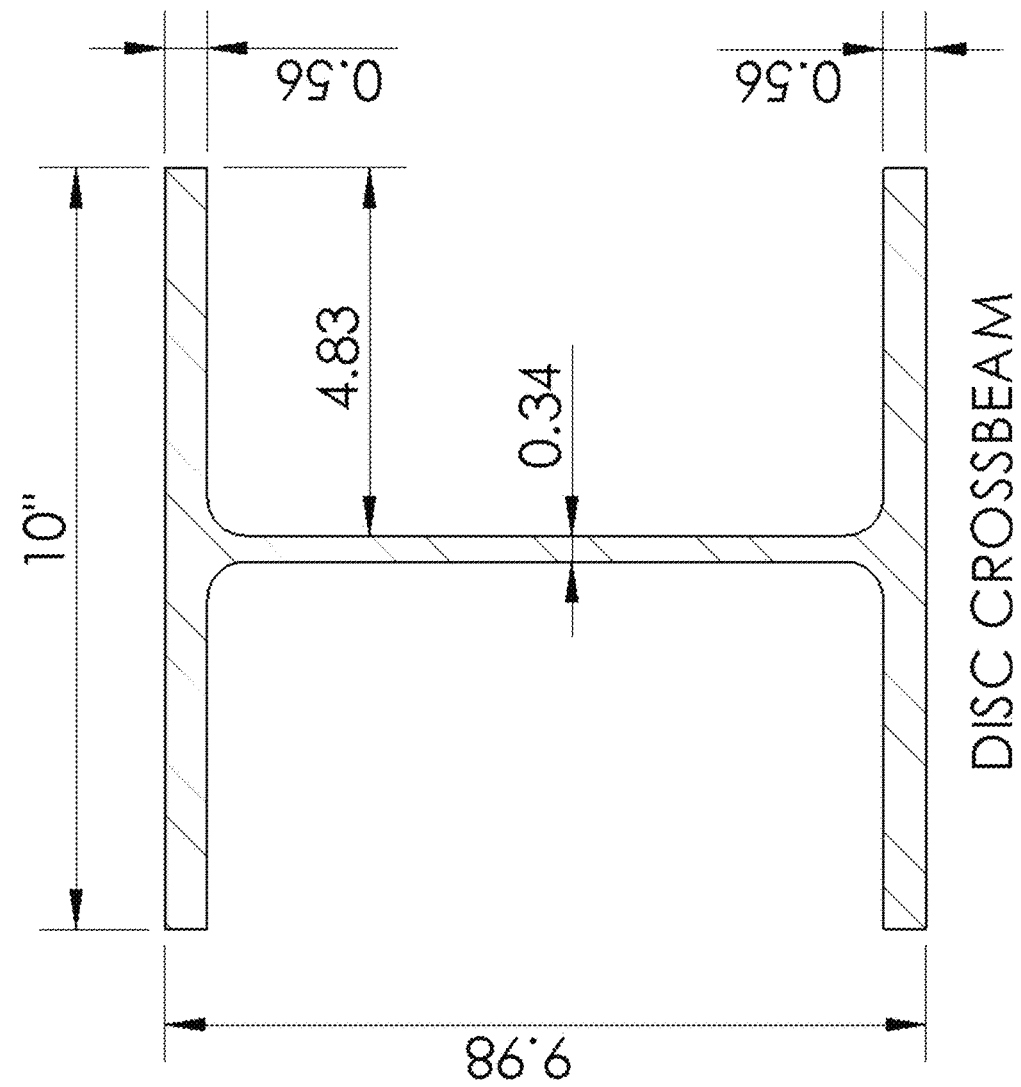
FIGS. 16A, 16B and 16C are cross section views for example transverse and longitudinal members of tillage apparatus 10.
Figure 16B:
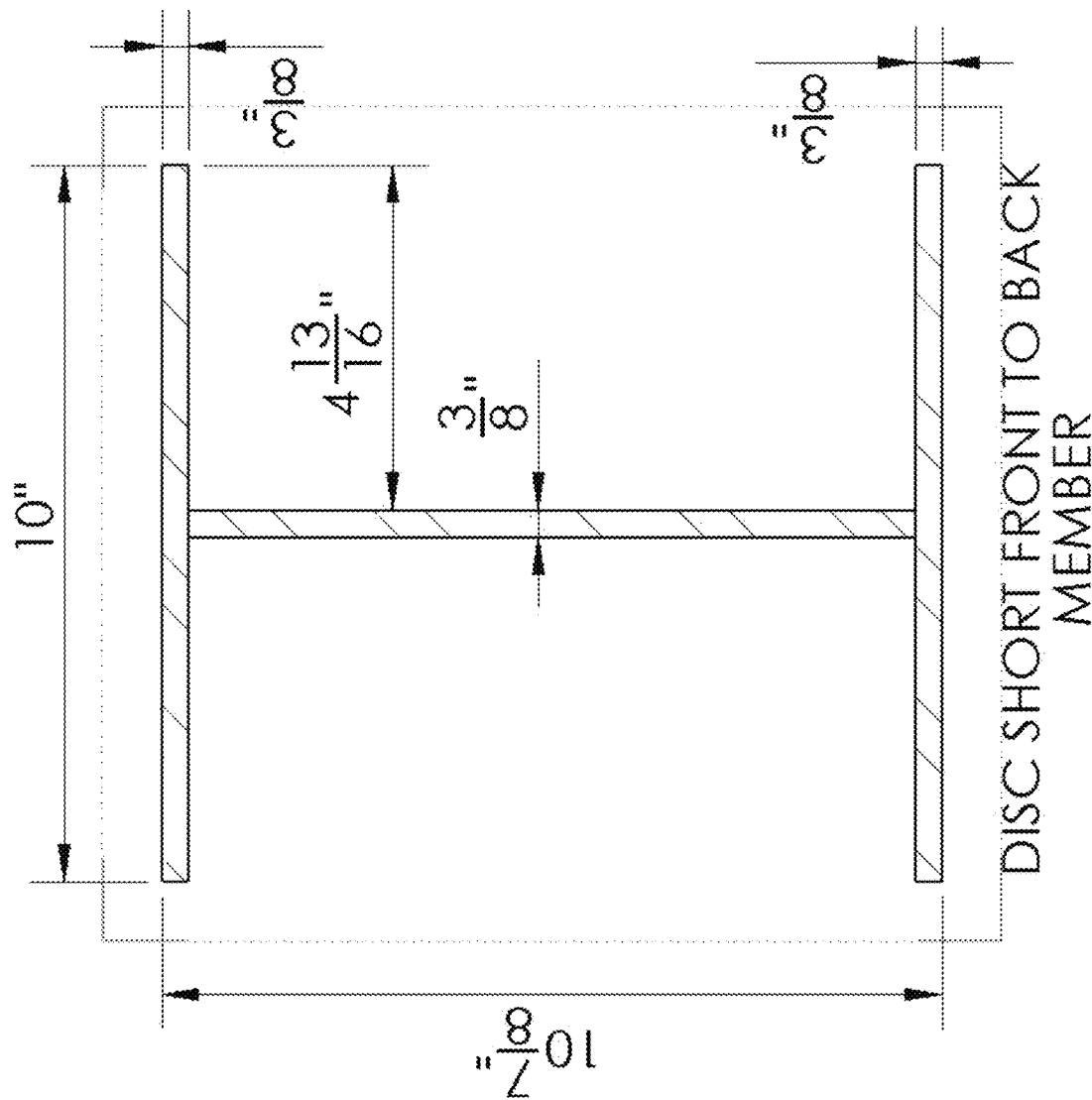
Figure 16C:
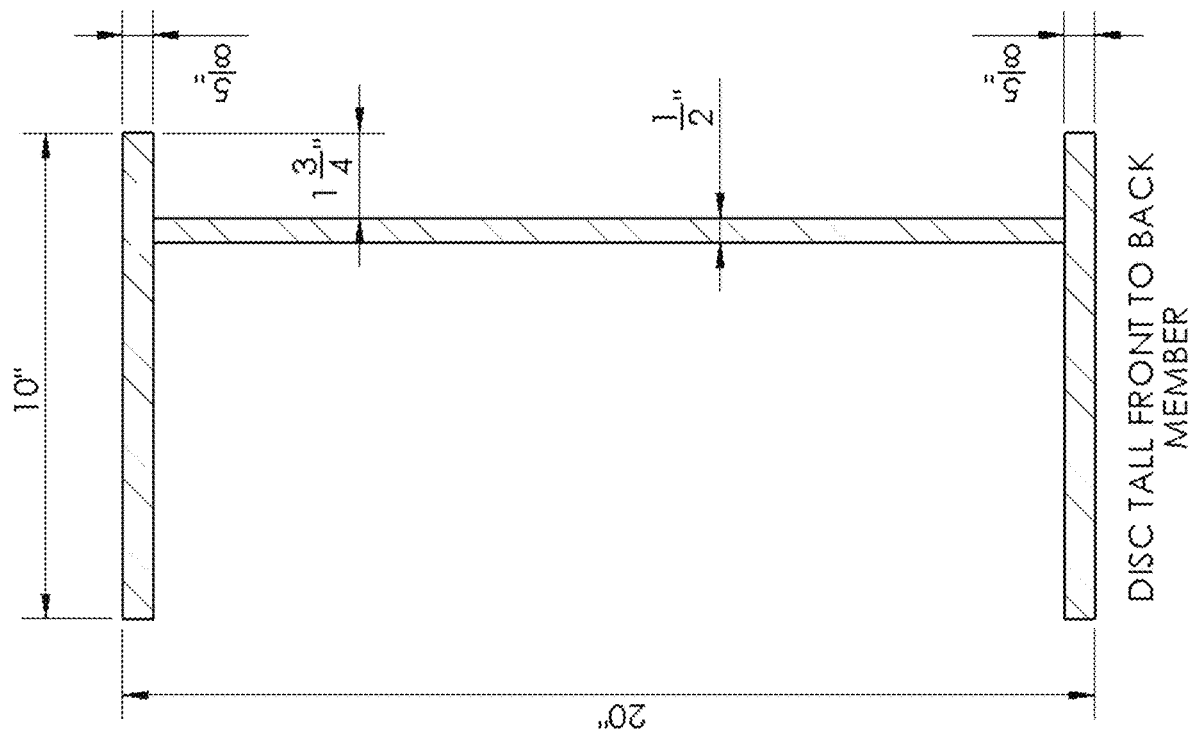

FIGS. 16A, 16B and 16C depict some examples of cross sectional dimensions for the transverse and longitudinal member of tillage apparatus 10.

Figure 17B:
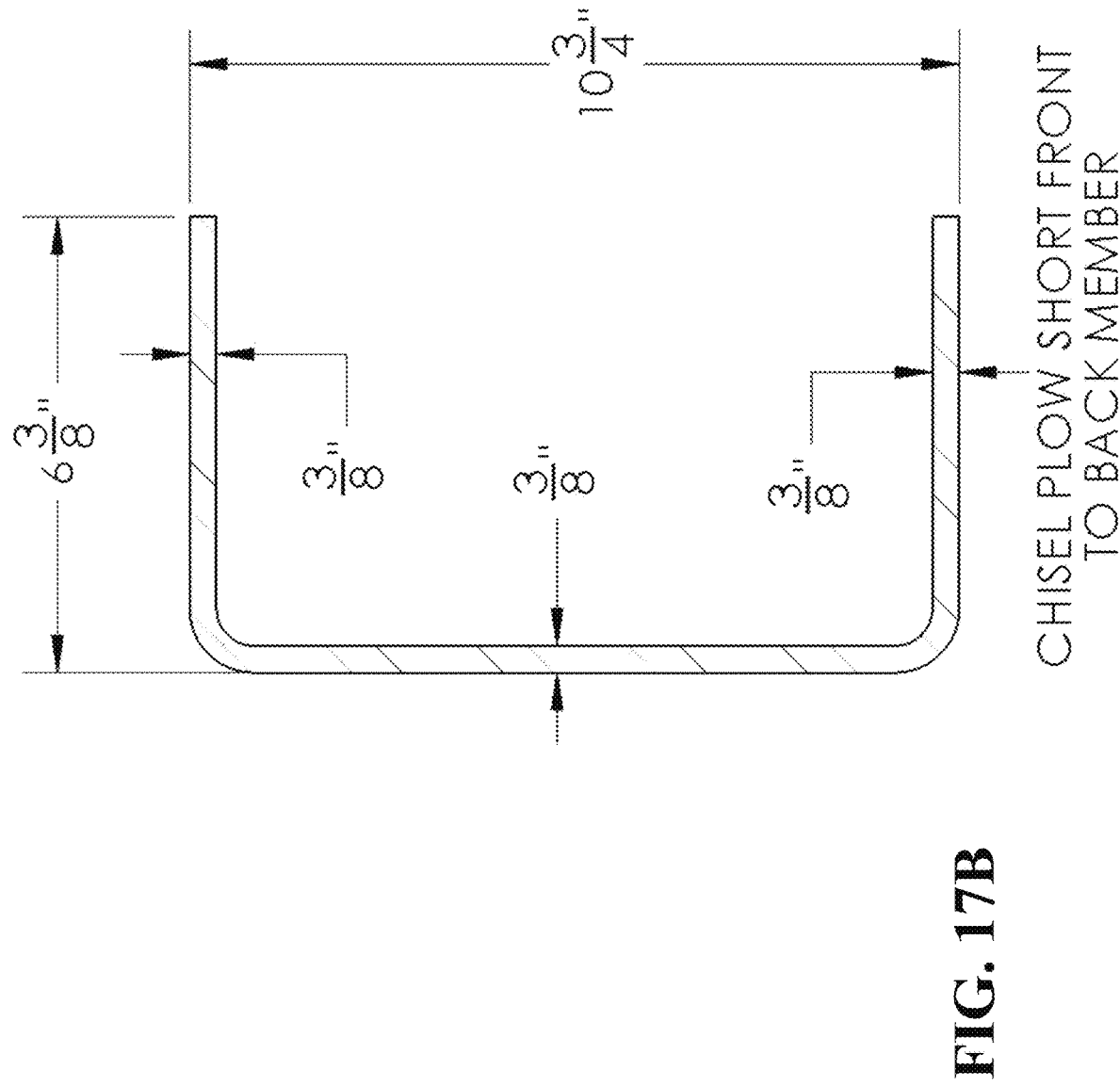
Figure 17C:
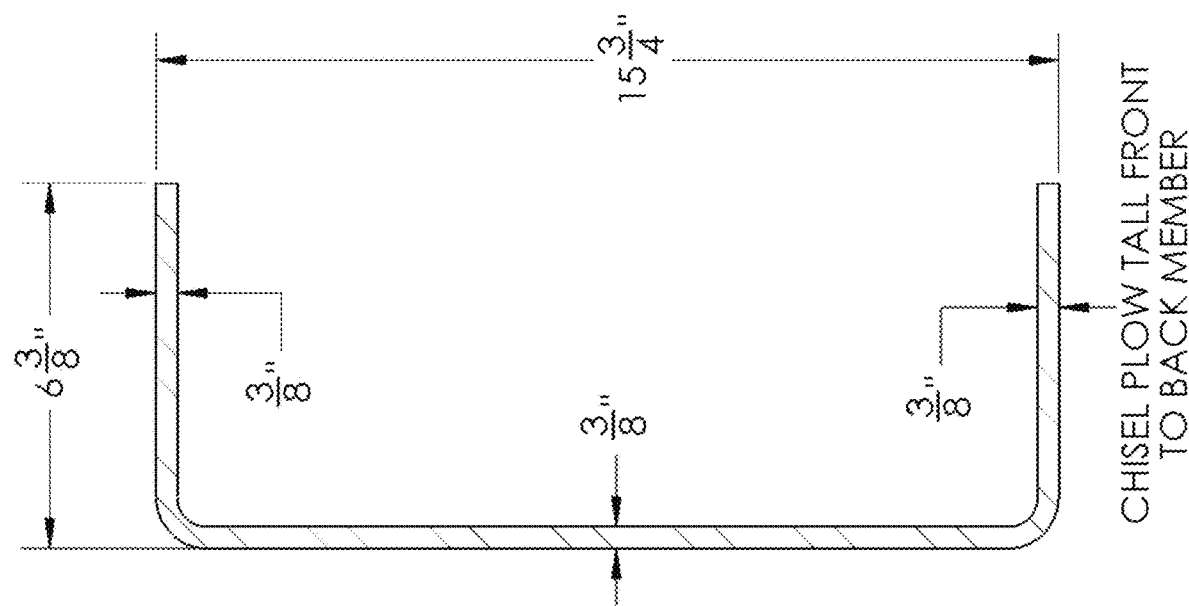

FIGS. 17A, 17B and 17C depict some examples of cross sectional dimensions for the transverse and longitudinal member of tillage apparatus 510.

While specific embodiments of the invention have been described and illustrated, such embodiments should be considered illustrative of the invention only and not as limiting the invention as construed in accordance with the accompanying claims.

The above described embodiments are intended to be illustrative only and in no way limiting. The described embodiments of carrying out the invention are susceptible to many modifications of form, arrangement of parts, details and order of operation. Other variations are possible.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

The invention claimed is:

1. An apparatus operable for supporting one or more agricultural tools, the apparatus comprising a frame, said frame comprising:
   a transversely oriented and extending open transverse member comprising a transversely extending and generally horizontal upper flange plate, a transversely extending and generally horizontal lower flange plate, and a transversely extending web plate extending generally vertically between and interconnecting the upper flange plate of the transverse member and the lower flange plate of the transverse member, each of said upper flange plate and said lower flange plate of said transverse member being oriented generally orthogonal to said web plate of said transverse member, and each of upper flange plate, said lower flange plate, and said web plate of said transverse member extending transversely a first length;
   a longitudinally oriented and extending open longitudinal member, said longitudinal member extending orthogonally to said transverse member, said longitudinal member comprising a longitudinally extending and generally horizontal upper flange plate, a longitudinally extending and generally horizontal lower flange plate, and a longitudinally extending web plate extending generally vertically between and interconnecting the upper flange plate of the longitudinal member and the lower flange plate of the longitudinal member, each of upper flange plate, each of said upper flange plate and said lower flange plate of said longitudinal member being oriented generally orthogonal to said web plate of said longitudinal member, and each of said upper flange plate, said lower flange plate, and said web plate of said longitudinal member extending longitudinally a second length;
   said longitudinal member comprising an opening extending transversely through said web plate of said longitudinal member, said opening receiving said transverse member there through such that said transverse member extends from a first side of said web plate of said longitudinal member, transversely through said opening in said web plate of said longitudinal member, to a second side of the web plate of said longitudinal member, said second side being on an opposite side of the web plate of said longitudinal member to the first side;
   said lower flange plate of said transverse member being fixedly connected to said lower flange plate of said longitudinal member proximate said opening;
   said upper flange plate of said transverse member being fixedly connected to said web plate of said longitudinal member proximate said opening;
   said transverse member not being connected to said upper flange plate of said longitudinal member.

2. An apparatus as claimed in claim 1 wherein said upper flange plate of said transverse member is fixedly connected to said web plate of said longitudinal member with an interconnecting plate member.

3. An apparatus as claimed in claim 2 wherein said interconnecting plate member is also fixedly connected to a transversely and vertically oriented end plate of said longitudinal member.

4. An apparatus as claimed in claim 1 wherein said opening through said web plate of said longitudinally oriented member is located proximate an end of said transversely oriented member.

5. An apparatus as claimed in claim 1 further comprising at least one ground engager coupled to said lower flange plate of said transverse member, said ground engager configured and operable to engage a ground surface when said apparatus is moved across the ground surface.

6. An apparatus as claimed in claim 1 further comprising a plurality of laterally spaced flex reducing members, each of said laterally spaced flex reducing members being fixedly attached to and extending vertically between said web plate of said transverse member and said lower flange plate of said transverse member.

7. An apparatus as claimed in claim 1 wherein said lower flange plate of said transverse member extends on both a first side of said web plate of said transverse member and on an opposite second side of said web plate of said transverse member and said lower flange plate of said transverse member is fixedly connected to said lower flange plate of said longitudinal member on both said first and second sides of said web plate of said transverse member.

8. An apparatus as claimed in claim 1 wherein said one or more agricultural tools comprise a plurality of ground engagers attached to said lower flange plate of said transverse member and operable for engaging a ground surface when said apparatus moves across the ground surface.

9. An apparatus as claimed in claim 1 wherein said frame comprises at least one frame section, said at least one frame section comprising:
   said transversely oriented open member comprising a first transverse member and said longitudinal member comprising a first longitudinal member; and
   a transversely oriented and extending open second transverse member oriented generally parallel to and being longitudinally spaced from first transverse member, said second transverse member comprising an upper flange plate and a lower flange plate and a web plate interconnecting the upper flange plate of the second transverse member and the lower flange plate of the second transverse member;
   wherein said opening through said first longitudinal member is a first opening through said web plate of said first longitudinal member configured to receive said first transverse member transversely there through and wherein said first longitudinal member has a second opening spaced longitudinally from said first opening, said second opening extending transversely through said web plate of said first longitudinal member, receiving said second transverse member there through such that said transverse member extends from said first side of said web plate of said longitudinal member, transversely to said second side of the web plate of the longitudinal member; and
   a longitudinally oriented and extending open second longitudinal member, said second longitudinal member extending orthogonally to said first transverse member and said second transverse member, and said second longitudinal member oriented generally parallel to and being transversely spaced from first longitudinal member, said second longitudinal member comprising an upper flange and a lower flange and a web interconnecting the upper flange of the second longitudinal member and the lower flange of the second longitudinal member; said second longitudinal member comprising a first opening extending transversely through said web plate of said second longitudinal member, said first opening through said web plate of said second longitudinal member configured to receive said first transverse member there through and said web plate of said second longitudinal member comprising a second opening there through receiving said second transverse member transversely there through;

said lower flange plate of said first longitudinal member being fixedly connected to said lower flange plate of said second transverse member; and said upper flange plate of said second transverse member being fixedly connected to said web plate of said first longitudinal member proximate said second opening;

said second transverse member not being connected to said upper flange plate of said first longitudinal member.

10. An apparatus as claimed in claim 9 wherein said lower flange plate of said second longitudinal member is fixedly connected to said lower flange plate of said first transverse member and is fixedly connected to said lower flange plate of said second transverse member.

11. An apparatus as claimed in claim 10 wherein said upper flange plate of said first transverse member is fixedly connected to said web plate of said second longitudinal member.

12. An apparatus as claimed in claim 11 wherein said upper flange plate of said second transverse member is fixedly connected to said web plate of said second longitudinal member.

13. An apparatus as claimed in claim 11,
wherein said upper flange plate of said first transverse member is fixedly connected to said web plate of said first longitudinal member with a first interconnecting plate member; and
said upper flange plate of said second transverse member is fixedly connected to said web plate of said second longitudinal member with a second interconnecting plate member.

14. An apparatus as claimed in claim 9, wherein said at least one frame section further comprises:
a third longitudinally oriented open member extending orthogonally to said first transverse member and said second transverse member, and said third longitudinal member oriented generally parallel to and being transversely spaced from first and second longitudinal members, said third longitudinal member comprising an upper flange plate and a lower flange plate and a web plate interconnecting the upper flange plate of the third longitudinal member and the lower flange plate of the third longitudinal member; said third longitudinal member comprising a first opening through said web plate of said third longitudinal member, said first opening through said web plate of said third longitudinal member receiving said first transverse member there through and said apparatus further comprising a second opening through said web plate of said third longitudinal member receiving said second transverse member there through;
said lower flange plate of said third longitudinal member being fixedly connected to said lower flange plate of said first transverse member and said lower flange plate of said third longitudinal member being fixedly connected to said lower flange plate of second transverse member; and
said upper flange plate of said first transverse member being fixedly connected to said upper flange plate of said third longitudinal member and said upper flange plate of said second transverse member being fixedly connected to said upper flange plate of said third longitudinal member.

15. An apparatus as claimed in claim 14 further comprising an angled member extending at an angle to the longitudinal direction, said angled member being fixedly attached to, and extending from an upper flange of said first longitudinal member, across an upper flange of said third longitudinal member, to an upper flange of said second longitudinal member.

16. An apparatus as claimed in claim 9 wherein said at least one frame section comprises first and second frame sections, said first frame section being pivotally connected to said second frame section.

17. An apparatus as claimed in claim 9 further comprising a plurality of transversely spaced ground engagers coupled to said lower flange plate of each of said first and second transverse members, said plurality of ground engagers configured to engage a ground surface when said apparatus is moved across the ground surface.

18. An apparatus as claimed in claim 9 wherein said at least one frame section comprises first, second and third frame sections, said first frame section being pivotally connected to said second frame section on a first transverse side of said first frame section, and said first frame section being pivotally connected to said third frame section on a second transverse side of said first frame section, which is transversely opposite to said first transverse side of said first frame section.

19. An apparatus as claimed in claim 18 further comprising a plurality of transversely spaced ground engagers coupled to a lower flange plate of each of said first and second transverse members, in each of said first, second and third frame sections, said plurality of ground engagers configured to engage a ground surface when said apparatus is moved across the ground surface.

20. An apparatus as claimed in claim 9 further comprising a plurality of laterally spaced flex reducing members, a first group of said laterally spaced flex reducing members being fixedly attached to and extending between said web of said first transversely oriented open member and said lower flange plate of said first transversely oriented open member; and a second group of said laterally spaced flex reducing members being fixedly attached to and extending between said lower flange plate of said second transversely oriented open member and said web of said second transversely oriented open member.

21. An apparatus comprising:
a transversely oriented and extending open transverse member comprising a transversely extending and generally horizontal upper flange plate, a transversely extending and generally horizontal lower flange plate, and a transversely extending web plate extending generally vertically between and interconnecting the upper flange plate of the transverse member and the lower flange plate of the transverse member, each of said upper flange plate and said lower flange plate of said transverse member being oriented generally orthogonal to said web plate of said transverse member, and each of upper flange plate, said lower flange plate, and said web plate of said transverse member extending transversely a first length;

a longitudinally oriented and extending open longitudinal member, said longitudinal member extending orthogonally to said transverse member, said longitudinal member comprising a longitudinally extending and generally horizontal upper flange plate, a longitudinally extending and generally horizontal lower flange plate, and a longitudinally extending web plate extending generally vertically between and interconnecting the upper flange plate of the longitudinal member and the lower flange plate of the longitudinal member, each of upper flange plate, each of said upper flange plate and said lower flange plate of said longitudinal member being oriented generally orthogonal to said web plate of said longitudinal member, and said lower flange plate, and said web plate of said longitudinal member extending longitudinally a second length;

said longitudinal member comprising an opening extending transversely through said web plate of said longitudinal member, said opening receiving said transverse member there through such that said transverse member extends from a first side of said web plate of said longitudinal member, transversely through said opening in said web plate of said longitudinal member, to a second side of the web plate of said longitudinal member, said second side being on an opposite side of the web plate of said longitudinal member to the first side;

said lower flange plate of said transverse member being fixedly connected to said lower flange plate of said longitudinal member proximate said opening;

wherein said upper flange plate of said transverse member is fixedly connected to said upper flange plate of said longitudinal member;

said transverse member not being connected to said web plate of said longitudinal member.

22. An apparatus as claimed in claim 21 further comprising at least one ground engager coupled to said lower flange plate of said transverse member.

23. An apparatus as claimed in claim 21 wherein said lower flange plate of said transverse member extends on both a first side from said web plate of said transverse member and on an opposite second side from sides of said web plate of said transverse member, and said lower flange of said longitudinally oriented longitudinal member extends on both a first side from said web plate of said longitudinal member and on an opposite second side from said web plate of said longitudinal member, and wherein said lower flange plate of said transverse member is fixedly connected on both said first and second sides of said lower flange plate of said transverse member to said lower flange plate of said longitudinal member proximate said opening.

* * * * *